(12) United States Patent
Shahroudi et al.

(10) Patent No.: US 12,012,976 B2
(45) Date of Patent: Jun. 18, 2024

(54) MULTI-AXIS ROTARY PISTON ACTUATOR

(71) Applicant: Woodward, Inc., Fort Collins, CO (US)

(72) Inventors: Kamran Eftekhari Shahroudi, Fort Collins, CO (US); Larry Snyder, Golden, CO (US); Robert Alan Gerhart, Maple Grove, MN (US)

(73) Assignee: Woodward, Inc., Fort Collins, CO (US)

( * ) Notice: Subject to any disclaimer, the term of this patent is extended or adjusted under 35 U.S.C. 154(b) by 64 days.

(21) Appl. No.: 17/655,145

(22) Filed: Mar. 16, 2022

(65) Prior Publication Data

US 2022/0205465 A1    Jun. 30, 2022

Related U.S. Application Data

(63) Continuation of application No. 16/791,668, filed on Feb. 14, 2020, now Pat. No. 11,280,356, which is a
(Continued)

(51) Int. Cl.
*F15B 15/12* (2006.01)
*E02F 9/00* (2006.01)
(Continued)

(52) U.S. Cl.
CPC ............ *F15B 15/125* (2013.01); *E02F 9/006* (2013.01); *B25J 9/146* (2013.01); *B25J 9/148* (2013.01);
(Continued)

(58) Field of Classification Search
CPC ....... F15B 15/125; E02F 9/006; E02F 9/2264; E02F 3/3677; B25J 9/146; B25J 9/148; B25J 17/025
See application file for complete search history.

(56) References Cited

U.S. PATENT DOCUMENTS

| 1,032,694 A | 7/1912 | Milne |
| 1,704,716 A | 3/1929 | Bailey |
| (Continued) | | |

FOREIGN PATENT DOCUMENTS

| CH | 122141 | 9/1927 |
| CN | 101893016 | 11/2010 |
| (Continued) | | |

OTHER PUBLICATIONS exionasia.com [online], "Becker* Rotary Piston Spring Return RPSR Actuators," Sep. 2014, retrieved on Feb. 19, 2020, retrieved from URL<http://exionasia.com/wp-content/uploads/2015/01/GEA19652 Becker-RPSR-Actuator-Brochure.pdf>, 16 pages.
(Continued)

*Primary Examiner* — Dustin T Nguyen
(74) *Attorney, Agent, or Firm* — Fish & Richardson P.C.

(57) ABSTRACT

The subject matter of this specification can be embodied in, among other things, a rotary actuator that includes a housing defining an arcuate chamber comprising a cavity, a rotor arm configured for rotary movement, an arcuate-shaped first piston disposed in said housing for reciprocal movement in the arcuate chamber, where a seal, the cavity, and the piston define a pressure chamber that includes part or all of the arcuate chamber, and a portion of the piston contacts the rotor arm, and a rotor assembly rotatably surrounding said housing and having a rotary output tube about the axis, wherein the rotor arm extends radially outward to the rotary output tube and the rotor arm is coupled to the rotary output tube.

18 Claims, 19 Drawing Sheets

Related U.S. Application Data continuation of application No. 15/669,314, filed on Aug. 4, 2017, now Pat. No. 10,655,303.

(60) Provisional application No. 62/449,879, filed on Jan. 24, 2017, provisional application No. 62/371,317, filed on Aug. 5, 2016.

(51) Int. Cl.
  *B25J 9/14* (2006.01)
  *B25J 17/02* (2006.01)
  *E02F 3/36* (2006.01)
  *E02F 9/22* (2006.01)

(52) U.S. Cl.
  CPC .......... *B25J 17/025* (2013.01); *E02F 3/3677* (2013.01); *E02F 9/2264* (2013.01)

(56) References Cited

U.S. PATENT DOCUMENTS

| | | | |
|---|---|---|---|
| 2,630,786 A | 3/1953 | Poore | |
| 2,801,068 A | 7/1957 | Paul | |
| 2,896,413 A | 7/1959 | Hussey | |
| 2,974,645 A | 3/1961 | Sune | |
| 3,059,683 A | 10/1962 | Atherton | |
| 3,188,919 A | 6/1965 | Sills | |
| 3,279,755 A | 10/1966 | Notenboom | |
| 3,351,121 A | 11/1967 | Rumsey | |
| 3,367,424 A | 2/1968 | Shunichi et al. | |
| 3,444,788 A | 5/1969 | Sneen | |
| 3,446,120 A | 5/1969 | Sneen | |
| 3,731,546 A | 5/1973 | Macdonald | |
| 3,731,597 A | 5/1973 | Payne | |
| 3,877,349 A | 4/1975 | Schindel | |
| 4,033,519 A | 7/1977 | Abe et al. | |
| 4,242,947 A | 1/1981 | Renner et al. | |
| 4,459,898 A | 7/1984 | Harjar et al. | |
| 4,526,087 A * | 7/1985 | d'Agostino | F02C 9/00 92/117 A |
| 4,590,816 A | 5/1986 | Weyer | |
| 4,755,104 A | 7/1988 | Castro et al. | |
| 4,850,329 A | 7/1989 | Taylor et al. | |
| 4,864,917 A * | 9/1989 | Methot | F01C 9/002 244/102 R |
| 4,899,637 A * | 2/1990 | Caruso | B25J 9/148 901/29 |
| 4,945,778 A | 8/1990 | Weyer | |
| 5,109,754 A | 5/1992 | Shaw | |
| 5,113,107 A | 5/1992 | Atsumi et al. | |
| 5,235,900 A | 8/1993 | Garceau | |
| 5,495,791 A | 3/1996 | Sande et al. | |
| 5,549,448 A | 8/1996 | Langston | |
| 5,996,523 A | 12/1999 | Fox | |
| 6,276,660 B1 | 8/2001 | Wittkopp | |
| 6,361,033 B1 | 3/2002 | Jones et al. | |
| 6,769,868 B2 | 8/2004 | Harrold | |
| 6,843,605 B2 | 1/2005 | Tamada et al. | |
| 7,685,929 B2 | 3/2010 | Mainville | |
| 7,895,935 B2 | 3/2011 | Kells | |
| 8,435,000 B2 | 5/2013 | Wong et al. | |
| 8,801,290 B2 | 8/2014 | Heshmat | |
| 9,133,923 B2 | 9/2015 | Ito et al. | |
| 10,718,359 B2 * | 7/2020 | Rose | F15B 15/125 |
| 2003/0136258 A1 | 7/2003 | Bunyard | |
| 2009/0031718 A1 | 2/2009 | Kells | |
| 2009/0058581 A1 | 3/2009 | Neff et al. | |
| 2012/0043832 A1 | 2/2012 | Neff et al. | |
| 2013/0104729 A1 * | 5/2013 | Ito | F01C 9/002 92/32 |
| 2013/0133513 A1 | 5/2013 | Ito et al. | |
| 2014/0087915 A1 | 3/2014 | Rohs et al. | |
| 2014/0238226 A1 * | 8/2014 | Kim | F01C 9/002 92/261 |
| 2014/0238227 A1 | 8/2014 | Kim et al. | |
| 2014/0238228 A1 | 8/2014 | Sobolewski | |
| 2015/0240827 A1 * | 8/2015 | Hoemke | F15B 15/068 415/111 |
| 2015/0322790 A1 | 11/2015 | Yao et al. | |
| 2016/0010666 A1 | 1/2016 | Kim et al. | |
| 2016/0177722 A1 | 6/2016 | Ito et al. | |
| 2018/0172033 A1 | 6/2018 | Shahroudi | |
| 2019/0249694 A1 * | 8/2019 | O'Hara | F01C 9/002 |
| 2021/0172462 A1 | 6/2021 | Shahroudi | |

FOREIGN PATENT DOCUMENTS

| | | | |
|---|---|---|---|
| CN | 103162032 | 6/2013 | |
| CN | 105723102 | 6/2016 | |
| DE | 1176491 | 8/1964 | |
| DE | 2600459 | 7/1977 | |
| DE | 3016427 | 4/1983 | |
| DE | 3245677 | 6/1984 | |
| DE | 10322501 | 12/2004 | |
| EP | 0229833 | 7/1987 | |
| EP | 1101902 | 5/2001 | |
| EP | 2022919 | 2/2009 | |
| EP | 2586966 | 5/2013 | |
| EP | 2644823 | 10/2013 | |
| EP | 3037677 | 6/2016 | |
| FI | WO 2015/007943 * | 1/2015 | F15B 15/12 |
| GB | 1199847 | 7/1970 | |
| GB | 1261801 | 1/1972 | |
| GB | 2068463 * | 8/1981 | F15B 15/12 |
| JP | S5530523 | 3/1980 | |
| JP | S58604 | 1/1983 | |
| JP | S59122402 | 8/1984 | |
| JP | H11193772 | 7/1999 | |
| KR | 20160077428 | 7/2016 | |
| WO | WO199325818 | 12/1993 | |
| WO | WO03008781 | 1/2003 | |
| WO | WO2007003000 | 1/2007 | |
| WO | WO2014133884 | 9/2014 | |
| WO | WO2014133939 | 9/2014 | |
| WO | WO2015007943 | 1/2015 | |
| WO | WO2017171564 | 10/2017 | |

OTHER PUBLICATIONS hydraulic.com [online], "Hydraulic Oscillating Actuator," May 7, 2010, retrieved on Feb. 19, 2020, retrieved from URL<http://www.hydraulicstatic.com/20100507_hydraulic-oscillating-actuator.html>, 2 pages.

International Preliminary Report on Patentability in International Application No. PCT/US2017/045631, dated Feb. 14, 2019, 14 pages.

International Preliminary Report on Patentability in International Application No. PCT/US2017/055153, dated Apr. 19, 2019, 7 pages.

International Search Report and Written Opinion in International Appln. No. PCT/US2017/045628, dated May 7, 2018, 24 pages.

International Search Report and Written Opinion in International Appln. No. PCT/US2017/045631, dated May 7, 2018, 20 pages.

International Search Report and Written Opinion in International Appln. No. PCT/US2017/055153, dated Jan. 19, 2018, 10 pages.

Invitation to Pay Additional Fees and partial International Search Report in International Appln. No. PCT/US2017/045628, dated Nov. 7, 2017, 15 pages.

Invitation to Pay Additional Fees and partial International Search Report in International Appln. No. PCT/US2017/045631, dated Nov. 7, 2017, 12 pages.

Office Action in CN Appln. No. 201780062254, dated Oct. 10, 2020, 5 pages (with English translation).

Office Action in CN Appln. No. 201780062254.8, dated May 24, 2021, 11 pages (with English translation).

Office Action in CN Appln. No. 202110394324.8, dated Mar. 16, 2022, 17 pages with English Translation.

(56) References Cited

OTHER PUBLICATIONS

O'Neill, "Scotch Yoke Piston Actuators," Automated & Manual Valves and Flow Meters, Assured Automation, Nov. 27, 2012, 4 pages.

* cited by examiner

MULTI-AXIS ROTARY PISTON ACTUATOR

CROSS-REFERENCE TO RELATED APPLICATION(S)

This application is a continuation of and claims the benefit of priority to U.S. patent application Ser. No. 16/791,668, filed Feb. 14, 2020, which is a continuation of U.S. patent application Ser. No. 15/669,314, now issued as U.S. Pat. No. 10,655,303 on May 19, 2020, which claims the benefit of priority to U.S. Provisional Patent Application Ser. No. 62/371,317, filed Aug. 5, 2016 and U.S. Provisional Patent Application Ser. No. 62/449,879, filed Jan. 24, 2017, the contents of which are hereby incorporated by reference.

TECHNICAL FIELD

This invention relates to an actuator device and more particularly to a rotary piston type actuator device wherein the pistons of the rotor are moved by fluid under pressure.

BACKGROUND

Linear hydraulic actuators of various forms are currently used in industrial mechanical power conversion applications. One common industrial usage is in construction equipment (e.g., excavators, backhoes) in which the linear action of a hydraulic piston is converted to rotary motion about a joint.

In certain applications, such as the actuators used for heavy equipment operation, increased actuation speed, wide ranges of motion, efficiency of fluid power usage, and ease of maintenance are desired. However, despite their widespread use, it can be difficult to provide such characteristics in typical heavy equipment applications of linear hydraulic actuators, e.g., on the arm and bucket of an excavator.

Rotary hydraulic actuators of various forms are also currently used in other types of industrial mechanical power conversion applications. This industrial usage is commonly for applications where continuous inertial loading is desired without the need for load holding for long durations, e.g., aircraft using rotary vane actuators on flight control surfaces, and applications where load holding is not an issue, e.g., backhoes using hydraulic motors to pivot the house or boom horizontally relative to the undercarriage. The designs of such actuators, however, do not scale well to provide the combinations of power-to-weight ratios, field-serviceability features, stiffnesses, holding capacities, torque-to-weight ratios, slew rates, energy efficiency, and/or the field-serviceability typically expected by heavy equipment operators for use elsewhere in their equipment, e.g., actuation of vertical joints of the arm.

SUMMARY

In general, this document relates to rotary piston-type actuators.

In a first aspect, a rotary piston actuator assembly comprises a first rotary actuator comprising a first housing defining a first arcuate chamber comprising a first cavity having a first open end, and an arcuate-shaped first piston disposed in said first housing for reciprocal movement in the first arcuate chamber through the first open end, and a first arcuate bearing sleeve assembly having an inner surface configured to be contacted by a radially outer side of the first piston.

In a second aspect, according the aspect one, the first arcuate bearing sleeve comprises an arcuate support portion and an arcuate liner portion configured to conform to an inner surface of the arcuate support portion.

In a third aspect, according to aspect one or two, the first arcuate bearing sleeve assembly is removably affixed to the first housing.

In a fourth aspect, according to any one of aspects one to three, the first rotary actuator further comprises a rotor assembly rotatably surrounding said first housing and defining a first central bore within an inner wall of the rotor assembly, and wherein the first arcuate bearing sleeve assembly is arranged radially between the first piston and the inner wall, and in contact with the radially outer side of the first piston and the inner wall.

In a fifth aspect, according to aspect four, the first arcuate bearing sleeve assembly is arranged radially between the first piston and the inner wall, in contact with the radially outer side of the first piston and the inner wall.

In a sixth aspect, according to aspect four or five, the rotary actuator further comprises a fluid delivery shaft having an elongated body, the fluid delivery shaft being disposed in a second central bore defined by the first housing and in fluid communication with the first cavity.

In a seventh aspect, according to any one of aspects four to six, the rotor assembly further comprises a rotary output tube about the axis and a rotor arm in contact with a first portion of the first piston, said rotor arm extending radially outward to the rotary output tube and coupled to the rotary output tube.

In an eighth aspect, according to any one of aspects four to seven, the rotary actuator further comprises a second rotary actuator disposed within the first central bore.

In a ninth aspect, according to aspect eight, the second rotary actuator further comprises a second housing defining a second arcuate chamber comprising a second cavity having a second open end, and an arcuate-shaped second piston disposed in said second housing for reciprocal movement in the second arcuate chamber through the second open end.

In a tenth aspect, according to aspect nine, the rotary actuator further comprises a second arcuate bearing sleeve assembly, arranged radially between the second piston and the inner wall, in contact with a radially outer side of the second piston and the inner wall.

In an eleventh aspect, according to any one of aspects one to ten, the first arcuate bearing sleeve comprises a collection of bearings.

In a twelfth aspect, according to any one of aspects one to eleven, the first arcuate bearing sleeve comprises a friction-reducing coating.

In a thirteenth aspect, a method of rotary actuation comprises providing a first rotary actuator comprising a first housing defining first arcuate chamber comprising a first cavity having a first open end, and an arcuate-shaped first piston disposed in said first housing for reciprocal movement in the first arcuate chamber through the first open end, wherein a first seal, the first cavity, and the first piston define a first pressure chamber comprising part or all of the first arcuate chamber, and a first arcuate bearing sleeve assembly having an inner surface configured to be contacted by a radially outer side of the first piston, urging the first piston partially rotationally outward from the first pressure chamber, and applying, by the first arcuate bearing sleeve portion, a first radial force to the radially outer side of the piston.

In a fourteenth aspect, according to aspect thirteen, the method further comprises urging the first piston partially radially outward, contacting the first piston to the first arcuate bearing sleeve assembly with a second radial force, transmitting the second radial force to the first housing, and constraining, by first arcuate bearing sleeve assembly, the second radial force.

In a fifteenth aspect, according to aspects thirteen or fourteen, the method further comprises providing a second rotary actuator, wherein the rotor assembly rotatably surrounds the first rotary actuator and the second rotary actuator.

In a sixteenth aspect, according to any one of aspects thirteen to fifteen, the method further comprises redirecting the first radial force through the first arcuate bearing sleeve assembly to a rotor assembly rotatably surrounding said first housing and defining a central bore within an inner wall of the rotor assembly, wherein the first arcuate bearing sleeve assembly is removably affixed to the first housing.

In a seventeenth aspect, according to any one of aspects thirteen to sixteen, the method further comprising redirecting the first radial force through the first arcuate bearing sleeve assembly to the first housing, wherein the first arcuate bearing sleeve assembly is removably affixed to the first housing.

In a eighteenth aspect, according to any one of aspects thirteen to seventeen, applying, by the first arcuate bearing sleeve portion, a first radial force to the radially outer side of the piston further comprises applying the first radial force to a collection of bearings in contact with the radially outer side of the piston.

In a nineteenth aspect, according to any one of aspects thirteen to eighteen, the first arcuate bearing sleeve portion comprises a friction-reducing coating, and wherein applying, by the first arcuate bearing sleeve portion, a first radial force to the radially outer side of the piston further comprises applying the first radial force to the friction-reducing coating in contact with the radially outer side of the piston.

In a twentieth aspect, a fluid actuator comprising a housing defining a first chamber comprising a first cavity, a first fluid port in fluid communication with the first cavity, and a first open end, a first piston assembly comprising a tubular first piston defining a second chamber comprising a second cavity, a second fluid port in fluid communication with the second cavity, and a second open end, disposed in said first housing for reciprocal movement in the first chamber through the first open end, wherein a first seal, the first cavity, and the first piston define a first pressure chamber, and a second piston assembly comprising an second piston disposed in said first piston assembly for reciprocal movement in the second chamber through the second open end, wherein a second seal, the second cavity, and the second piston define a second pressure chamber, and a first portion of the second piston contacts a first end effector.

In a twenty-first aspect, according to aspect twenty, the first chamber is an arcuate first chamber comprising the first open end and a first enclosed end, the tubular first piston is an arcuate-shaped tubular first piston, the second chamber is an arcuate second chamber comprising the second open end and a second enclosed end, the second piston is an arcuate-shaped second piston, and the end effector is a rotor arm.

In a twenty-second aspect, according to aspect twenty or twenty-one, the housing further defines a third arcuate chamber comprising a third cavity, a third fluid port in fluid communication with the third cavity, and a third open end, the first piston assembly further comprises an arcuate-shaped tubular third piston defining a fourth arcuate chamber comprising a fourth cavity, a fourth fluid port in fluid communication with the fourth cavity, and a fourth open end, disposed in said first housing for reciprocal movement in the third arcuate chamber through the third open end, wherein a third seal, the third cavity, and the third piston define a third pressure chamber, and the second piston assembly further comprises an arcuate-shaped fourth piston disposed in said first piston assembly for reciprocal movement in the fourth arcuate chamber through the fourth open end, wherein a fourth seal, the fourth cavity, and the fourth piston define a fourth pressure chamber, and a first portion of the fourth piston contacts a second end effector.

In a twenty-third aspect, according to aspect twenty-two, the fluid actuator further comprises a rotor arm, wherein the first chamber is an arcuate first chamber, the tubular first piston is an arcuate-shaped tubular first piston, the second chamber is an arcuate second chamber, the second piston is an arcuate-shaped second piston, the third chamber is an arcuate third chamber, the tubular third piston is an arcuate-shaped tubular third piston, the fourth chamber is an arcuate fourth chamber, the fourth piston is an arcuate-shaped fourth piston, the first end effector is the rotor arm, and the second end effector is the rotor arm.

In a twenty-fourth aspect, according to aspect twenty-three, the second piston is oriented in the same rotational direction as the first piston.

In a twenty-fifth aspect, according to aspect twenty-three, the second piston is oriented in the opposite rotational direction as the first piston.

In a twenty-sixth aspect, according to aspect twenty-three, application of pressurized fluid to the third pressure chamber urges the third piston partially outward from the third pressure chamber to urge rotation of the first piston assembly in a first direction, application of pressurized fluid to the fourth pressure chamber urges the fourth piston partially outward from the fourth pressure chamber to urge rotation of the second piston assembly in the first direction, rotation of the second piston assembly in a second direction opposite that of the first direction urges the fourth piston partially into the fourth pressure chamber to urge pressurized fluid out the fourth fluid port, and rotation of the first piston assembly in the second direction urges the third piston partially into the third pressure chamber to urge pressurized fluid out the third fluid port.

In a twenty-seventh aspect, according to any one of aspects twenty-one to twenty-six, the housing further defines an arcuate actuation space defining an actuation arc about the axis between the first open end and a terminal end, and the fluid actuator further comprises a rotor assembly comprising a rotary output tube rotatably surrounding said housing, wherein the rotor arm extends radially outward to the rotary output tube and the rotor arm is coupled to the rotary tube.

In a twenty-eighth aspect, according to any one of aspects twenty-one to twenty-seven, the first seal is disposed about an interior surface of the first open end.

In a twenty-ninth aspect, according to any one of aspects twenty-one to twenty-eight, the first seal is disposed about the periphery of the first piston and is configured to remain stationary relative to the first piston.

In a thirtieth aspect, according to any one of aspects twenty-one to twenty-nine, the second seal is disposed about an interior surface of the second open end.

In a thirty-first aspect, according to any one of aspects twenty-one to thirty, the second seal is disposed about the periphery of the second piston and is configured to remain stationary relative to the second piston.

In a thirty-second aspect, according to any one of aspects twenty-one to thirty-one, the housing is formed as a one-piece housing.

In a thirty-third aspect, according to any one of aspects twenty-one to thirty-two, the first piston has one of a square, rectangular, ovoid, elliptical, figure-eight, or circular shape in cross-section.

In a thirty-fourth aspect, according to any one of aspects twenty-one to thirty-three, the first piston assembly further defines a fluid port fluidically connecting the first cavity and the second cavity.

In a thirty-fifth aspect, according to any one of aspects twenty-one to thirty-four, a first portion of the tubular first piston contacts a second end effector.

In a thirty-sixth aspect, a method of fluid actuation comprises providing a fluid actuator comprising a housing defining a first chamber comprising a first cavity, a first fluid port in fluid communication with the first cavity, and a first open end, a first piston assembly comprising a tubular first piston defining a second chamber comprising a second cavity, a second fluid port in fluid communication with the second cavity, and a second open end, disposed in said first housing for reciprocal movement in the first chamber through the first open end, wherein a first seal, the first cavity, and the first piston define a first pressure chamber, and a second piston assembly comprising an second piston disposed in said first piston assembly for reciprocal movement in the second chamber through the second open end, wherein a second seal, the second cavity, and the second piston define a second pressure chamber, and a first portion of the second piston contacts a first end effector, applying pressurized fluid to the first pressure chamber, urging the first piston partially outward from the first pressure chamber to urge the end effector in a first direction, urging the end effector in a second direction opposite that of the first direction, urging the first piston partially into the first pressure chamber to urge pressurized fluid out the first fluid port, applying pressurized fluid to the second pressure chamber, urging the second piston partially outward from the second pressure chamber to urge the first piston assembly in the first direction, urging the first piston assembly in the second direction, and urging the second piston partially into the second pressure chamber to urge pressurized fluid out the second fluid port.

In a thirty-seventh aspect, according to aspect thirty-six, the first chamber is an arcuate first chamber comprising the first open end and a first enclosed end, the tubular first piston is an arcuate-shaped tubular first piston, the second chamber is an arcuate second chamber comprising the second open end and a second enclosed end, the second piston is an arcuate-shaped second piston, the end effector is a rotor arm, urging the first piston partially outward from the first pressure chamber to urge the end effector in a first direction further comprises rotating the rotor arm in the first direction with substantially constant torque over stroke, and urging the second piston partially outward from the second pressure chamber to urge the first piston assembly in the first direction further comprises rotating the first piston assembly in the first direction with substantially constant torque over stroke.

In a thirty-eighth aspect, an arm of a machine apparatus comprises a first arm portion, a second arm portion, and a joint portion connecting the first arm portion to the second arm portion, the joint portion comprising a fluid actuator comprising, a housing defining a first chamber comprising a first cavity, a first fluid port in fluid communication with the first cavity, and a first open end, a first piston assembly comprising a tubular first piston defining a second chamber comprising a second cavity, a second fluid port in fluid communication with the second cavity, and a second open end, disposed in said first housing for reciprocal movement in the first chamber through the first open end, wherein a first seal, the first cavity, and the first piston define a first pressure chamber, and a second piston assembly comprising an second piston disposed in said first piston assembly for reciprocal movement in the second chamber through the second open end, wherein a second seal, the second cavity, and the second piston define a second pressure chamber, and a first portion of the second piston contacts a first end effector.

In a thirty-ninth aspect, according to aspect thirty-eight, the end effector is affixed to or is integral to the first arm portion.

In a fortieth aspect, according to aspect thirty-eight or thirty-nine, the housing is affixed to or is integral to the second arm portion.

In a forty-first aspect, multi-axis rotary actuator comprises a first rotary piston actuator configured to controllably actuate a first pivotal joint between a first linkage to a second linkage about a first axis, and a second rotary piston actuator configured to controllably actuate a second pivotal joint connecting the second linkage to a third linkage about a second axis.

In a forty-second aspect, according to aspect forty-one, the first axis is parallel to the second axis.

In a forty-third aspect, according to aspect forty-one, the first axis is perpendicular to the second axis.

In a forty-fourth aspect, according to aspect forty-one, the first axis intersects the second axis.

In a forty-fifth aspect, according to any one of aspects forty-one to forty-four, at least one of the first rotary piston actuator and the second rotary piston actuator comprises a housing defining a first arcuate chamber comprising a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber comprising part or all of the first arcuate chamber, and a first portion of the first piston contacts the rotor arm, and a rotor assembly rotatably surrounding said housing and comprising a rotary cylinder about the axis, wherein the rotor arm extends radially outward to the rotary cylinder and the rotor arm is coupled to the rotary cylinder, wherein the housing is coupled to a selected one of the first linkage, the second linkage, or the third linkage, and the rotor assembly is coupled to another one of the first linkage, the second linkage, or the third linkage.

In a forty-sixth aspect, according to aspect forty-five, the multi-axis rotary actuator further comprises a second arcuate chamber comprising a second cavity defining a second arc about the axis between a second open end and a second enclosed end and having a second fluid port in fluid communication with the second cavity.

In a forty-seventh aspect, according to aspect forty-six, the second arc has a second radius from the axis, different from the first radius.

In a forty-eighth aspect, according to aspect forty-seven, the second arc is concentric with the first arc about the axis in the plane.

In a forty-ninth aspect, according to aspect forty-eight, the second open end is at the terminal end, and the arcuate chamber is oriented rotationally opposite to the first arcuate chamber about the axis.

In a fiftieth aspect, according to aspect forty-eight, the second arc is not in the plane and at least a portion of the second arcuate chamber overlaps axially with the first arcuate chamber in the plane.

In a fifty-first aspect, according to aspect forty-eight, the multi-axis rotary actuator further comprises an arcuate-shaped second piston disposed in said second housing for reciprocal movement in the second arcuate chamber through the second open end, wherein a second seal, the second cavity, and the second piston define a second pressure chamber comprising part or all of the second arcuate chamber, and a second portion of the second piston contacts the rotor arm.

In a fifty-second aspect, according to any one of aspects forty-five to fifty-one, the rotor assembly provides load bearing support for the housing.

In a fifty-third aspect, according to any one of aspects forty-five to fifty-two, at least one of the first rotary piston actuator and the second rotary piston actuator comprises a housing defining a first arcuate chamber housing defining a first arcuate chamber comprising a first cavity defining a first ring segment in a plane between a first open end and a first enclosed end and having a first fluid port in fluid communication with the first cavity, the ring segment having a first outer radius in the plane, the first radius defining an axis perpendicular to the plane, a first inner radius in the plane, and a first central radius in the plane, a second arcuate chamber comprising an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, a rotor arm configured for rotary movement within the actuation space along the third arc, a rotor assembly coupled to the rotor arm, an arcuate-shaped first piston disposed in said first housing for reciprocal movement in the first arcuate chamber and in the plane through the first open end, wherein a first seal, the first cavity, and the first piston define a first pressure chamber, and a first portion of the first piston contacts a rotor arm, and a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm, wherein the housing is coupled to a selected one of the first linkage, the second linkage, or the third linkage, and the rotor assembly is coupled to another one of the first linkage, the second linkage, or the third linkage.

In a fifty-fourth aspect, a method of multi-axis rotary actuation comprises providing a multi-axis rotary actuator comprising a first rotary piston actuator configured to controllably actuate a first pivotal joint between a first linkage to a second linkage about a first axis, and a second rotary piston actuator configured to controllably actuate a second pivotal joint connecting the second linkage to a third linkage about a second axis, applying pressurized fluid to the first rotary piston actuator, urging actuation of the first pivotal joint about the first axis in a first direction, urging actuation of the first pivotal joint about the first axis in a second direction opposite that of the first direction, applying pressurized fluid to the second rotary piston actuator, urging actuation of the second pivotal joint about the second axis in a third direction, and urging actuation of the second pivotal joint about the second axis in a fourth direction opposite that of the third direction.

In a fifty-fifth aspect, according to aspect fifty-four, applying pressurized fluid to the first rotary piston actuator further comprises applying pressurized fluid to a first pressure chamber of the first rotary piston actuator configured to urge actuation of the first pivotal joint in the first direction, and wherein applying pressurized fluid to the second rotary piston actuator further comprises applying pressurized fluid to a third pressure chamber of the second rotary piston actuator configured to urge actuation of the second pivotal joint in the third direction, and the method further comprises applying pressurized fluid to a second pressure chamber of the first rotary piston actuator configured to urge actuation of the first pivotal joint in the second direction, urging actuation of the first pivotal joint about the first axis in the second direction, applying pressurized fluid to a fourth pressure chamber of the second rotary piston actuator configured to urge actuation of the first pivotal joint in the second direction, and urging actuation of the second pivotal joint about the second axis in the fourth direction.

In a fifty-sixth aspect, an arm of a machine apparatus comprises a first arm portion, a second arm portion, and a joint portion pivotally connecting the first arm portion to the second arm portion, the joint portion comprising a multi-axis rotary actuator comprising a first rotary piston actuator configured to controllably actuate a first pivotal joint between a first linkage to a second linkage about a first axis, and a second rotary piston actuator configured to controllably actuate a second pivotal joint connecting the second linkage to a third linkage about a second axis.

In a fifty-seventh aspect, according to aspect fifty-six, the first axis is parallel to the second axis.

In a fifty-eighth aspect, according to aspect fifty-six, the first axis is perpendicular to the second axis.

In a fifty-ninth aspect, according to aspect fifty-six, the first axis intersects the second axis.

In a sixtieth aspect, according to any one of aspects fifty-six to fifty-nine, at least one of the first rotary piston actuator and the second rotary piston actuator comprises a housing defining a first arcuate chamber comprising a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber comprising part or all of the first arcuate chamber, and a first portion of the first piston contacts the rotor arm, and a rotor assembly rotatably surrounding said housing and comprising a rotary cylinder about the axis, wherein the rotor arm extends radially outward to the rotary cylinder and the rotor arm is coupled to the rotary cylinder, wherein the housing is coupled to a selected one of the first linkage, the second linkage, or the third linkage, and the rotor assembly is coupled to another one of the first linkage, the second linkage, or the third linkage.

In a sixty-first aspect, a rotary piston actuator assembly comprises a first rotary actuator comprising a first housing defining a first central bore, and a first arcuate chamber comprising a first cavity having a first actuator fluid port in fluid communication with the first cavity and the first central bore, a rotor arm, an arcuate-shaped first piston disposed in said first housing for reciprocal movement in the first housing, wherein a first seal, the first cavity, and the first piston define a first pressure chamber comprising part or all of the first arcuate chamber, and a first portion of the first piston contacts the rotor arm, a rotor assembly rotatably surrounding said first housing and comprising a rotary output tube, wherein the rotor arm extends radially outward to the rotary output tube and the rotor arm is coupled to the rotary tube, and a fluid delivery shaft having an elongated body disposed in said first central bore and defining a first shaft fluid delivery path.

In a sixty-second aspect, according to aspect sixty-one, the rotary piston actuator assembly further comprises a second rotary actuator comprising a second housing defining a second central bore, a second arcuate chamber comprising a second cavity having a second actuator fluid port in fluid communication with the second cavity and the second central bore, and an arcuate-shaped second piston disposed in said second housing for reciprocal movement in the second housing, wherein a second seal, the second cavity, and the second piston define a second pressure chamber comprising part or all of the second arcuate chamber, and a first portion of the second piston contacts the rotor arm, wherein the rotor assembly rotatably surrounds said second housing, and the fluid delivery shaft is disposed in said second central bore.

In a sixty-third aspect, according to aspect sixty-one or sixty-two, the fluid delivery shaft defines an axis and comprises a first shaft fluid port along the body, a second shaft fluid port near a terminal end of the body, and the first shaft fluid delivery path defined by the fluid delivery shaft and fluidly connecting the first shaft fluid port to the second shaft fluid port, a first shaft seal disposed about the fluid delivery shaft on a first axial side of the first shaft fluid port along the axis, a second shaft seal disposed about the fluid delivery shaft on a second axial side of the first shaft fluid port along the axis and opposite the first shaft seal, wherein the first central bore, the body, the first shaft fluid seal, and the second shaft fluid seal define a first fluid transmission chamber, and the first actuator fluid port is in fluidic communication with the first fluid transmission chamber.

In a sixty-fourth aspect, according to aspect sixty-three, the first central bore further defines a first bore portion and a second bore portion, wherein the first bore portion extends along substantially a first half of the axial length of the first central bore, and the second bore portion extends along substantially the second half of the axial length of the first central bore, and the first actuator fluid port is defined within the first bore portion, wherein the first fluid transmission chamber extends along substantially one half of the axial length of the first central bore such that the first fluid transmission chamber extends along the first bore portion in a first assemblage of the first rotary actuator and the fluid delivery shaft, and the first fluid transmission chamber extends along the second bore portion in a second assemblage of the first rotary actuator and the fluid delivery shaft.

In a sixty-fifth aspect, according to any one of aspects sixty-one to sixty-four, the first arcuate chamber further defines a first open end, and the first piston further comprises a first piston assembly comprising a tubular first piston defining a second chamber comprising a second cavity, a second fluid port in fluid communication with the second cavity, and a second open end, disposed in said first housing for reciprocal movement in the first chamber through the first open end, wherein a first seal, the first cavity, and the first piston define a first pressure chamber, and the rotary piston actuator further comprises a second piston assembly comprising an second piston disposed in said first piston assembly for reciprocal movement in the second chamber through the second open end, wherein a second seal, the second cavity, and the second piston define a second pressure chamber, and a first portion of the second piston contacts a first end effector.

In a sixty-sixth aspect, according to any one of aspects sixty-one to sixty-five, the first cavity defines a first arc in a plane between a first open end and a first enclosed end and having a first fluid port in fluid communication with the first cavity, the first arc having a first radius in the plane, the first radius defining an axis perpendicular to the plane, and the first housing further defines an arcuate actuation space defining an actuation arc about the axis between the first open end and a terminal end, wherein the rotor arm is configured for rotary movement within the actuation space along a second arc, and the first piston is disposed in said first housing for reciprocal movement in the first arcuate chamber and in the plane through the first open end, wherein the first seal, the first cavity, and the first piston define the first pressure chamber comprising part or all of the first arcuate chamber.

In a sixty-seventh aspect, according to any one of aspects sixty-one to sixty-six, the first housing comprises a first arcuate chamber housing defining the first arcuate chamber, wherein the first cavity defines a first ring segment in a plane between a first open end and a first enclosed end, the ring segment having a first outer radius in the plane and defining an axis perpendicular to the plane, a first inner radius in the plane about the axis, and a first central radius in the plane, wherein the first housing further defines a second arcuate chamber comprising an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, and the rotor arm is configured for rotary movement within the actuation space along the third arc, wherein the arcuate-shaped first piston disposed in said first housing for reciprocal movement in the first arcuate chamber and in the plane through the first open end, wherein the first seal, the first cavity, and the first piston define the first pressure chamber, and wherein the rotary piston actuator assembly further comprises a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm.

In a sixty-eighth aspect, a method of rotary actuation comprises providing a first rotary actuator comprising a first housing defining a first central bore, and a first arcuate chamber comprising a first cavity having a first actuator fluid port in fluid communication with the first cavity and the first central bore, a rotor arm, an arcuate-shaped first piston disposed in said first housing for reciprocal movement in the first housing, wherein a first seal, the first cavity, and the first piston define a first pressure chamber comprising part or all of the first arcuate chamber, and a first portion of the first piston contacts the rotor arm, a rotor assembly rotatably surrounding said first housing and comprising a rotary output tube, wherein the rotor arm extends radially outward to the rotary output tube and the rotor arm is coupled to the rotary tube, and a fluid delivery shaft having an elongated body disposed in said first central bore and defining a first shaft fluid delivery path, providing pressurized fluid to the second shaft fluid port, urging pressurized fluid to the first pressure chamber through the first shaft fluid delivery path, the first shaft fluid port, the first fluid transmission chamber, and the first fluid port, urging the first piston partially outward from the first pressure chamber to urge rotation of the rotor assembly in a first direction, rotating the rotor assembly in a second direction opposite that of the first direction, and urging the first piston partially into the first pressure chamber to urge pressurized fluid out the second shaft fluid port through the first fluid port, the first fluid transmission chamber, the first shaft fluid port, and the first shaft fluid delivery path.

In a sixty-ninth aspect, according to aspects sixty-eight, the method further comprises disassembling the first rotary actuator from a first assembly configuration with the fluid delivery shaft, reassembling the first rotary actuator to the fluid delivery shaft in a second configuration, providing pressurized fluid to the second shaft fluid port, urging pressurized fluid to the first pressure chamber through the first shaft fluid delivery path, the first shaft fluid port, the first fluid transmission chamber, and the first fluid port, urging the first piston partially outward from the first pressure chamber to urge rotation of the rotor assembly in the second direction, rotating the rotor assembly in the direction opposite that of the second direction, and urging the first piston partially into the first pressure chamber to urge pressurized fluid out the second shaft fluid port through the first fluid port, the first fluid transmission chamber, the first shaft fluid port, and the first shaft fluid delivery path.

In a seventieth aspect, according to aspect sixty-eight or sixty-nine, the first central bore defines a first bore portion and a second bore portion, wherein the first bore portion extends along substantially a first half of the axial length of the first central bore, and the second bore portion extends along substantially the second half of the axial length of the first central bore, and the first actuator fluid port is defined within the first bore portion; and wherein the first fluid transmission chamber extends along substantially one half of the axial length of the first central bore such that the first fluid transmission chamber extends along the first bore portion in a first assemblage of the first rotary actuator and the fluid delivery shaft, and the first fluid transmission chamber extends along the second bore portion in a second assemblage of the first rotary actuator and the fluid delivery shaft.

In a seventy-first aspect, according to aspect seventy, the method further comprises disassembling the first rotary actuator from a first assembly configuration with the fluid delivery shaft, wherein the first central bore portion, the body, the first shaft fluid seal, and the second shaft fluid seal define the first fluid transmission chamber in the first configuration, reassembling the first rotary actuator to the fluid delivery shaft in a second configuration, wherein the second central bore portion, the body, the first shaft fluid seal, and the second shaft fluid seal define the first fluid transmission chamber in the second configuration, providing pressurized fluid to the second shaft fluid port, and blocking flow of pressurized fluid by the first pressure chamber.

In a seventy-second aspect, an arm of a machine apparatus comprises a first arm portion, a second arm portion, and a joint portion pivotally connecting the first arm portion to the second arm portion, the joint portion comprising a first rotary actuator comprising a first housing defining a first central bore, and a first arcuate chamber comprising a first cavity having a first actuator fluid port in fluid communication with the first cavity and the first central bore, and a rotor arm, an arcuate-shaped first piston disposed in said first housing for reciprocal movement in the first housing, wherein a first seal, the first cavity, and the first piston define a first pressure chamber comprising part or all of the first arcuate chamber, and a first portion of the first piston contacts the rotor arm, a rotor assembly rotatably surrounding said first housing and comprising a rotary output tube, wherein the rotor arm extends radially outward to the rotary output tube and the rotor arm is coupled to the rotary tube, and a fluid delivery shaft having an elongated body disposed in said first central bore and defining a first shaft fluid delivery path.

In a seventy-third aspect, according to aspect seventy-two, the rotor assembly is affixed to or is integral to the first arm portion.

In a seventy-fourth aspect, according to aspect seventy-two or seventy-three, the housing is affixed to or is integral to the second arm portion.

In a seventy-fifth aspect, according to any one of aspects seventy-two to seventy-four, the arm further comprises a second rotary actuator comprising a second housing defining a second central bore, a second arcuate chamber comprising a second cavity having a second actuator fluid port in fluid communication with the second cavity and the second central bore, and an arcuate-shaped second piston disposed in said second housing for reciprocal movement in the second housing, wherein a second seal, the second cavity, and the second piston define a second pressure chamber comprising part or all of the second arcuate chamber, and a first portion of the second piston contacts the rotor arm, wherein the rotor assembly rotatably surrounds said second housing, and the fluid delivery shaft is disposed in said second central bore.

In a seventy-sixth aspect, according to any one of aspects seventy-two to seventy-five, the fluid delivery shaft defines an axis and comprises a first shaft fluid port along the body, a second shaft fluid port near a terminal end of the body, and the first shaft fluid delivery path defined by the fluid delivery shaft and fluidly connecting the first shaft fluid port to the second shaft fluid port, a first shaft seal disposed about the fluid delivery shaft on a first axial side of the first shaft fluid port along the axis, a second shaft seal disposed about the fluid delivery shaft on a second axial side of the first shaft fluid port along the axis and opposite the first shaft seal, wherein the first central bore, the body, the first shaft fluid seal, and the second shaft fluid seal define a first fluid transmission chamber, and the first actuator fluid port is in fluidic communication with the first fluid transmission chamber.

In a seventy-seventh aspect, according to aspect seventy-six, the first central bore further defines a first bore portion and a second bore portion, wherein the first bore portion extends along substantially a first half of the axial length of the first central bore, and the second bore portion extends along substantially the second half of the axial length of the first central bore, and the first actuator fluid port is defined within the first bore portion, wherein the first fluid transmission chamber extends along substantially one half of the axial length of the first central bore such that the first fluid transmission chamber extends along the first bore portion in a first assemblage of the first rotary actuator and the fluid delivery shaft, and the first fluid transmission chamber extends along the second bore portion in a second assemblage of the first rotary actuator and the fluid delivery shaft.

In a seventy-eighth aspect, a rotary actuator comprises a housing defining a first arcuate chamber housing defining a first arcuate chamber comprising a first cavity defining a first ring segment in a plane between a first open end and a first enclosed end and having a first fluid port in fluid communication with the first cavity, the ring segment having a first outer radius in the plane and defining an axis perpendicular to the plane, a first inner radius in the plane about the axis, and a first central radius in the plane, a second arcuate chamber comprising an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, a rotor arm configured for rotary movement within the actuation space along the third arc, a rotor assembly coupled to the rotor arm, an arcuate-shaped first piston disposed in said first housing for reciprocal movement in the first arcuate chamber and in the plane through the first open end, wherein a first seal, the first cavity, and the first piston define a first pressure chamber, and a first portion of the first piston contacts a rotor arm, and a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm.

In a seventy-ninth aspect, according to aspect seventy-eight, at least a portion of the second arcuate chamber overlaps axially with the first arcuate chamber in the plane.

In an eightieth aspect, according to aspect seventy-eight or seventy-nine, the rotor assembly is rotatably journaled in said housing and comprises a rotary output shaft along the axis, wherein the rotor arm extends radially inward to the rotary output shaft and the rotor arm is coupled to the rotary output shaft.

In an eighty-first aspect, according to any one of aspects seventy-eight to eighty, the rotor assembly rotatably surrounds said housing and comprises a rotary output cylinder about the axis, wherein the rotor arm extends radially outward to the rotary output cylinder and the rotor arm is coupled to the rotary output cylinder.

In an eighty-second aspect, according to any one of aspects seventy-eight to eighty-one, the first seal is disposed about an interior surface of the open end and is configured to remain stationary relative to the open end.

In an eighty-third aspect, according to any one of aspects seventy-eight to eighty-two, the first seal is disposed about the periphery of the first piston and is configured to remain stationary relative to the first portion.

In an eighty-fourth aspect, according to any one of aspects seventy-eight to eighty-three, the first seal provides load bearing support for the first piston.

In an eighty-fifth aspect, according to any one of aspects seventy-eight to eighty-four, the rotor assembly provides load bearing support for the housing.

In an eighty-sixth aspect, according to any one of aspects seventy-eight to eighty-five, the housing is formed as a one-piece housing.

In an eighty-seventh aspect, according to any one of aspects seventy-eight to eighty-six, the first seal is a one-piece seal.

In an eighty-eighth aspect, according to any one of aspects seventy-eight to eighty-seven, the first piston is solid in cross-section.

In an eighty-ninth aspect, according to any one of aspects seventy-eight to eighty-eight, at least one of the first piston and the second piston is at least partly hollow in cross-section.

In an ninetieth aspect, according to any one of aspects seventy-eight to eighty-nine, the first piston has one of a square, rectangular, ovoid, elliptical, figure-eight, or circular shape in cross-section.

In a ninety-first aspect, a method of rotary actuation comprises providing a rotary actuator comprising a housing defining a first arcuate chamber housing defining a first arcuate chamber comprising a first cavity defining a first ring segment in a plane between a first open end and a first enclosed end and having a first fluid port in fluid communication with the first cavity, the ring segment having a first outer radius in the plane and defining an axis perpendicular to the plane, a first inner radius in the plane about the axis, and a first central radius in the plane, a second arcuate chamber comprising an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, a rotor arm configured for rotary movement within the actuation space along the third arc, a rotor assembly coupled to the rotor arm, an arcuate-shaped first piston disposed in said first housing for reciprocal movement in the first arcuate chamber and in the plane through the first open end, wherein a first seal, the first cavity, and the first piston define a first pressure chamber, and a first portion of the first piston contacts a rotor arm, and a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm, applying pressurized fluid to the first pressure chamber, urging the first piston partially outward from the first pressure chamber to urge movement of the rotor arm in a first direction, rotating the rotor arm in a second direction opposite that of the first direction, and urging the first piston partially into the first pressure chamber to urge pressurized fluid out the first fluid port.

In a ninety-second aspect, according to aspect ninety-one, rotating the rotor arm in a second direction opposite that of the first direction comprises applying pressurized fluid to the second pressure chamber, and urging the second piston partially outward from the second pressure chamber to urge movement of the rotor arm in a second direction opposite from the first direction.

In an ninety-third aspect, according to aspect ninety-one or ninety-two, urging the first piston partially outward from the first pressure chamber to urge movement of the rotor arm in a first direction further comprises moving the rotor arm in the first direction with substantially constant torque over stroke.

In a ninety-fourth aspect, an arm of a machine apparatus comprises a first arm portion, a second arm portion, and a joint portion pivotally connecting the first arm portion to the second arm portion, the joint portion comprising a rotary actuator comprising a housing defining a first arcuate chamber housing defining a first arcuate chamber comprising a first cavity defining a first ring segment in a plane between a first open end and a first enclosed end and having a first fluid port in fluid communication with the first cavity, the first ring segment having a first outer radius in the plane and defining an axis perpendicular to the plane, a first inner radius in the plane about the axis, and a first central radius in the plane, a second arcuate chamber comprising an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, a rotor arm configured for rotary movement within the actuation space along the third arc, a rotor assembly coupled to the rotor arm, an arcuate-shaped first piston disposed in said first housing for reciprocal movement in the first arcuate chamber and in the plane through the first open end, wherein a first seal, the first cavity, and the first piston define a first pressure chamber, and a first portion of the first piston contacts a rotor arm, and a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm.

In a ninety-fifth aspect according to aspect ninety-four, the rotor assembly is affixed to or is integral to the first arm portion.

In a ninety-sixth aspect, according to aspect ninety-four or ninety-five, the housing is affixed to or is integral to the second arm portion.

In a ninety-seventh aspect, a rotary actuator comprises a housing defining a first arcuate chamber comprising a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber comprising part or all of the first arcuate chamber, and a first portion of the first piston contacts the rotor arm, and a rotor assembly rotatably surrounding said housing and comprising a rotary output tube about the axis, wherein the rotor arm extends radially outward to the rotary output tube and the rotor arm is coupled to the rotary tube.

In a ninety-eighth aspect, according to aspect ninety-seven, the rotary actuator further comprises a second arcuate chamber comprising a second cavity defining a second arc about the axis between a second open end and a second enclosed end and having a second fluid port in fluid communication with the second cavity.

In a ninety-ninth aspect, according to aspect ninety-nine, the second arc has a second radius from the axis, different than the first radius.

In a one-hundredth aspect, according to aspect ninety-nine, the second arc is concentric with the first arc about the axis in the plane.

In a one-hundred-first aspect, according to aspect ninety-nine or one-hundred, the second open end is at the terminal end, and the arcuate chamber is oriented rotationally opposite to the first arcuate chamber about the axis.

In a one-hundred-second aspect, according to any one of aspects ninety-nine to one-hundred-one, the second arc is not in the plane and at least a portion of the second arcuate chamber overlaps axially with the first arcuate chamber in the plane.

In a one-hundred-third aspect, according to any one of aspects ninety-nine to one-hundred-two, the rotary actuator further comprises an arcuate-shaped second piston disposed in said second housing and configured for reciprocal movement in the second arcuate chamber through the second open end, wherein a second seal, the second cavity, and the second piston define a second pressure chamber comprising part or all of the second arcuate chamber, and a second portion of the second piston contacts the rotor arm.

In a one-hundred-fourth aspect, according to aspect one-hundred-three, application of pressurized fluid to the first pressure chamber urges the first piston partially outward from the first pressure chamber to urge rotation of the rotor arm in a first direction, and application of pressurized fluid to the second pressure chamber urges the second piston partially outward from the second pressure chamber to urge rotation of the rotor arm in a second direction.

In a one-hundred-fifth aspect, according to aspect one-hundred-three or one-hundred-four, at least one of the first piston and the second piston comprises the rotor arm.

In a one-hundred-sixth aspect, according to any of aspects ninety-seven to one-hundred-five, rotation of the rotor assembly urges the first piston partially into the first pressure chamber to pressurize a fluid and urge the fluid out of the first fluid port.

In a one-hundred-seventh aspect, according to any of aspects ninety-seven to one-hundred-six, the rotary tube comprises the rotor arm.

In a one-hundred-eighth aspect, according to any of aspects ninety-seven to one-hundred-seven, the rotary actuator further comprises a first housing seal ring groove defined in the rotor assembly about the axis, a second housing seal ring groove defined in the housing about the axis and complimentary to the first housing seal ring groove, and a ring-shaped seal between the rotor assembly and the housing within the first housing seal ring groove and the second housing seal ring groove.

In a one-hundred-ninth aspect, a method of rotary actuation comprises providing a rotary actuator comprising a housing defining a first arcuate chamber comprising a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber comprising part or all of the first arcuate chamber, and a first portion of the first piston contacts the rotor arm, and a rotor assembly rotatably surrounding said housing and comprising a rotary output tube about the axis, wherein the rotor arm extends radially outward to the rotary output tube and the rotor arm is coupled to the rotary tube, applying pressurized fluid to the first pressure chamber, urging the first piston partially outward from the first pressure chamber to urge rotation of the rotor assembly in a first direction, rotating the rotor assembly in a second direction opposite that of the first direction, and urging the first piston partially into the first pressure chamber to urge pressurized fluid out the first fluid port.

In a one-hundred-tenth aspect, according to aspect one-hundred-nine, the housing further defines a second arcuate chamber comprising a second cavity defining a second arc about the axis between a second open end and a second enclosed end and having a second fluid port in fluid communication with the second cavity, the rotary actuator further comprising an arcuate-shaped second piston disposed in said first housing for reciprocal movement in the second arcuate chamber, wherein a second seal, the second cavity, and the second piston define a second pressure chamber, and a first portion of the second piston contacts the second rotor arm.

In a one-hundred-eleventh aspect, according to aspect one-hundred-ten, the second piston is oriented in the same rotational direction as the first piston.

In a one-hundred-twelfth aspect, according to aspect one-hundred-ten, the second piston is oriented in the opposite rotational direction as the first piston.

In a one-hundred-thirteenth aspect, according to any of aspects one-hundred-ten to one-hundred twelve, rotating the rotor assembly in a second direction opposite that of the first direction comprises applying pressurized fluid to the second pressure chamber, and urging the second piston partially outward from the second pressure chamber to urge rotation of the rotor assembly in a second direction opposite from the first direction.

In a one-hundred-fourteenth aspect, according to any of aspects one-hundred-ten to one-hundred thirteen, rotating the rotor assembly in a second direction opposite that of the first direction comprises applying pressurized fluid to the second pressure chamber, and urging the first piston partially into the first pressure chamber to urge rotation of the rotor assembly in a second direction opposite from the first direction.

In a one-hundred-fifteenth aspect, according to any of aspects one-hundred-nine to one-hundred-fourteen, urging the first piston partially outward from the first pressure chamber to urge rotation of the rotor assembly in a first direction further comprises rotating the rotor assembly in the first direction with substantially constant torque over stroke.

In a one-hundred-sixteenth aspect, an arm of a machine apparatus comprises a first arm portion, a second arm portion, and a joint portion pivotally connecting the first arm portion to the second arm portion, the joint portion comprising a rotary actuator comprising a housing defining a first arcuate chamber comprising a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber comprising part or all of the first arcuate chamber, and a first portion of the first piston contacts the rotor arm, and a rotor assembly rotatably surrounding said housing and comprising a rotary output tube about the axis, wherein the rotor arm extends radially outward to the rotary output tube and the rotor arm is coupled to the rotary tube.

In a one-hundred-seventeenth aspect, according to aspect one-hundred-sixteen, the rotor assembly is affixed to or is integral to the first arm portion.

In a one-hundred-eighteenth aspect, according to aspect one-hundred-sixteen or one-hundred-seventeen, the housing is affixed to or is integral to the second arm portion.

An rotary piston actuator assembly includes a first rotary actuator including a first housing defining a first arcuate chamber including a first cavity having a first open end, and an arcuate-shaped first piston disposed in said first housing for reciprocal movement in the first arcuate chamber through the first open end, and a first arcuate bearing sleeve assembly having an inner surface configured to be contacted by a radially outer side of the first piston.

Various embodiments can include some, all, or none of the following features. The first arcuate bearing sleeve can include an arcuate support portion and an arcuate liner portion configured to conform to an inner surface of the arcuate support portion. The first arcuate bearing sleeve assembly can be removably affixed to the first housing. The first rotary actuator can also include a rotor assembly rotatably surrounding said first housing and defining a first central bore within an inner wall of the rotor assembly, and wherein the first arcuate bearing sleeve assembly is arranged radially between the first piston and the inner wall, and in contact with the radially outer side of the first piston and the inner wall. The first arcuate bearing sleeve assembly can be arranged radially between the first piston and the inner wall, in contact with the radially outer side of the first piston and the inner wall. The rotary actuator can also include a fluid delivery shaft having an elongated body, the fluid delivery shaft being disposed in a second central bore defined by the first housing and in fluid communication with the first cavity. The rotor assembly can also include a rotary output tube about the axis and a rotor arm in contact with a first portion of the first piston, said rotor arm extending radially outward to the rotary output tube and coupled to the rotary output tube. The rotary actuator can also include a second rotary actuator disposed within the first central bore. The second rotary actuator can include a second housing defining a second arcuate chamber having a second cavity having a second open end, and an arcuate-shaped second piston disposed in said second housing for reciprocal movement in the second arcuate chamber through the second open end. The rotary actuator can also include a second arcuate bearing sleeve assembly, arranged radially between the second piston and the inner wall, in contact with a radially outer side of the second piston and the inner wall. The first arcuate bearing sleeve can include a collection of bearings. The first arcuate bearing sleeve can include a friction-reducing coating.

An example method of rotary actuation includes providing a first rotary actuator including a first housing defining first arcuate chamber including a first cavity having a first open end, and an arcuate-shaped first piston disposed in said first housing for reciprocal movement in the first arcuate chamber through the first open end, wherein a first seal, the first cavity, and the first piston define a first pressure chamber including part or all of the first arcuate chamber, and a first arcuate bearing sleeve assembly having an inner surface configured to be contacted by a radially outer side of the first piston, urging the first piston partially rotationally outward from the first pressure chamber, and applying, by the first arcuate bearing sleeve portion, a first radial force to the radially outer side of the piston.

Various implementations can include some, all, or none of the following features. The method can also include urging the first piston partially radially outward, contacting the first piston to the first arcuate bearing sleeve assembly with a second radial force, transmitting the second radial force to the first housing, and constraining, by first arcuate bearing sleeve assembly, the second radial force. The method can also include providing a second rotary actuator, wherein the rotor assembly rotatably surrounds the first rotary actuator and the second rotary actuator. The method can also include redirecting the first radial force through the first arcuate bearing sleeve assembly to a rotor assembly rotatably surrounding said first housing and defining a central bore within an inner wall of the rotor assembly, wherein the first arcuate bearing sleeve assembly is removably affixed to the first housing. The method can also include redirecting the first radial force through the first arcuate bearing sleeve assembly to the first housing, wherein the first arcuate bearing sleeve assembly is removably affixed to the first housing. Applying, by the first arcuate bearing sleeve portion, a first radial force to the radially outer side of the piston can include applying the first radial force to a collection of bearings in contact with the radially outer side of the piston. The first arcuate bearing sleeve portion can include a friction-reducing coating, and wherein applying, by the first arcuate bearing sleeve portion, a first radial force to the radially outer side of the piston can also include applying the first radial force to the friction-reducing coating in contact with the radially outer side of the piston.

An example fluid actuator includes a housing defining a first chamber having a first cavity, a first fluid port in fluid communication with the first cavity, and a first open end, a first piston assembly including a tubular first piston defining a second chamber having a second cavity, a second fluid port in fluid communication with the second cavity, and a second open end, disposed in said first housing for reciprocal movement in the first chamber through the first open end, wherein a first seal, the first cavity, and the first piston define a first pressure chamber, and a second piston assembly including an second piston disposed in said first piston assembly for reciprocal movement in the second chamber through the second open end, wherein a second seal, the second cavity, and the second piston define a second pressure chamber, and a first portion of the second piston contacts a first end effector.

Various embodiments can include some, all, or none of the following features. The first chamber can be an arcuate first chamber including the first open end and a first enclosed end, the tubular first piston can be an arcuate-shaped tubular first piston, the second chamber can be an arcuate second chamber including the second open end and a second enclosed end, the second piston can be an arcuate-shaped second piston, and the end effector can be a rotor arm. The housing can further define a third arcuate chamber having a third cavity, a third fluid port in fluid communication with the third cavity, and a third open end, the first piston assembly further includes an arcuate-shaped tubular third piston defining a fourth arcuate chamber having a fourth cavity, a fourth fluid port in fluid communication with the fourth cavity, and a fourth open end, disposed in said first housing for reciprocal movement in the third arcuate chamber through the third open end, wherein a third seal, the third cavity, and the third piston define a third pressure chamber, and the second piston assembly further includes an arcuate-shaped fourth piston disposed in said first piston assembly for reciprocal movement in the fourth arcuate chamber through the fourth open end, wherein a fourth seal, the fourth cavity, and the fourth piston define a fourth pressure chamber, and a first portion of the fourth piston contacts a second end effector. The fluid actuator can also include a rotor arm, wherein the first chamber can be an arcuate first chamber, the tubular first piston can be an arcuate-shaped tubular first piston, the second chamber can be an arcuate second chamber, the second piston can be an arcuate-shaped second piston, the third chamber can be an arcuate third chamber, the tubular third chamber piston can be an arcuate-shaped tubular third piston, the fourth chamber can be an arcuate fourth chamber, the fourth piston can be an arcuate-shaped fourth piston, the first end effector can be the rotor arm, and the second end effector can be the rotor arm. The second piston can be oriented in the same rotational direction as the first piston. The second piston can be oriented in the opposite rotational direction as the first piston. Application of pressurized fluid to the third pressure chamber can urge the third piston partially outward from the third pressure chamber to urge rotation of the first piston assembly in a first direction, application of pressurized fluid to the fourth pressure chamber can urge the fourth piston partially outward from the fourth pressure chamber to urge rotation of the second piston assembly in the first direction, rotation of the second piston assembly in a second direction opposite that of the first direction can urge the fourth piston partially into the fourth pressure chamber to urge pressurized fluid out the fourth fluid port, and rotation of the first piston assembly in the second direction can urge the third piston partially into the third pressure chamber to urge pressurized fluid out the third fluid port. The housing can further define an arcuate actuation space defining an actuation arc about the axis between the first open end and a terminal end, and the fluid actuator can also include a rotor assembly including a rotary output tube rotatably surrounding said housing, wherein the rotor arm can extend radially outward to the rotary output tube and the rotor arm is coupled to the rotary tube. The first seal can be disposed about an interior surface of the first open end. The first seal can be disposed about the periphery of the first piston and is configured to remain stationary relative to the first piston. The second seal can be disposed about an interior surface of the second open end. The second seal can be disposed about the periphery of the second piston and is configured to remain stationary relative to the second piston. The housing can be formed as a one-piece housing. The first piston can have one of a square, rectangular, ovoid, elliptical, figure-eight, or circular shape in cross-section. The first piston assembly can further define a fluid port fluidically connecting the first cavity and the second cavity. A first portion of the tubular first piston can contact a second end effector.

An example method of fluid actuation includes providing a fluid actuator including a housing defining a first chamber having a first cavity, a first fluid port in fluid communication with the first cavity, and a first open end, a first piston assembly including a tubular first piston defining a second chamber having a second cavity, a second fluid port in fluid communication with the second cavity, and a second open end, disposed in said first housing for reciprocal movement in the first chamber through the first open end, wherein a first seal, the first cavity, and the first piston define a first pressure chamber, and a second piston assembly includes an second piston disposed in said first piston assembly for reciprocal movement in the second chamber through the second open end, wherein a second seal, the second cavity, and the second piston define a second pressure chamber, and a first portion of the second piston contacts a first end effector, applying pressurized fluid to the first pressure chamber, urging the first piston partially outward from the first pressure chamber to urge the end effector in a first direction, urging the end effector in a second direction opposite that of the first direction, urging the first piston partially into the first pressure chamber to urge pressurized fluid out the first fluid port, applying pressurized fluid to the second pressure chamber, urging the second piston partially outward from the second pressure chamber to urge the first piston assembly in the first direction, urging the first piston assembly in the second direction, and urging the second piston partially into the second pressure chamber to urge pressurized fluid out the second fluid port. The first chamber can be an arcuate first chamber having the first open end and a first enclosed end, the tubular first piston can be an arcuate-shaped tubular first piston, the second chamber can be an arcuate second chamber including the second open end and a second enclosed end, the second piston can be an arcuate-shaped second piston, the end effector can be a rotor arm, urging the first piston partially outward from the first pressure chamber to urge the end effector in a first direction can also include rotating the rotor arm in the first direction with substantially constant torque over stroke, and urging the second piston partially outward from the second pressure chamber to urge the first piston assembly in the first direction can also include rotating the first piston assembly in the first direction with substantially constant torque over stroke.

An example arm of a machine apparatus includes a first arm portion, a second arm portion, and a joint portion connecting the first arm portion to the second arm portion, the joint portion including a fluid actuator having a housing defining a first chamber having a first cavity, a first fluid port in fluid communication with the first cavity, and a first open end, a first piston assembly including a tubular first piston defining a second chamber having a second cavity, a second fluid port in fluid communication with the second cavity, and a second open end, disposed in said first housing for reciprocal movement in the first chamber through the first open end, wherein a first seal, the first cavity, and the first piston define a first pressure chamber, and a second piston assembly having an second piston disposed in said first piston assembly for reciprocal movement in the second chamber through the second open end, wherein a second seal, the second cavity, and the second piston define a second pressure chamber, and a first portion of the second piston contacts a first end effector.

Various embodiments can include some, all, or none of the following features. The end effector can be affixed to or can be integral to the first arm portion. The housing can be affixed to or can be integral to the second arm portion.

An example multi-axis rotary actuator includes a first rotary piston actuator configured to controllably actuate a first pivotal joint between a first linkage to a second linkage about a first axis, and a second rotary piston actuator configured to controllably actuate a second pivotal joint connecting the second linkage to a third linkage about a second axis.

Various embodiments can include some, all, or none of the following features. The first axis can be parallel to the second axis. The first axis can be perpendicular to the second axis. The first axis can intersect the second axis. At least one of the first rotary piston actuator and the second rotary piston actuator can include a housing defining a first arcuate chamber having a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber including part or all of the first arcuate chamber, and a first portion of the first piston contacts the rotor arm, and a rotor assembly rotatably surrounding said housing and including a rotary cylinder about the axis, wherein the rotor arm extends radially outward to the rotary cylinder and the rotor arm is coupled to the rotary cylinder, wherein the housing is coupled to a selected one of the first linkage, the second linkage, or the third linkage, and the rotor assembly is coupled to another one of the first linkage, the second linkage, or the third linkage. The multi-axis rotary actuator can also include a second arcuate chamber including a second cavity defining a second arc about the axis between a second open end and a second enclosed end and having a second fluid port in fluid communication with the second cavity. The second arc can have a second radius from the axis, different from the first radius. The second arc can be concentric with the first arc about the axis in the plane. The second open end can be at the terminal end, and the arcuate chamber can be oriented rotationally opposite to the first arcuate chamber about the axis. The second arc is can be not in the plane and at least a portion of the second arcuate chamber can overlap axially with the first arcuate chamber in the plane. The multi-axis rotary actuator can also include an arcuate-shaped second piston disposed in said second housing for reciprocal movement in the second arcuate chamber through the second open end, wherein a second seal, the second cavity, and the second piston define a second pressure chamber including part or all of the second arcuate chamber, and a second portion of the second piston contacts the rotor arm. The rotor assembly can provide load bearing support for the housing. At least one of the first rotary piston actuator and the second rotary piston actuator can include a housing defining a first arcuate chamber housing defining a first arcuate chamber having a first cavity defining a first ring segment in a plane between a first open end and a first enclosed end and having a first fluid port in fluid communication with the first cavity, the ring segment having a first outer radius in the plane, the first radius defining an axis perpendicular to the plane, a first inner radius in the plane, and a first central radius in the plane, a second arcuate chamber having an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, a rotor arm configured for rotary movement within the actuation space along the third arc, a rotor assembly coupled to the rotor arm, an arcuate-shaped first piston disposed in said first housing for reciprocal movement in the first arcuate chamber and in the plane through the first open end, wherein a first seal, the first cavity, and the first piston define a first pressure chamber, and a first portion of the first piston contacts a rotor arm, and a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm, wherein the housing is coupled to a selected one of the first linkage, the second linkage, or the third linkage, and the rotor assembly is coupled to another one of the first linkage, the second linkage, or the third linkage.

An example method of multi-axis rotary actuation includes providing a multi-axis rotary actuator including a first rotary piston actuator configured to controllably actuate a first pivotal joint between a first linkage to a second linkage about a first axis, and a second rotary piston actuator configured to controllably actuate a second pivotal joint connecting the second linkage to a third linkage about a second axis, applying pressurized fluid to the first rotary piston actuator, urging actuation of the first pivotal joint about the first axis in a first direction, urging actuation of the first pivotal joint about the first axis in a second direction opposite that of the first direction, applying pressurized fluid to the second rotary piston actuator, urging actuation of the second pivotal joint about the second axis in a third direction, and urging actuation of the second pivotal joint about the second axis in a fourth direction opposite that of the third direction.

Various implementations can include some, all, or none of the following features. Applying pressurized fluid to the first rotary piston actuator can also include applying pressurized fluid to a first pressure chamber of the first rotary piston actuator configured to urge actuation of the first pivotal joint in the first direction, and wherein applying pressurized fluid to the second rotary piston actuator can also include applying pressurized fluid to a third pressure chamber of the second rotary piston actuator configured to urge actuation of the second pivotal joint in the third direction, and the method can also include applying pressurized fluid to a second pressure chamber of the first rotary piston actuator configured to urge actuation of the first pivotal joint in the second direction, urging actuation of the first pivotal joint about the first axis in the second direction, applying pressurized fluid to a fourth pressure chamber of the second rotary piston actuator configured to urge actuation of the first pivotal joint in the second direction, and urging actuation of the second pivotal joint about the second axis in the fourth direction.

An example arm of a machine apparatus includes a first arm portion, a second arm portion, and a joint portion pivotally connecting the first arm portion to the second arm portion, the joint portion including a multi-axis rotary actuator including a first rotary piston actuator configured to controllably actuate a first pivotal joint between a first linkage to a second linkage about a first axis, and a second rotary piston actuator configured to controllably actuate a second pivotal joint connecting the second linkage to a third linkage about a second axis.

Various embodiments can include some, all, or none of the following features. The first axis can be parallel to the second axis. The first axis can be perpendicular to the second axis. The first axis can intersect the second axis. At least one of the first rotary piston actuator and the second rotary piston actuator can include a housing defining a first arcuate chamber including a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber including part or all of the first arcuate chamber, and a first portion of the first piston contacts the rotor arm, and a rotor assembly rotatably surrounding said housing and including a rotary cylinder about the axis, wherein the rotor arm extends radially outward to the rotary cylinder and the rotor arm is coupled to the rotary cylinder, wherein the housing is coupled to a selected one of the first linkage, the second linkage, or the third linkage, and the rotor assembly is coupled to another one of the first linkage, the second linkage, or the third linkage.

An example rotary piston actuator assembly includes a first rotary actuator including a first housing defining a first central bore, and a first arcuate chamber having a first cavity having a first actuator fluid port in fluid communication with the first cavity and the first central bore, a rotor arm, an arcuate-shaped first piston disposed in said first housing for reciprocal movement in the first housing, wherein a first seal, the first cavity, and the first piston define a first pressure chamber having part or all of the first arcuate chamber, and a first portion of the first piston contacts the rotor arm, a rotor assembly rotatably surrounding said first housing and including a rotary output tube, wherein the rotor arm extends radially outward to the rotary output tube and the rotor arm is coupled to the rotary tube, and a fluid delivery shaft having an elongated body disposed in said first central bore and defining a first shaft fluid delivery path.

Various embodiments can include some, all, or none of the following features. The rotary piston actuator assembly can also include a second rotary actuator including a second housing defining a second central bore, a second arcuate chamber having a second cavity having a second actuator fluid port in fluid communication with the second cavity and the second central bore, and an arcuate-shaped second piston disposed in said second housing for reciprocal movement in the second housing, wherein a second seal, the second cavity, and the second piston define a second pressure chamber having part or all of the second arcuate chamber, and a first portion of the second piston contacts the rotor arm, wherein the rotor assembly rotatably surrounds said second housing, and the fluid delivery shaft is disposed in said second central bore. The fluid delivery shaft can define an axis and can include a first shaft fluid port along the body, a second shaft fluid port near a terminal end of the body, and the first shaft fluid delivery path defined by the fluid delivery shaft and fluidly connecting the first shaft fluid port to the second shaft fluid port, a first shaft seal disposed about the fluid delivery shaft on a first axial side of the first shaft fluid port along the axis, a second shaft seal disposed about the fluid delivery shaft on a second axial side of the first shaft fluid port along the axis and opposite the first shaft seal, wherein the first central bore, the body, the first shaft fluid seal, and the second shaft fluid seal define a first fluid transmission chamber, and the first actuator fluid port is in fluidic communication with the first fluid transmission chamber. The first central bore can also define a first bore portion and a second bore portion, wherein the first bore portion extends along substantially a first half of the axial length of the first central bore, and the second bore portion extends along substantially the second half of the axial length of the first central bore, and the first actuator fluid port is defined within the first bore portion, wherein the first fluid transmission chamber can extend along substantially one half of the axial length of the first central bore such that the first fluid transmission chamber extends along the first bore portion in a first assemblage of the first rotary actuator and the fluid delivery shaft, and the first fluid transmission chamber can extend along the second bore portion in a second assemblage of the first rotary actuator and the fluid delivery shaft. The first arcuate chamber can also define a first open end, and the first piston can also include a first piston assembly having a tubular first piston defining a second chamber having a second cavity, a second fluid port in fluid communication with the second cavity, and a second open end, disposed in said first housing for reciprocal movement in the first chamber through the first open end, wherein a first seal, the first cavity, and the first piston define a first pressure chamber, and the rotary piston actuator can also include a second piston assembly including an second piston disposed in said first piston assembly for reciprocal movement in the second chamber through the second open end, wherein a second seal, the second cavity, and the second piston define a second pressure chamber, and a first portion of the second piston contacts a first end effector. The first cavity can define a first arc in a plane between a first open end and a first enclosed end and having a first fluid port in fluid communication with the first cavity, the first arc having a first radius in the plane, the first radius defining an axis perpendicular to the plane, and the first housing further defines an arcuate actuation space defining an actuation arc about the axis between the first open end and a terminal end, wherein the rotor arm is configured for rotary movement within the actuation space along a second arc, and the first piston is disposed in said first housing for reciprocal movement in the first arcuate chamber and in the plane through the first open end, wherein the first seal, the first cavity, and the first piston define the first pressure chamber including part or all of the first arcuate chamber. The first housing can include a first arcuate chamber housing defining the first arcuate chamber, wherein the first cavity defines a first ring segment in a plane between a first open end and a first enclosed end, the ring segment having a first outer radius in the plane and defining an axis perpendicular to the plane, a first inner radius in the plane about the axis, and a first central radius in the plane, wherein the first housing further defines a second arcuate chamber having an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, and the rotor arm is configured for rotary movement within the actuation space along the third arc, wherein the arcuate-shaped first piston disposed in said first housing for reciprocal movement in the first arcuate chamber and in the plane through the first open end, wherein the first seal, the first cavity, and the first piston define the first pressure chamber, and wherein the rotary piston actuator assembly also includes a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm.

An example method of rotary actuation includes providing a first rotary actuator including a first housing defining a first central bore, and a first arcuate chamber including a first cavity having a first actuator fluid port in fluid communication with the first cavity and the first central bore, a rotor arm, an arcuate-shaped first piston disposed in said first housing for reciprocal movement in the first housing, wherein a first seal, the first cavity, and the first piston define a first pressure chamber including part or all of the first arcuate chamber, and a first portion of the first piston contacts the rotor arm, a rotor assembly rotatably surrounding said first housing and including a rotary output tube, wherein the rotor arm extends radially outward to the rotary output tube and the rotor arm is coupled to the rotary tube, and a fluid delivery shaft having an elongated body disposed in said first central bore and defining a first shaft fluid delivery path, providing pressurized fluid to the second shaft fluid port, urging pressurized fluid to the first pressure chamber through the first shaft fluid delivery path, the first shaft fluid port, the first fluid transmission chamber, and the first fluid port, urging the first piston partially outward from the first pressure chamber to urge rotation of the rotor assembly in a first direction, rotating the rotor assembly in a second direction opposite that of the first direction, and urging the first piston partially into the first pressure chamber to urge pressurized fluid out the second shaft fluid port through the first fluid port, the first fluid transmission chamber, the first shaft fluid port, and the first shaft fluid delivery path.

Various implementations can include some, all, or none of the following features. The method can also include disassembling the first rotary actuator from a first assembly configuration with the fluid delivery shaft, reassembling the first rotary actuator to the fluid delivery shaft in a second configuration, providing pressurized fluid to the second shaft fluid port, urging pressurized fluid to the first pressure chamber through the first shaft fluid delivery path, the first shaft fluid port, the first fluid transmission chamber, and the first fluid port, urging the first piston partially outward from the first pressure chamber to urge rotation of the rotor assembly in the second direction, rotating the rotor assembly in the direction opposite that of the second direction, and urging the first piston partially into the first pressure chamber to urge pressurized fluid out the second shaft fluid port through the first fluid port, the first fluid transmission chamber, the first shaft fluid port, and the first shaft fluid delivery path. The first central bore can define a first bore portion and a second bore portion, wherein the first bore portion extends along substantially a first half of the axial length of the first central bore, and the second bore portion extends along substantially the second half of the axial length of the first central bore, and the first actuator fluid port is defined within the first bore portion; and wherein the first fluid transmission chamber extends along substantially one half of the axial length of the first central bore such that the first fluid transmission chamber extends along the first bore portion in a first assemblage of the first rotary actuator and the fluid delivery shaft, and the first fluid transmission chamber extends along the second bore portion in a second assemblage of the first rotary actuator and the fluid delivery shaft. The method can also include disassembling the first rotary actuator from a first assembly configuration with the fluid delivery shaft, wherein the first central bore portion, the body, the first shaft fluid seal, and the second shaft fluid seal define the first fluid transmission chamber in the first configuration, reassembling the first rotary actuator to the fluid delivery shaft in a second configuration, wherein the second central bore portion, the body, the first shaft fluid seal, and the second shaft fluid seal define the first fluid transmission chamber in the second configuration, providing pressurized fluid to the second shaft fluid port, and blocking flow of pressurized fluid by the first pressure chamber.

Another example arm of a machine apparatus includes a first arm portion, a second arm portion, and a joint portion pivotally connecting the first arm portion to the second arm portion, the joint portion having a first rotary actuator including a first housing defining a first central bore, and a first arcuate chamber having a first cavity having a first actuator fluid port in fluid communication with the first cavity and the first central bore, and a rotor arm, an arcuate-shaped first piston disposed in said first housing for reciprocal movement in the first housing, wherein a first seal, the first cavity, and the first piston define a first pressure chamber including part or all of the first arcuate chamber, and a first portion of the first piston contacts the rotor arm, a rotor assembly rotatably surrounding said first housing and including a rotary output tube, wherein the rotor arm extends radially outward to the rotary output tube and the rotor arm is coupled to the rotary tube, and a fluid delivery shaft having an elongated body disposed in said first central bore and defining a first shaft fluid delivery path.

Various embodiments can include some, all, or none of the following features. The rotor assembly can be affixed to or can be integral to the first arm portion. The housing can be affixed to or can be integral to the second arm portion. The arm can also include a second rotary actuator including a second housing defining a second central bore, a second arcuate chamber having a second cavity having a second actuator fluid port in fluid communication with the second cavity and the second central bore, and an arcuate-shaped second piston disposed in said second housing for reciprocal movement in the second housing, wherein a second seal, the second cavity, and the second piston define a second pressure chamber including part or all of the second arcuate chamber, and a first portion of the second piston contacts the rotor arm, wherein the rotor assembly rotatably surrounds said second housing, and the fluid delivery shaft is disposed in said second central bore. The fluid delivery shaft can define an axis and can include a first shaft fluid port along the body, a second shaft fluid port near a terminal end of the body, and the first shaft fluid delivery path defined by the fluid delivery shaft and fluidly connecting the first shaft fluid port to the second shaft fluid port, a first shaft seal disposed about the fluid delivery shaft on a first axial side of the first shaft fluid port along the axis, a second shaft seal disposed about the fluid delivery shaft on a second axial side of the first shaft fluid port along the axis and opposite the first shaft seal, wherein the first central bore, the body, the first shaft fluid seal, and the second shaft fluid seal define a first fluid transmission chamber, and the first actuator fluid port is in fluidic communication with the first fluid transmission chamber. The first central bore can further define a first bore portion and a second bore portion, wherein the first bore portion extends along substantially a first half of the axial length of the first central bore, and the second bore portion extends along substantially the second half of the axial length of the first central bore, and the first actuator fluid port is defined within the first bore portion, wherein the first fluid transmission chamber extends along substantially one half of the axial length of the first central bore such that the first fluid transmission chamber extends along the first bore portion in a first assemblage of the first rotary actuator and the fluid delivery shaft, and the first fluid transmission chamber extends along the second bore portion in a second assemblage of the first rotary actuator and the fluid delivery shaft.

Another example rotary actuator includes a housing defining a first arcuate chamber housing defining a first arcuate chamber including a first cavity defining a first ring segment in a plane between a first open end and a first enclosed end and having a first fluid port in fluid communication with the first cavity, the ring segment having a first outer radius in the plane and defining an axis perpendicular to the plane, a first inner radius in the plane about the axis, and a first central radius in the plane, a second arcuate chamber including an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, a rotor arm configured for rotary movement within the actuation space along the third arc, a rotor assembly coupled to the rotor arm, an arcuate-shaped first piston disposed in said first housing for reciprocal movement in the first arcuate chamber and in the plane through the first open end, wherein a first seal, the first cavity, and the first piston define a first pressure chamber, and a first portion of the first piston contacts a rotor arm, and a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm.

Various embodiments can include some, all, or none of the following features. At least a portion of the second arcuate chamber can overlap axially with the first arcuate chamber in the plane. The rotor assembly can be rotatably journaled in said housing and can include a rotary output shaft along the axis, wherein the rotor arm extends radially inward to the rotary output shaft and the rotor arm is coupled to the rotary output shaft. The rotor assembly can rotatably surround said housing and can include a rotary output cylinder about the axis, wherein the rotor arm extends radially outward to the rotary output cylinder and the rotor arm is coupled to the rotary output cylinder. The first seal can be disposed about an interior surface of the open end and can be configured to remain stationary relative to the open end. The first seal can be disposed about the periphery of the first piston and can be configured to remain stationary relative to the first portion. The first seal can provide load bearing support for the first piston. The rotor assembly can provide load bearing support for the housing. The housing can be formed as a one-piece housing. The first seal can be a one-piece seal. The first piston can be solid in cross-section. At least one of the first piston and the second piston can be at least partly hollow in cross-section. The first piston can have one of a square, rectangular, ovoid, elliptical, figure-eight, or circular shape in cross-section.

Another example method of rotary actuation includes providing a rotary actuator including a housing defining a first arcuate chamber housing defining a first arcuate chamber including a first cavity defining a first ring segment in a plane between a first open end and a first enclosed end and having a first fluid port in fluid communication with the first cavity, the ring segment having a first outer radius in the plane and defining an axis perpendicular to the plane, a first inner radius in the plane about the axis, and a first central radius in the plane, a second arcuate chamber having an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, a rotor arm configured for rotary movement within the actuation space along the third arc, a rotor assembly coupled to the rotor arm, an arcuate-shaped first piston disposed in said first housing for reciprocal movement in the first arcuate chamber and in the plane through the first open end, wherein a first seal, the first cavity, and the first piston define a first pressure chamber, and a first portion of the first piston contacts a rotor arm, and a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm, applying pressurized fluid to the first pressure chamber, urging the first piston partially outward from the first pressure chamber to urge movement of the rotor arm in a first direction, rotating the rotor arm in a second direction opposite that of the first direction, and urging the first piston partially into the first pressure chamber to urge pressurized fluid out the first fluid port.

Various implementations can include some, all, or none of the following features. Rotating the rotor arm in a second direction opposite that of the first direction can include applying pressurized fluid to the second pressure chamber, and urging the second piston partially outward from the second pressure chamber to urge movement of the rotor arm in a second direction opposite from the first direction.

Urging the first piston partially outward from the first pressure chamber to urge movement of the rotor arm in a first direction can also include moving the rotor arm in the first direction with substantially constant torque over stroke.

Another example arm of a machine apparatus includes a first arm portion, a second arm portion, and a joint portion pivotally connecting the first arm portion to the second arm portion, the joint portion including a rotary actuator including a housing defining a first arcuate chamber housing defining a first arcuate chamber having a first cavity defining a first ring segment in a plane between a first open end and a first enclosed end and having a first fluid port in fluid communication with the first cavity, the ring segment having a first outer radius in the plane and defining an axis perpendicular to the plane, a first inner radius in the plane about the axis, and a first central radius in the plane, a second arcuate chamber having an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, a rotor arm configured for rotary movement within the actuation space along the third arc, a rotor assembly coupled to the rotor arm, an arcuate-shaped first piston disposed in said first housing for reciprocal movement in the first arcuate chamber and in the plane through the first open end, wherein a first seal, the first cavity, and the first piston define a first pressure chamber, and a first portion of the first piston contacts a rotor arm, and a tubular, arcuate-shaped second piston disposed in said second housing for reciprocal movement in the second arcuate chamber, in the arcuate tubular space and in the plane through the second open end, wherein a second seal, a third seal, the second cavity, and the second piston define a second pressure chamber, and a second portion of the second piston contacts the rotor arm.

Various embodiments can include some, all, or none of the following features. The rotor assembly can be affixed to or can be integral to the first arm portion. The housing can be affixed to or can be integral to the second arm portion.

Another example rotary actuator includes a housing defining a first arcuate chamber including a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber including part or all of the first arcuate chamber, and a first portion of the first piston contacts the rotor arm, and a rotor assembly rotatably surrounding said housing and having a rotary output tube about the axis, wherein the rotor arm extends radially outward to the rotary output tube and the rotor arm is coupled to the rotary tube.

Various embodiments can include some, all, or none of the following features. The rotary actuator can also include a second arcuate chamber having a second cavity defining a second arc about the axis between a second open end and a second enclosed end and having a second fluid port in fluid communication with the second cavity. The second arc can have a second radius from the axis, different than the first radius. The second arc can be concentric with the first arc about the axis in the plane. The second open end can be at the terminal end, and the arcuate chamber can be oriented rotationally opposite to the first arcuate chamber about the axis. The second arc is can be not in the plane and at least a portion of the second arcuate chamber can overlap axially with the first arcuate chamber in the plane. The rotary actuator can also include an arcuate-shaped second piston disposed in said second housing and configured for reciprocal movement in the second arcuate chamber through the second open end, wherein a second seal, the second cavity, and the second piston define a second pressure chamber including part or all of the second arcuate chamber, and a second portion of the second piston contacts the rotor arm. Application of pressurized fluid to the first pressure chamber can urge the first piston partially outward from the first pressure chamber to urge rotation of the rotor arm in a first direction, and application of pressurized fluid to the second pressure chamber can urge the second piston partially outward from the second pressure chamber to urge rotation of the rotor arm in a second direction. At least one of the first piston and the second piston can include the rotor arm. Rotation of the rotor assembly can urge the first piston partially into the first pressure chamber to pressurize a fluid and urge the fluid out of the first fluid port. The rotary tube can include the rotor arm. The rotary actuator can also include a first housing seal ring groove defined in the rotor assembly about the axis, a second housing seal ring groove defined in the housing about the axis and complimentary to the first housing seal ring groove, and a ring-shaped seal between the rotor assembly and the housing within the first housing seal ring groove and the second housing seal ring groove.

Another example method of rotary actuation can include providing a rotary actuator including a housing defining a first arcuate chamber having a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber including part or all of the first arcuate chamber, and a first portion of the first piston contacts the rotor arm, and a rotor assembly rotatably surrounding said housing and having a rotary output tube about the axis, wherein the rotor arm extends radially outward to the rotary output tube and the rotor arm is coupled to the rotary tube, applying pressurized fluid to the first pressure chamber, urging the first piston partially outward from the first pressure chamber to urge rotation of the rotor assembly in a first direction, rotating the rotor assembly in a second direction opposite that of the first direction, and urging the first piston partially into the first pressure chamber to urge pressurized fluid out the first fluid port.

Various implementations can include some, all, or none of the following features. The housing can further define a second arcuate chamber having a second cavity defining a second arc about the axis between a second open end and a second enclosed end and having a second fluid port in fluid communication with the second cavity, the rotary actuator can further include an arcuate-shaped second piston disposed in said first housing for reciprocal movement in the second arcuate chamber, wherein a second seal, the second cavity, and the second piston define a second pressure chamber, and a first portion of the second piston contacts the second rotor arm. The second piston can be oriented in the same rotational direction as the first piston. The second piston can be oriented in the opposite rotational direction as the first piston. Rotating the rotor assembly in a second direction opposite that of the first direction can include applying pressurized fluid to the second pressure chamber, and urging the second piston partially outward from the second pressure chamber to urge rotation of the rotor assembly in a second direction opposite from the first direction. Rotating the rotor assembly in a second direction opposite that of the first direction can include applying pressurized fluid to the second pressure chamber, and urging the first piston partially into the first pressure chamber to urge rotation of the rotor assembly in a second direction opposite from the first direction. Urging the first piston partially outward from the first pressure chamber to urge rotation of the rotor assembly in a first direction can also include rotating the rotor assembly in the first direction with substantially constant torque over stroke.

Another example arm of a machine apparatus includes a first arm portion, a second arm portion, and a joint portion pivotally connecting the first arm portion to the second arm portion, the joint portion including a rotary actuator including a housing defining a first arcuate chamber having a first cavity defining a first arc in a plane between a first open end and a first enclosed end and having a first fluid port in fluid communication with the first cavity, the first arc having a first radius in the plane, the first radius defining an axis perpendicular to the plane, and an arcuate actuation space defining an actuation arc about the axis between the first open end and a terminal end, a rotor arm configured for rotary movement within the actuation space along a second arc, an arcuate-shaped first piston disposed in said housing for reciprocal movement in the first arcuate chamber and in the plane through the first open end, wherein a first seal, the first cavity, and the first piston define a first pressure chamber including part or all of the first arcuate chamber, and a first portion of the first piston contacts the rotor arm, and a rotor assembly rotatably surrounding said housing and including a rotary output tube about the axis, wherein the rotor arm extends radially outward to the rotary output tube and the rotor arm is coupled to the rotary tube.

Various embodiments can include some, all, or none of the following features. The rotor assembly can be affixed to or can be integral to the first arm portion. The housing can be affixed to or can be integral to the second arm portion.

The details of one or more implementations are set forth in the accompanying drawings and the description below. Other features and advantages will be apparent from the description and drawings, and from the claims.

DETAILED DESCRIPTION

This document describes devices for producing rotary motion. In particular, this document describes devices that can convert fluid displacement into rotary motion through the use of components more commonly used for producing linear motion, e.g., hydraulic or pneumatic linear cylinders. Vane-type rotary actuators are relatively compact devices used to convert fluid motion into rotary motion.

Figure 1:
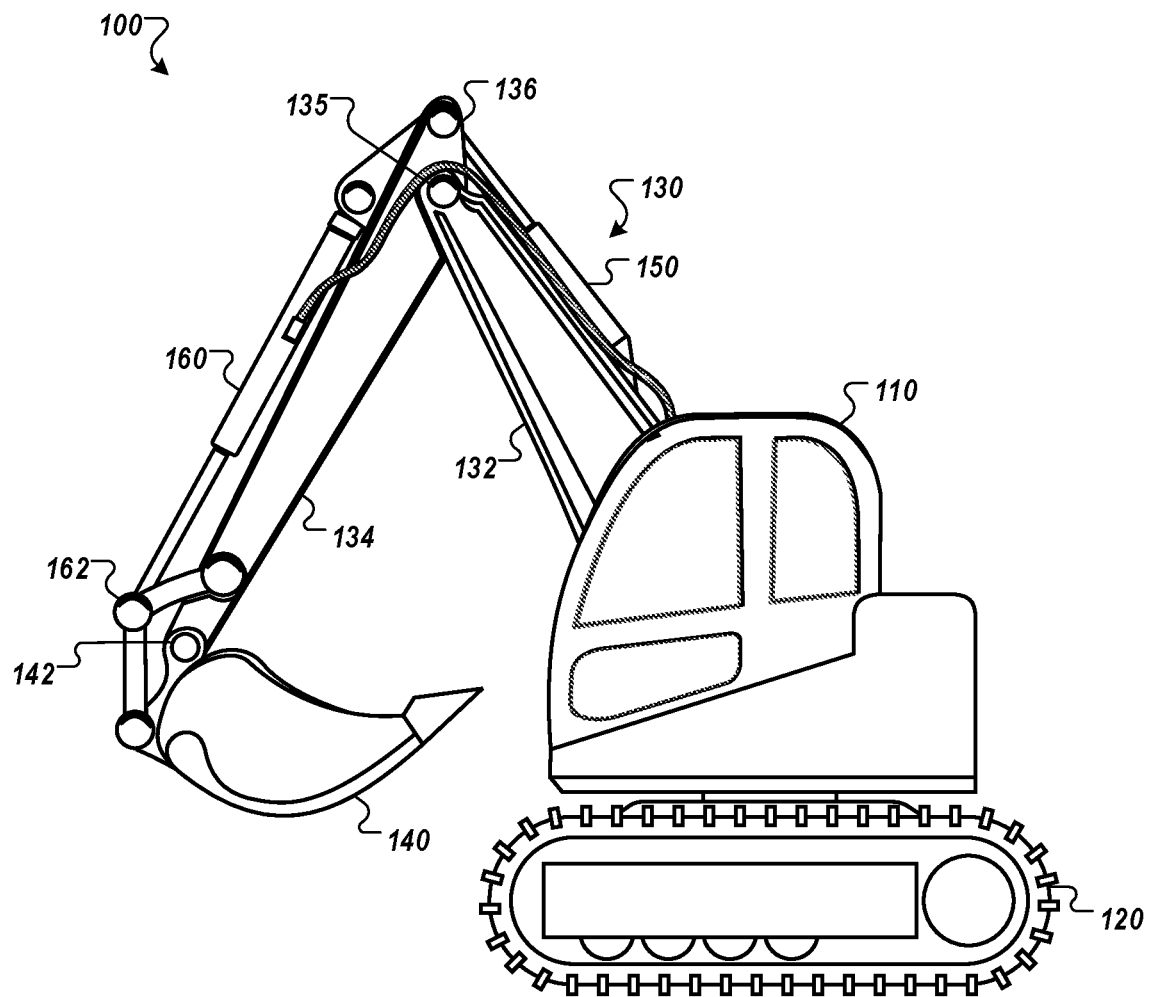
FIG. 1 is a diagram of an example excavator having linear fluid actuators.

FIG. 1 is a diagram of an example prior art excavator 100. The excavator 100 includes a "house" or "cab" 110 that rides on a tracked, wheeled, other generally otherwise mobile undercarriage 120. An articulated boom 130, which includes an arm portion 132 and an arm portion 134, extends from the house 110. The arm portion 132 and the arm portion 134 are pivotally connected at a joint 135. The arm portion 134 and a bucket 140 are pivotally connected at a joint 142. A linear piston 150 and a linear piston 160 provide power to actuate the arm portion 134 and the bucket 140, e.g., to manipulate the bucket 140 for digging, shoveling, lifting, or other such operations.

Linear pistons use relatively mature sealing technology that exhibits well-understood dynamic operation and leakage characteristics. Linear pistons, however, require additional mechanical components in order to adapt their linear motions to rotary motions. In the illustrated example, the linear piston 150 is connected at one end to the arm portion 132 and at the other end to a lever arm 136 that extends beyond the joint 135. A linear piston 160 is connected at one end to the arm portion 134 and at the other end to a lever arm assembly 162 that extends beyond the joint 142. By extending and retracting the linear actuator 150, the lever arm 138 is actuated and a moment is created about the joint 136 to convert the linear motion of the linear actuator 150 to rotary motion of the arm portion 134 relative to the arm portion 132. A linear actuator 160 is arranged in a similar linear-to-rotary configuration to pivotably actuate the bucket 140 relative to the arm portion 134.

Such linear-to-rotary mechanisms are generally larger and heavier than rotary actuators that are capable of providing similar rotational actions, e.g., occupying a larger work envelope. In general, rotary piston assemblies use curved pressure chambers and curved pistons to controllably push and pull the rotor arms of a rotor assembly about an axis. Prior rotary piston assemblies, however, are generally larger and heavier than linear-to-rotary mechanisms that are capable of providing similar torque and load handling capacities. The rotary piston assemblies described herein can provide the positional holding and power/torque characteristics generally associated with linear piston-type fluid actuators, to rotary applications, and can do so using relatively more compact and lightweight envelopes.

Linear-to-rotary mechanisms such as those used in the excavator 100 can also expose many of their components to contamination. For example, the linear pistons 150 and 160 can expose polished or otherwise sensitive surfaces to dirt, dust, and other such contaminants typically encountered at construction sites. In another example, the linear pistons 150 and 160 may be exposed to liquid contaminants such as rain or mud (e.g., the linear piston 160 may be partly submerged during a digging operation). In yet another example, sensitive portions of the linear pistons 150 and 160 can be exposed to physical damage, e.g., a collision with a solid object. Solid contaminants and physical collisions can harm polished surfaces and seals, leading to leaks and reductions in hydraulic performance. Fluid contaminants can invade hydraulic systems and harm hydraulic pumps, hoses, and seals. In some examples, the various moving parts of the joints 135 and 142, the lever arm 136, and the lever arm assembly 162 may also present multiple points for such contamination and damage.

In some embodiments, the rotary piston assemblies described herein can provide relatively greater resistance to contamination, and/or relatively easier maintenance than linear-to-rotary assemblies having similar positional holding and power/torque characteristics.

Furthermore, linear-to-rotary mechanisms such as those used in the excavator 100 can have relatively limited ranges of motion and can exhibit torque and/or motion characteristics that vary across the range of motion. For example, the range of motion between the arm portion 132 and the arm portion 134 can be mechanically limited at one extreme (e.g., approximately the position shown in FIG. 1) by the linear piston 150 contacting the arm portion 132 as the linear piston 150 extends. The range can be limited at the other extreme, for example, by the lever arm 136 contacting the arm portion 132 or by the arm portion 136 becoming substantially aligned between the linear piston 150 and the joint 135 as the linear piston 150 retracts.

In some embodiments, the rotary piston assemblies described herein can provide relatively greater ranges of motion, greater angular velocity, and/or more constant angular velocity across their ranges of motion than linear-to-rotary assemblies used for similar applications.

As the linear piston 150 extends and retracts at a constant rate, the angular velocity of the arm portion 134 and the torque developed about the joint 135 will vary. For example, for a constant rate of linear actuation the arm portion 134 can have the greatest angular velocity and torque when the lever arm 136 is at approximately a right angle to the linear piston 150, with the speed and torque being lowest at the extreme ranges of motion where the angles between the lever arm 136 and the linear piston are the smallest. Prior excavators such as the excavator 100 required operators to overcome this variability manually or by implementing complex fluid control systems to operate the linear pistons in a non-linear manner that provided a more constant motion. Some prior excavators such as the excavator 100 implement oversized linear pistons in order to compensate for the loss of torque inherent in many linear-to-rotary configurations, but such oversizing often comes with additional weight and cost.

In some embodiments, the rotary piston assemblies described herein can provide relatively greater ranges of motion and/or relatively more linear torque across angles of actuation than linear-to-rotary assemblies used in similar applications.

Figure 2:
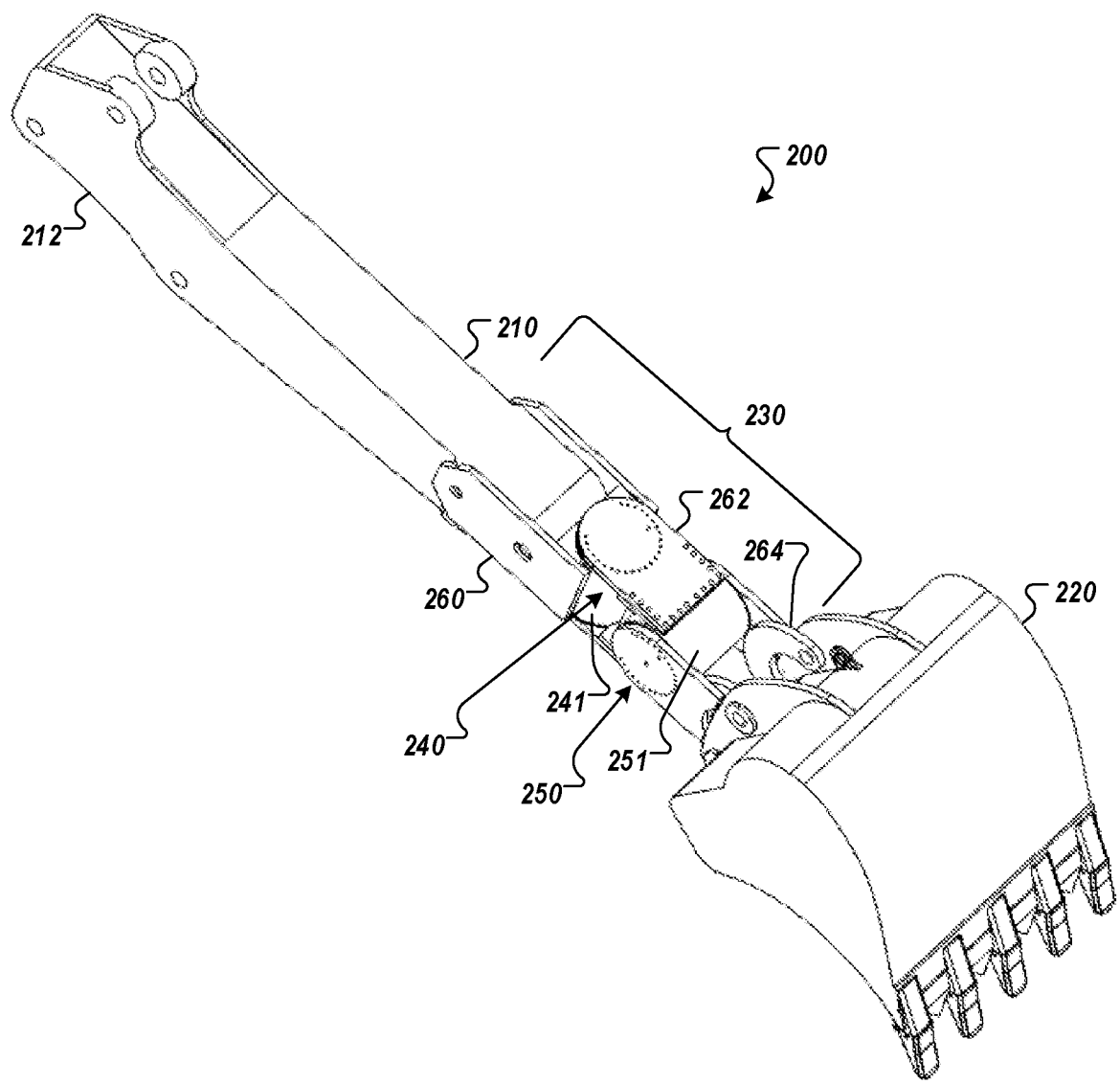
FIG. 2 is a diagram that shows an example of an articulated boom having rotary piston actuators.

FIG. 2 is a diagram that shows an example of an articulated boom 200 (e.g., and excavator boom) having rotary piston actuators. In some implementations, the articulated boom 200 can be used on an excavator. For the purposes of the descriptions here, the term "excavator" can include diggers, trenchers, backhoes, drilling rigs, cranes, bulldozers, robotic actuators or any other appropriate form of construction equipment having rotary or pivotably articulated joints.

The articulated boom 200, includes an arm portion 210 and bucket 220. In some embodiments, the arm portion 210 can be connected at an end 212 to another arm portion or to a house or cab of an excavator. In some implementations, the bucket 220 may be replaced by another type of end effector, such as a bulldozer blade, a pulley (e.g., a crane), a drill, a trencher, a claw, a gripper, a fork, or any other appropriate form of end effector that can be used with heavy equipment.

The arm portion 210 and the bucket are connected by a multi-axis fluid actuator. The multi-axis fluid actuator is configured to manipulate the bucket 220 for digging, shoveling, lifting, or other such operations. The multi-axis fluid actuator includes a joint 240 and a joint 250. The joint 240 includes a rotary piston actuator that pivotably connects a joint arm 260 to a joint arm 262 about a first axis. The joint 240 and the rotary piston actuator will be described in more detail in the description of FIG. 3. The joint 250 includes another rotary piston actuator that pivotably connects the joint arm 262 to a joint arm 264 about a second axis. The joint 250 and the rotary piston actuator will be described in more detail in the description of FIGS. 4 and 5. The multi-axis fluid actuator is removably connected (e.g., bolted, pinned) to the arm portion 210 by the joint arm 260, and is removably connected to the bucket 220 by the joint arm 264. The joint 240 and the joint 250 are configured to provide two axes of motion between the bucket 220 and the arm portion 210.

Figure 3:
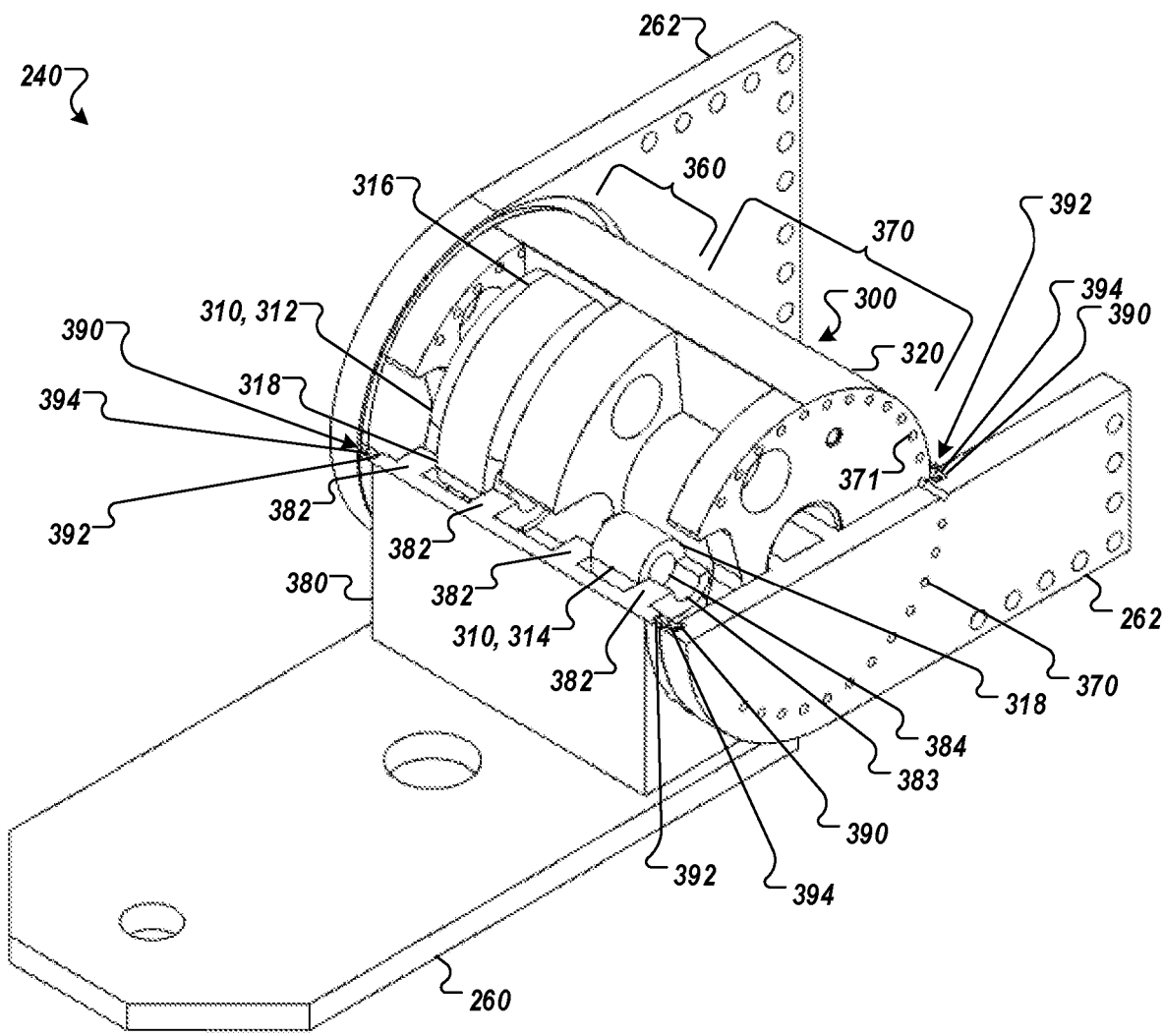
FIG. 3 is a partial cutaway view of an example rotary piston actuator joint portion.

FIG. 3 is a partial cutaway view of the example joint 240 of FIG. 2. The joint 240 includes a rotary piston actuator 300. In general, rotary piston actuators use curved pressure chambers and curved pistons to controllably push and pull the rotor arms of a rotor assembly about an axis. In use, certain embodiments of the rotary piston actuators described herein can provide the positional holding characteristics generally associated with linear piston-type fluid actuators, to rotary applications, and can do so using the relatively more compact and lightweight envelopes generally associated with rotary vane actuators.

The actuator 300 includes a rotary piston assembly 310 and a pressure chamber assembly 320. The actuator 300 includes a first actuation section 360 and a second actuation section 370. In the example of actuator 300, the first actuation section 360 is configured to rotate the rotary piston assembly 310 in a first direction, e.g., counter-clockwise, and the second actuation section 370 is configured to rotate the rotary piston assembly 310 in a second direction substantially opposite the first direction, e.g., clockwise.

The rotary piston assembly 310 includes a linkage 380 connected to the joint arm 260. A plurality of linkage arms 382 extend radially from the linkage 380, the distal end of each linkage arm 382 including a bore 383 substantially aligned with the axis of rotation of the rotary piston assembly 310 and sized to accommodate one of a collection of connector pins (not shown).

The first actuation section 360 includes a rotary piston 312, and the second actuation section 370 includes a rotary piston 314. While the example actuator 300 includes two of the rotary pistons 312, 314, other embodiments can include greater and/or lesser numbers of cooperative and opposing rotary pistons in various configurations. Examples of other such embodiments will be discussed below, for example, in the descriptions of FIGS. 6A-11.

In the example rotary piston assembly 310 shown in FIG. 3, each of the rotary pistons 312, 314 includes a piston end 316 and one or more connector arms 318. The piston end 316 is formed to have a body having a generally semi-circular arc with substantially smooth surface. Each of the connector arms 318 includes a bore 384 substantially aligned with the axis of the semi-circular arc of the piston end 316 and sized to accommodate one of the connector pins (not shown).

The rotary pistons 312, 314 in the example rotary piston assembly 310 of FIG. 3 are oriented to be rotationally opposite to each other. The rotary pistons 312 and 314 may be assembled to the linkage 380 by aligning the linkage arms 382 with the connector arms 318 such that the bores 383 align with the bores 384. The connector pins (not shown) may then be inserted through the aligned bores 383, 384 to create hinged connections between the pistons 312, 314 and the linkage 380. Each connector pin is slightly longer than the aligned bores. In the example assembly, about the circumferential periphery of each end of each connector pin that extends beyond the aligned bores is a circumferential recess (not shown) that can accommodate a retaining fastener (not shown), e.g., a snap ring or spiral ring.

The pressure chamber assembly 320 is removably connected to the joint arm 262 by a collection of fasteners (not shown) (e.g., bolts, pins, screws) that are passed through a collection of bores 370 in the joint arm 262 and into a collection of corresponding bores 371 in the axial ends of the pressure chamber assembly 320. In the illustrated example, fluid pressure can be introduced to controllably urge the rotary pistons 312, 314 out of the pressure chamber assembly 320. The movement of the rotary pistons 312, 314, which are assembled to the linkage 380, can urge the joint arm 260 to pivot relative to the joint arm 262, which is assembled to the pressure chamber assembly 320.

The pressure chamber assembly 320 has a generally cylindrical shape. Referring back to FIG. 2, the joint 240 includes an outer housing 241 configured as a tubular wall surrounding an interior bore sized to accommodate the pressure chamber assembly 320. The outer housing 241 is connected to, or is formed to be integral with, the linkage 380.

Returning to FIG. 3, the outer housing 241 (partly visible in FIG. 3) substantially surrounds the pressure chamber assembly 320. As the rotary pistons 312, 314 are actuated, the pressure chamber assembly 320, which has a generally cylindrical shape, rotates within the outer housing 241. The outer housing 241 provides a bearing surface that supports the pressure chamber assembly 320 as it rotates. In some embodiments, contact between the pressure chamber assembly 320 and the outer housing 241 can bear a load. For example, a load on the joint arm 262 can be transmitted to the pressure chamber assembly 320, to the outer housing 241 (e.g., through the bearing surface), to the linkage 380, and on to the joint arm 260.

The joint arm 262 includes a circular seal groove 390, and the outer housing 241 includes a corresponding seal groove 392. When the joint arm 262 is mounted to the pressure chamber assembly 320, the seal groove 390 and the seal groove 392 align. The seal grooves 390 and 392 accommodate a seal 394. The seals 394 substantially prevent external contaminants (e.g., dust, water, dirt, mud, sand) from entering the actuator 300, including the bearing surface between the outer housing 241 and the pressure chamber assembly 320 and including the rotary piston assembly 310, as the joint arm 262 pivots relative to the outer housing 241. In some implementations, the sealed arrangement of the actuator 300 can thus be used or submerged in wet, dirty, or other contaminating environments substantially without exposing the internal components (e.g., the polished surfaces of the rotary pistons 312, 314) to external contamination.

Figure 4:
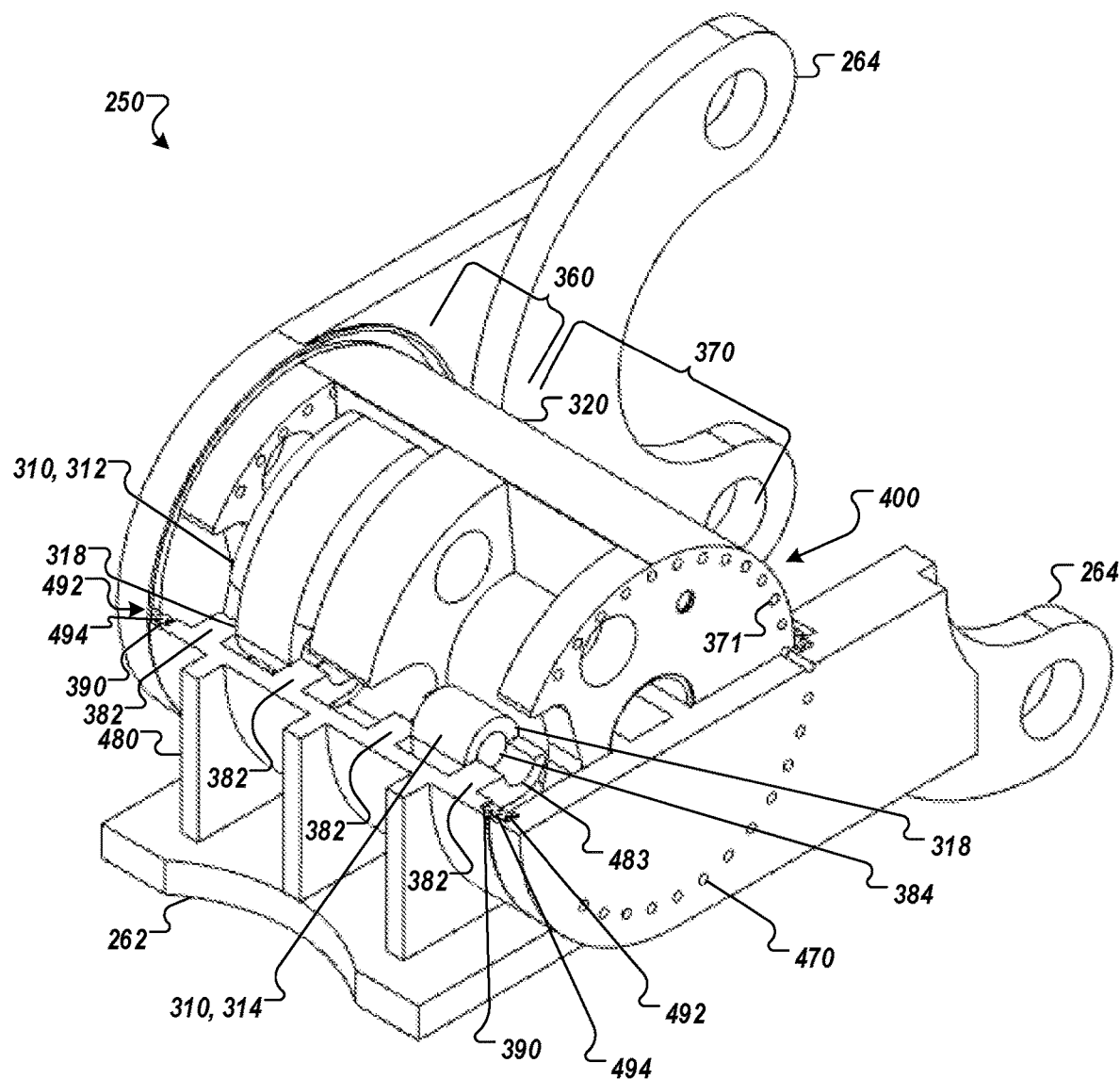
FIG. 4 is a partial cutaway view of another example rotary piston actuator joint portion.
Figure 5:
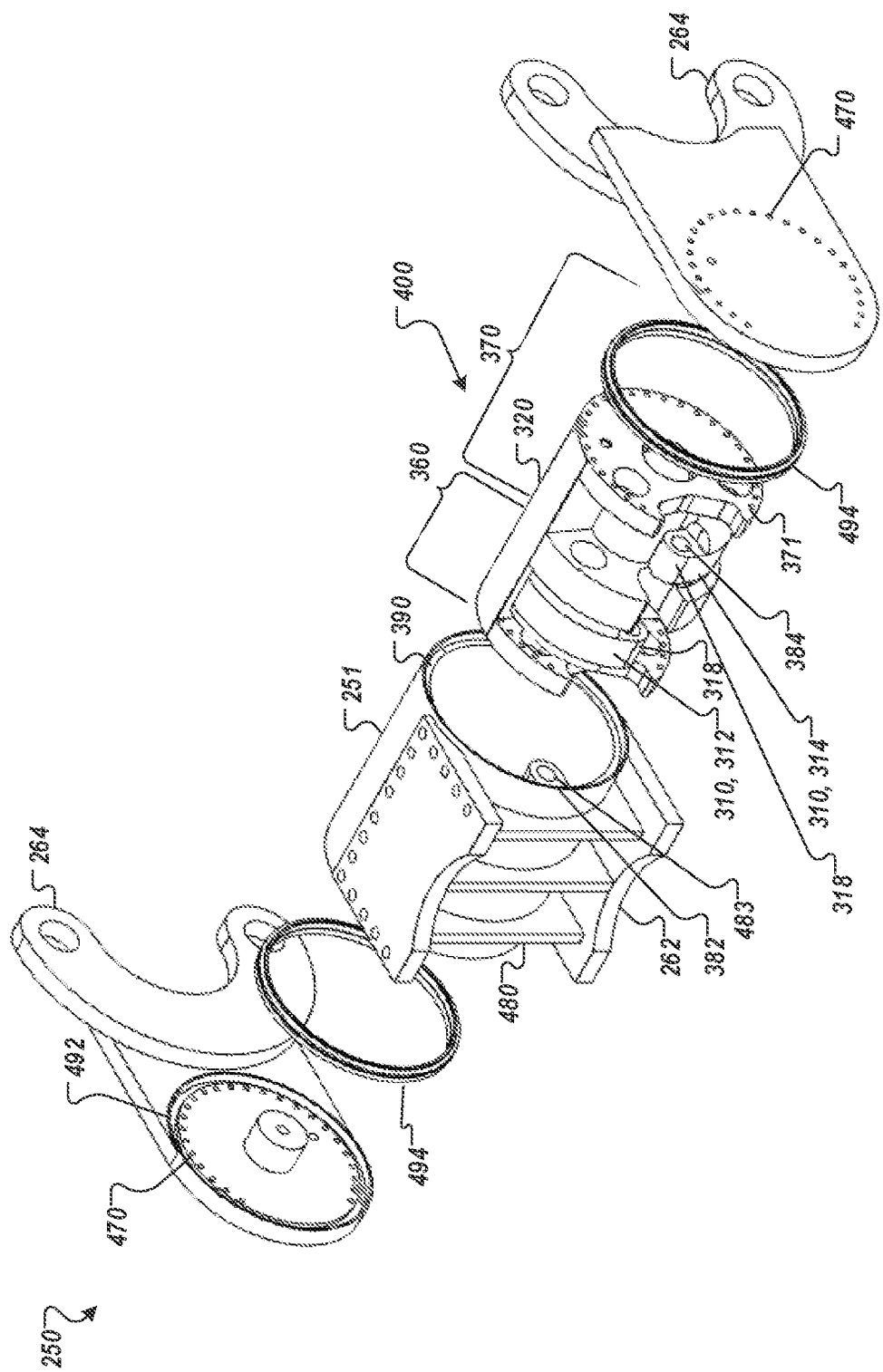
FIG. 5 is an exploded view of an example rotary piston actuator joint portion.

FIG. 4 is a partial cutaway view of the example joint 250 of FIG. 2. FIG. 5 is an exploded view of the example joint 250. The joint 250 includes a rotary piston actuator 400. In some embodiments, the rotary piston actuator 400 can be the example rotary piston actuator 300 of FIG. 3. In some embodiments, the rotary piston actuator 400 can be used with the multi-axis joint 200 of FIG. 2.

The actuator 400 includes the rotary piston assembly 310 and the pressure chamber assembly 320. The actuator 400 includes the first actuation section 360 and a second actuation section 370. In the example of the actuator 400, the first actuation section 360 is configured to rotate the rotary piston assembly 310 in a first direction, e.g., counter-clockwise, and the second actuation section 370 is configured to rotate the rotary piston assembly 310 in a second direction substantially opposite the first direction, e.g., clockwise.

The rotary piston assembly 310 of the actuator 400 includes a linkage 480 connected to the joint arm 262. A plurality of linkage arms 482 extend radially from the linkage 380, the distal end of each linkage arm 482 including a bore 483 substantially aligned with the axis of rotation of the rotary piston assembly 310 and sized to accommodate one of a collection of connector pins (not shown).

The first actuation section 360 of the actuator 400 includes the rotary piston 312, and the second actuation section 370 includes a rotary piston 314. While the example actuator 300 includes two of the rotary pistons 312, 314, other embodiments can include greater and/or lesser numbers of cooperative and opposing rotary pistons in various configurations. Examples of other such embodiments will be discussed below, for example, in the descriptions of FIGS. 6A-11.

The rotary pistons 312, 314 in the example rotary piston assembly 310 of FIGS. 4 and 5 are oriented to be rotationally opposite to each other. The rotary pistons 312 and 314 may be assembled to the linkage 480 by aligning the linkage arms 482 with the connector arms 318 such that the bores 483 align with the bores 384. The connector pins (not shown) may then be inserted through the aligned bores 483, 384 to create hinged connections between the pistons 312, 314 and the linkage 480. Each connector pin is slightly longer than the aligned bores. In the example assembly, about the circumferential periphery of each end of each connector pin that extends beyond the aligned bores is a circumferential recess (not shown) that can accommodate a retaining fastener (not shown), e.g., a snap ring or spiral ring.

The pressure chamber assembly 320 of the actuator 400 is removably connected to the joint arm 264 by a collection of fasteners (not shown) (e.g., bolts, pins, screws) that are passed through a collection of bores 470 in the joint arm 264 and into the collection of corresponding bores 371 in the axial ends of the pressure chamber assembly 320. In the illustrated example, fluid pressure can be introduced to controllably urge the rotary pistons 312, 314 out of the pressure chamber assembly 320. The movement of the rotary pistons 312, 314, which are assembled to the linkage 480, can urge the joint arm 264 to pivot relative to the joint arm 262, which is assembled to the pressure chamber assembly 320.

The pressure chamber assembly 320 of the actuator 400 has a generally cylindrical shape. Referring back to FIG. 2, the joint 250 includes an outer housing 251 configured as a tubular wall surrounding an interior bore sized to accommodate the pressure chamber assembly 320. The outer housing 251 is connected to, or is formed to be integral with, the linkage 480.

Returning to FIG. 4, the outer housing 251 (partly visible in FIG. 4) substantially surrounds the pressure chamber assembly 320. As the rotary pistons 312, 314 are actuated, the pressure chamber assembly 320, which has a generally cylindrical shape, rotates within the outer housing 251. The outer housing 251 provides a bearing surface that supports the pressure chamber assembly 320 as it rotates. In some embodiments, contact between the pressure chamber assembly 320 and the outer housing 251 can bear a load. For example, a load on the joint arm 264 can be transmitted to the pressure chamber assembly 320, to the outer housing 251 (e.g., through the bearing surface), to the linkage 480, and on to the joint arm 262.

The joint arm 264 includes a circular seal groove 390, and the outer housing 251 includes a corresponding seal groove 492. When the joint arm 264 is mounted to the pressure chamber assembly 320, the seal groove 390 and the seal groove 492 align. The seal grooves 390 and 492 of the actuator 400 accommodate a seal 494. The seals 494 substantially prevent external contaminants (e.g., dust, water, dirt, mud, sand) from entering the actuator 400, including the bearing surface between the outer housing 251 and the pressure chamber assembly 320 and including the rotary piston assembly 310, as the joint arm 264 pivots relative to the outer housing 251. In some implementations, the sealed arrangement of the actuator 400 can thus be used or submerged in wet, dirty, or other contaminating environments substantially without exposing the internal components (e.g., the polished surfaces of the rotary pistons 312, 314) to external contamination.

The rotary piston actuator 300 of FIG. 3 and the rotary piston actuator of FIGS. 4-5 are examples of rotary piston actuators that can, in some embodiments, be used with the multi-axis joint 200 of FIG. 2. In some embodiments, various configurations of rotary piston actuators can be used. Several examples of such rotary piston actuators will be discussed in the descriptions of FIGS. 6A-11 below.

Figure 6A:
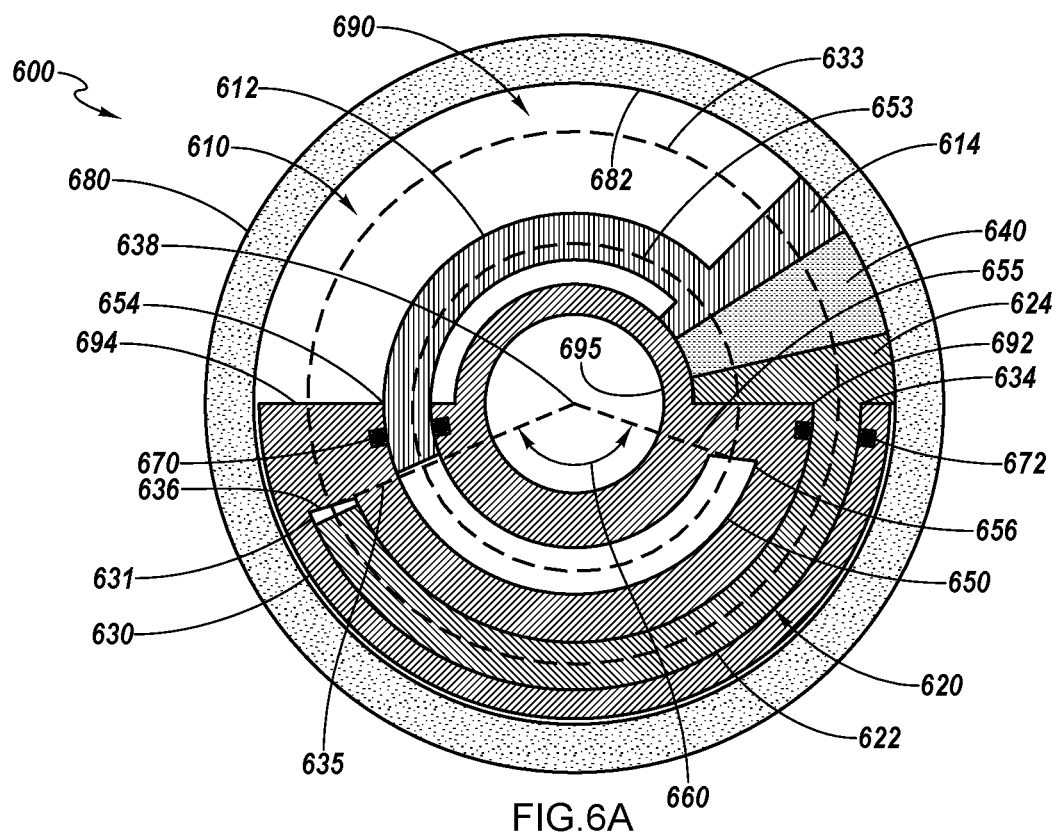
FIGS. 6A and 6B are sectional end and perspective views of an example rotary piston actuator with concentric pistons.
Figure 6B:
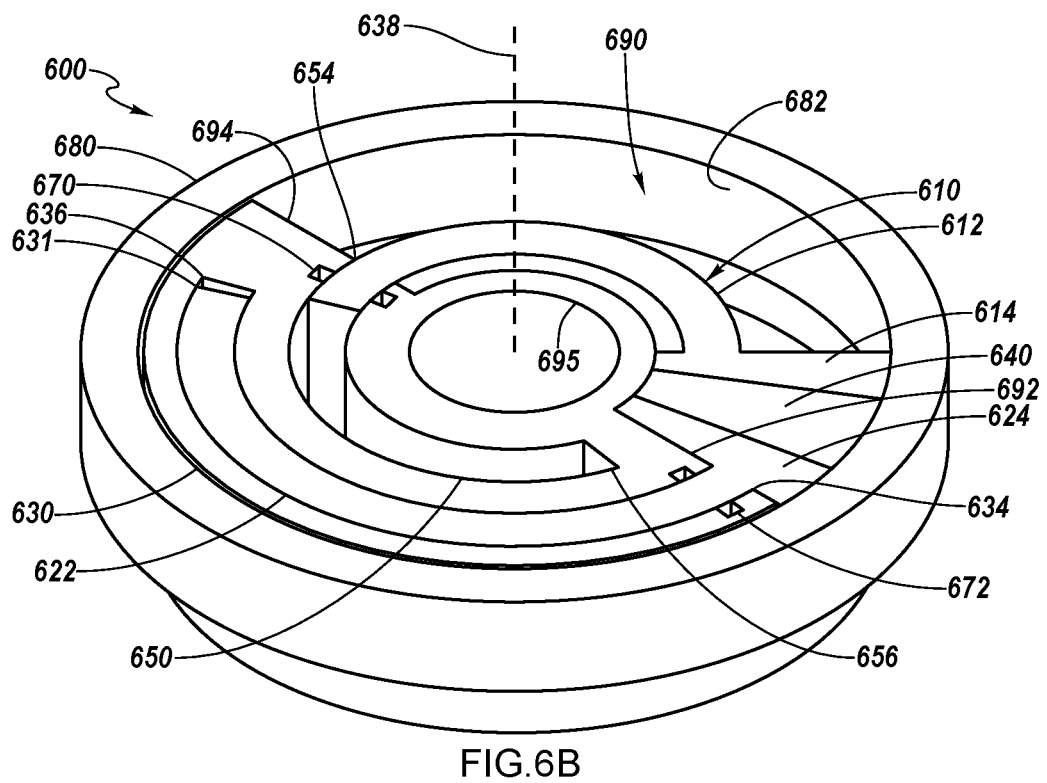

FIGS. 6A and 6B are sectional end and perspective views of an example rotary piston actuator 600 having concentrically arranged pistons. In some embodiments, the rotary piston actuator 600 can be the example rotary piston actuator 300 of FIG. 3. In some embodiments, the rotary piston actuator 600 can be used with the multi-axis joint 200 of FIG. 2. The actuator 600 includes rotary piston 610, a rotary piston 620, and a pressure chamber assembly 630. While the example actuator 600 includes two rotary pistons 610, 620, other embodiments can include greater and/or lesser numbers of cooperative and opposing rotary pistons.

The housing 630 includes an arcuate chamber 631 having a cavity that defines an arc, illustrated by a line 633. The arc 633 extends in a plane between an open end 634 of the chamber 631 and an enclosed end 636 of the chamber 631. The chamber 631 includes a fluid port (not shown) in fluid communication with the cavity. The arc 633 has a radius, illustrated by a line 635, in the plane. The radius 635 defines an axis 638 perpendicular to the plane.

The housing 630 includes an arcuate chamber 650 having a cavity that defines an arc, illustrated by a line 653. The arc 653 extends in the plane between an open end 654 of the chamber 650 and an enclosed end 656 of the chamber 650. The chamber 650 includes a fluid port (not shown) in fluid communication with the cavity. The arc 653 has a radius, illustrated by a line 655, radiating from the axis 638.

The radius 635 is greater than the radius 655, and the arc 633 has a greater diameter than the arc 653. The arcuate chamber 631 defines a space that is substantially concentric with the arcuate chamber 650 about the axis 638 in a substantially shared plane. In some embodiments, the arcuate chamber 631 can occupy an angular range about the axis 638 that can at least partly overlap an angular range occupied by the arcuate chamber 650. In the illustrated example, the angular overlap is illustrated by an arc 660. As such, the arcuate chamber 631 and the arcuate chamber 650 are concentric about the axis 638, and in some embodiments, can occupy angularly overlapping ranges about the axis 638, substantially without intersecting each other. In other words, the arcuate chamber 631 and the arcuate chamber 650 are formed as two sections of two rings, where the two rings have two different diameters such that the chambers 631, 650 do not intersect each other, and the two sections can at least partly co-occupy a range of angles about the axis 638 without the chambers 631, 650 intersecting each other.

In the example rotary piston actuator 600 shown in FIGS. 6A and 6B, the rotary piston 610 includes a piston end 612 and a contact end 614. The rotary piston 620 includes a piston end 622 and a contact end 624. The piston ends 612 and 622 are formed to have a generally geometric body having a substantially smooth surface. The contact ends 614 and 624 are configured to contact (e.g., push, urge) a rotor arm 640.

The piston end 622 has an arcuate shape that is configured to fit within the arcuate chamber 631. The piston end 622 is disposed within the housing 630 for reciprocal movement within the arcuate chamber 631, in the plane through the open end 634. A seal 672, the cavity, and the piston end 622 define another pressure chamber, and the contact end 624 is oriented to contact the rotor arm 640.

The piston end 612 has an arcuate shape that is configured to fit within the arcuate chamber 650. The piston end 612 is disposed within the housing 630 for reciprocal movement within the arcuate chamber 650, in the plane through the open end 654. A seal 670, the cavity, and the piston end 612 define a pressure chamber, and the contact end 614 is oriented to contact the rotor arm 640.

The rotary piston 610 in the example actuator 600 of FIGS. 6A-6B is oriented in rotationally opposite relative to the rotary piston 620, and the piston end 612 and the piston end 622 contact angularly opposite sides of the rotor arm 640.

The rotor arm 640 is removably connected to an inner surface 682 of a tubular rotor assembly 680. The rotor assembly 680 substantially surrounds the housing 630. An arcuate actuation space 690 is defined between the inner surface 682 and the housing 630, and between a terminal end 692 and a terminal end 694. The open end 634 is formed in the terminal end 692, and the open end 654 is formed in the terminal end 694.

As fluid pressure is applied to the arcuate chamber 631, the piston end 622 is urged outward from the arcuate chamber 631. As the arcuate piston 620 moves, the contact end 624 contacts the rotor arm 640, which is removably connected to the rotor assembly 680, to urge rotational movement of the rotor assembly 680 about the axis 638. In the illustrated example, this pressurization would cause the arcuate piston 620, the rotor arm 640, and the rotor assembly 680 to revolve counterclockwise about the axis 638.

As fluid pressure is applied to the arcuate chamber 650, the piston end 612 is urged outward from the arcuate chamber 650. As the arcuate piston 610 moves, the contact end 614 contacts the rotor arm 640, which is removably connected to the rotor assembly 680, to urge rotational movement of the rotor assembly 680 about the axis 638. In the illustrated example, this pressurization would cause the arcuate piston 610, the rotor arm 640, and the rotor assembly 680 to revolve clockwise about the axis 638.

In some embodiments, a configuration of concentric, non-intersecting, and angularly overlapping chambers 631 and 650 can provide an extended range of actuation. In the illustrated example, the arcuate actuation space 690 occupies an approximately 180° arc. As such, the rotor assembly 680 can be actuated relative to the housing 630, through an arc having a range of zero to approximately 180°, e.g., 180° minus an angular space based on the angular thicknesses of the contact ends 614 and 624 and the rotor arm 640 within the arcuate actuation space, which can vary by application.

In some embodiments, rotary piston actuator 600 can be used to pivotally connect and actuate a joint. For example, the housing 630 can be connected to a first arm portion or mounting point of a machine, and the rotor assembly 680 can be a connected to a second arm portion or mounting point on the machine, to actuate the first arm portion or mounting point relative to the second. In some embodiments, the rotary piston actuator 600 can be the rotary piston actuator 300 or 400 of FIGS. 3-5. For example, the housing 630 can be the pressure chamber assembly 320, removably connected to the joint arm 262, and the rotor assembly 680 can be the outer housing 241 removably connected to or formed integral with the joint arm 260.

The example rotary piston actuator 600 also includes a bore 695 formed substantially along the axis 683. In some implementations, one or more of the arcuate chambers 631, 650 can be in fluid communication with the bore 695 through one or more fluid ports (not shown). For example, fluid pressure can be applied to the bore 695 to pressurize the chamber 631 and urge counterclockwise movement of the rotor assembly 680. In another example, the rotor assembly 680 can be rotated clockwise, urging the piston end 622 into the chamber 631, pressurizing fluid in the chamber 631 and urging the fluid out through the port to the bore 695. In some embodiments, the bore 695 may accommodate a fluid delivery shaft configured to provide a portion of a fluid circuit between one or both of the chambers 631, 650 (e.g., through the fluid ports) and fluid supplies outside of the actuator 600 (e.g., a fluid pump or reservoir).

Figure 7A:
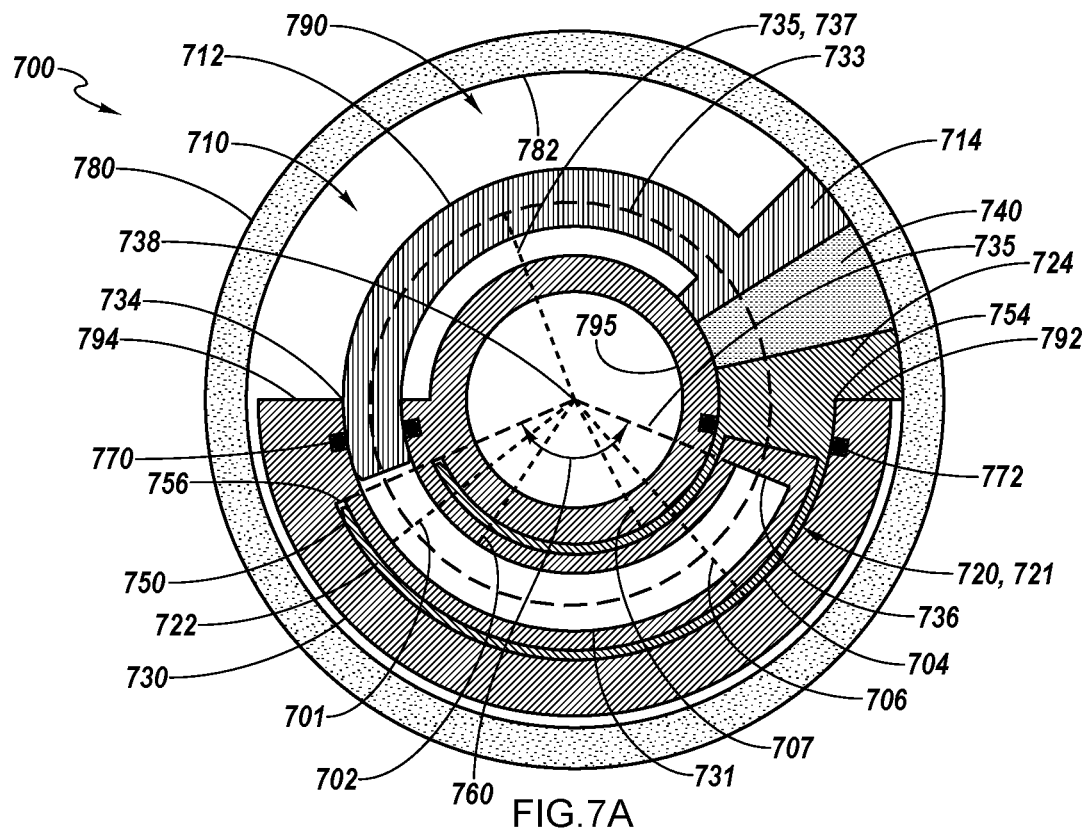
FIGS. 7A and 7B are sectional end and perspective views of an example rotary piston actuator with spatially co-located pistons.
Figure 7B:
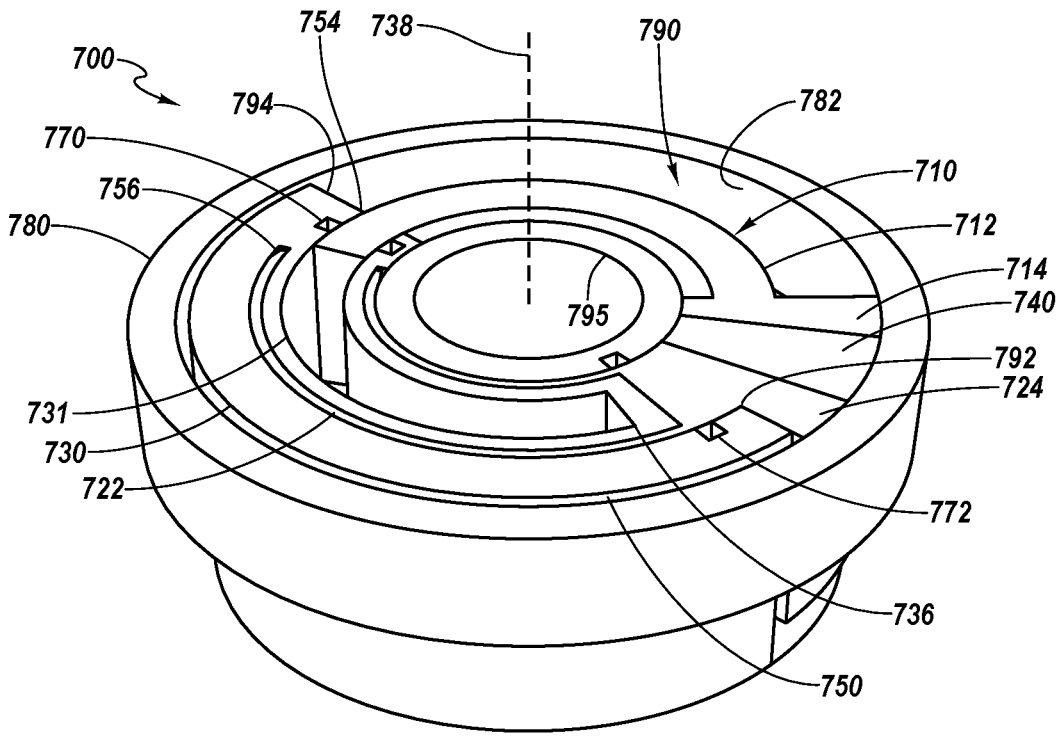

FIGS. 7A and 7B are sectional end and perspective views of an example rotary piston actuator 700 with spatially co-located (e.g., nested) pistons. In some embodiments, the rotary piston actuator 700 can be the example rotary piston actuator 300 of FIG. 3. In some embodiments, the rotary piston actuator 700 can be used with the multi-axis joint 200 of FIG. 2. The actuator 700 includes rotary piston 710, a rotary piston 720, and housing 730. While the example actuator 700 includes two rotary pistons 710, 720, other embodiments can include greater and/or lesser numbers of cooperative and opposing rotary pistons.

The actuator 700 includes a housing 730. The housing 730 includes an arcuate chamber housing 731 defining an arcuate chamber having a cavity formed as a ring-shaped segment along an arc, illustrated by a line 733. The arc 733 extends in a plane between an open end 734 of the chamber 731 and an enclosed end 736 of the chamber housing 731. The chamber housing 731 includes a fluid port (not shown) in fluid communication with the cavity. The arc 733 has a central radius, illustrated by a line 735, in the plane. The radius 735 defines an axis 738 perpendicular to the plane.

The ring-shaped segment defined by the chamber housing 731 has an outer radius 701 in the plane. The radius 735 also defines the axis 738 and extends perpendicular to the plane. The ring-shaped segment defined by the chamber housing 731 also has an inner radius 702 in the plane.

The housing 730 includes an arcuate chamber 750. The arcuate chamber 750 has an inner chamber wall 704 that defines a cavity formed as another ring-shaped segment formed along the arc 733 in the plane. The chamber 750 extends between an open end 754 and an enclosed end 756. The chamber 750 includes fluid port (not shown) in fluid communication with the cavity defined by the chamber 750. The ring-shaped segment defined by the chamber 750 has an outer radius 706 that extends from the axis 738. The outer radius 706 is larger than the outer radius 701 and is concentric with the outer radius 701 about the axis 738 in the plane. The ring-shaped segment defined by the chamber 750 also has an inner radius 707 that is smaller than the inner radius 702 and is concentric with the inner radius 702 about the axis 738 in the plane. The ring-shaped segment defined by the chamber 750 also has a central radius 737 that is substantially the same as the central radius 735

The arcuate chamber 750 is oriented rotationally opposite to the arcuate chamber housing 731 about the axis 738. The arcuate chamber housing 731 defines a space that is substantially concentric with the arcuate chamber 750 about the arc 733 in a substantially shared plane. At least a portion of the chamber housing 731 is enclosed within at least a portion of the chamber 750 in the plane. This arrangement of the chamber housing 731 concentrically within the chamber 750 defines an arcuate tubular space 721 between the arcuate chamber housing 731 and the inner chamber wall 704.

In some embodiments, the arcuate chamber housing 731 can occupy an angular range about the axis 738 that can at least partly overlap an angular range occupied by the arcuate chamber 750. In the illustrated example, the angular overlap is illustrated by an arc 760. As such, the arcuate chamber housing 731 is nested within the arcuate chamber 750 along a portion of the axis 738, and in some embodiments, can occupy angularly overlapping ranges about the axis 738, substantially without being in fluid communication each other.

In the example rotary piston actuator 700 shown in FIGS. 7A and 7B, the rotary piston 710 includes a piston end 712 and a contact end 714. The rotary piston 720 includes a piston end 722 and a contact end 724. The contact ends 614 and 624 are configured to contact (e.g., push, urge) a rotor arm 740.

The piston end 712 is formed to have a generally geometric body having a substantially smooth surface. The piston end 712 has an arcuate shape that is configured to fit within the arcuate chamber of the arcuate chamber housing 731. The piston end 712 is disposed within the housing 730 for reciprocal movement within the arcuate chamber of the arcuate chamber housing 731, in the plane through the open end 734. A seal 770, the cavity, and the piston end 712 define a pressure chamber, and the contact end 714 is oriented to contact the rotor arm 740.

The piston end 722 has an arcuate tubular shape that is configured to fit within the arcuate chamber 750. The piston end 722 is disposed within the housing 730 for reciprocal movement within the arcuate tubular space 721 between the arcuate chamber housing 731 and the inner chamber wall 704, in the plane through the open end 754. A seal 772, the cavity, and the piston end 722 define another pressure chamber, and the contact end 724 is oriented to contact the rotor arm 740.

The rotary piston 710 in the example actuator 700 of FIGS. 7A-7B is oriented in rotationally opposite relative to the rotary piston 720, and the piston end 712 and the piston end 722 contact angularly opposite sides of the rotor arm 740.

The rotor arm 740 is removably connected to an inner surface 782 of a tubular rotor assembly 780. The rotor assembly 780 substantially surrounds the housing 730. An arcuate actuation space 790 is defined between the inner surface 782 and the housing 730, and between a terminal end 792 and a terminal end 794. The open end 734 is formed in the terminal end 794, and the open end 754 is formed in the terminal end 792.

As fluid pressure is applied to the arcuate chamber 731, the piston end 712 is urged outward from the arcuate chamber 731. As the arcuate piston 710 moves, the contact end 714 contacts the rotor arm 740, which is removably connected to the rotor assembly 780, to urge rotational movement of the rotor assembly 780 about the axis 738. In the illustrated example, this pressurization would cause the arcuate piston 710, the rotor arm 740, and the rotor assembly 780 to revolve clockwise about the axis 738.

As fluid pressure is applied to the arcuate chamber 750, the piston end 722 is urged outward from the arcuate chamber 750. As the arcuate piston 720 moves, the contact end 724 contacts the rotor arm 740, which is removably connected to the rotor assembly 780, to urge rotational movement of the rotor assembly 780 about the axis 738. In the illustrated example, this pressurization would cause the arcuate piston 720, the rotor arm 740, and the rotor assembly 780 to revolve counterclockwise about the axis 738.

In some embodiments, a configuration of substantially coaxial, nested chambers, such as the arcuate chamber housing 731 within the arcuate chamber 750 can provide an extended range of actuation. In the illustrated example, the arcuate actuation space 790 occupies an approximately 180° arc. As such, the rotor assembly 780 can be actuated relative to the housing 730, through an arc having a range of zero to approximately 180°, e.g., 180° minus an angular space based on the angular thicknesses of the contact ends 714 and 724 and the rotor arm 740 within the arcuate actuation space, which can vary by application.

In some embodiments, rotary piston actuator 700 can be used to pivotally connect and actuate a joint. For example, the housing 730 can be connected to a first arm portion or mounting point of a machine, and the rotor assembly 780 can be a connected to a second arm portion or mounting point on the machine, to actuate the first arm portion or mounting point relative to the second. In some embodiments, the rotary piston actuator 700 can be the rotary piston actuator 300 or 400 of FIGS. 3-5. For example, the housing 730 can be the pressure chamber assembly 320, removably connected to the joint arm 262, and the rotor assembly 780 can be the outer housing 241 removably connected to or formed integral with the joint arm 260.

The example rotary piston actuator 700 also includes a bore 795 formed substantially along the axis 783. In some implementations, one or more of the arcuate chamber of the arcuate chamber housing 731 and the arcuate chamber 750 can be in fluid communication with the bore 795 through one or more fluid ports (not shown). For example, fluid pressure can be applied to the bore 795 to pressurize the chamber 750 and urge counter-clockwise movement of the rotor assembly 780. In another example, the rotor assembly 780 can be rotated clockwise, urging the piston end 722 into the chamber 750, pressurizing fluid in the chamber 750 and urging the fluid out through the port to the bore 795. In some embodiments, the bore 795 may accommodate a fluid delivery shaft configured to provide a portion of a fluid circuit between one or both of the chamber in the chamber housing 731 and the chamber 750 (e.g., through the fluid ports) and fluid supplies outside of the actuator 700 (e.g., a fluid pump or reservoir).

Figure 8A:
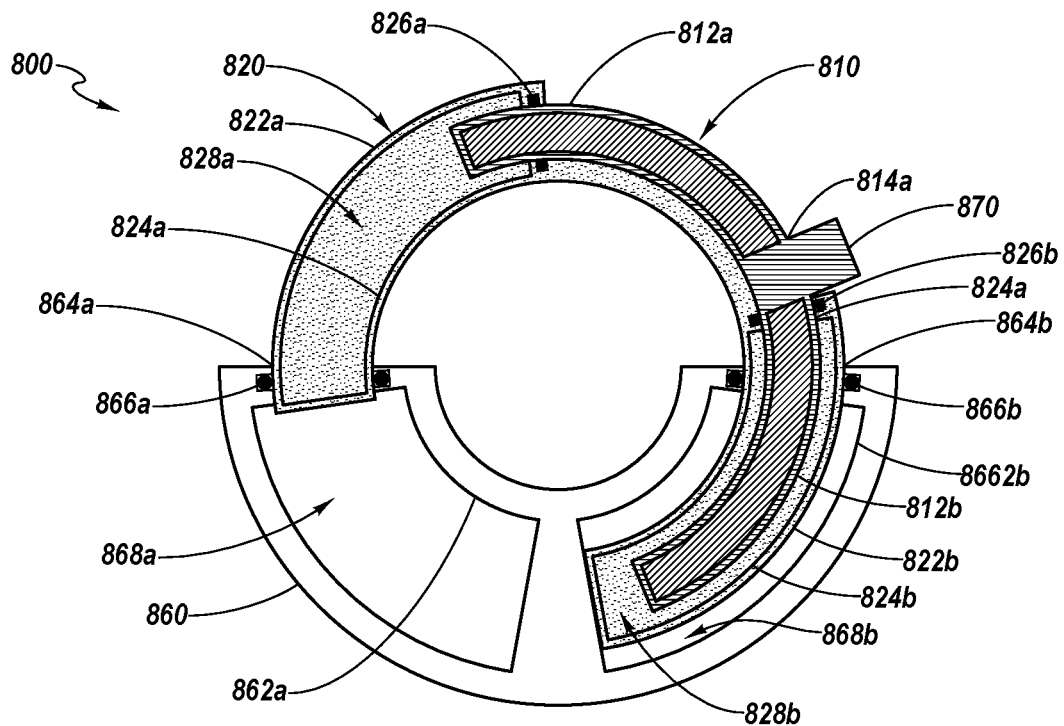
FIGS. 8A and 8B are sectional end and perspective views of an example rotary piston actuator with multi-chamber pistons.
Figure 8B:
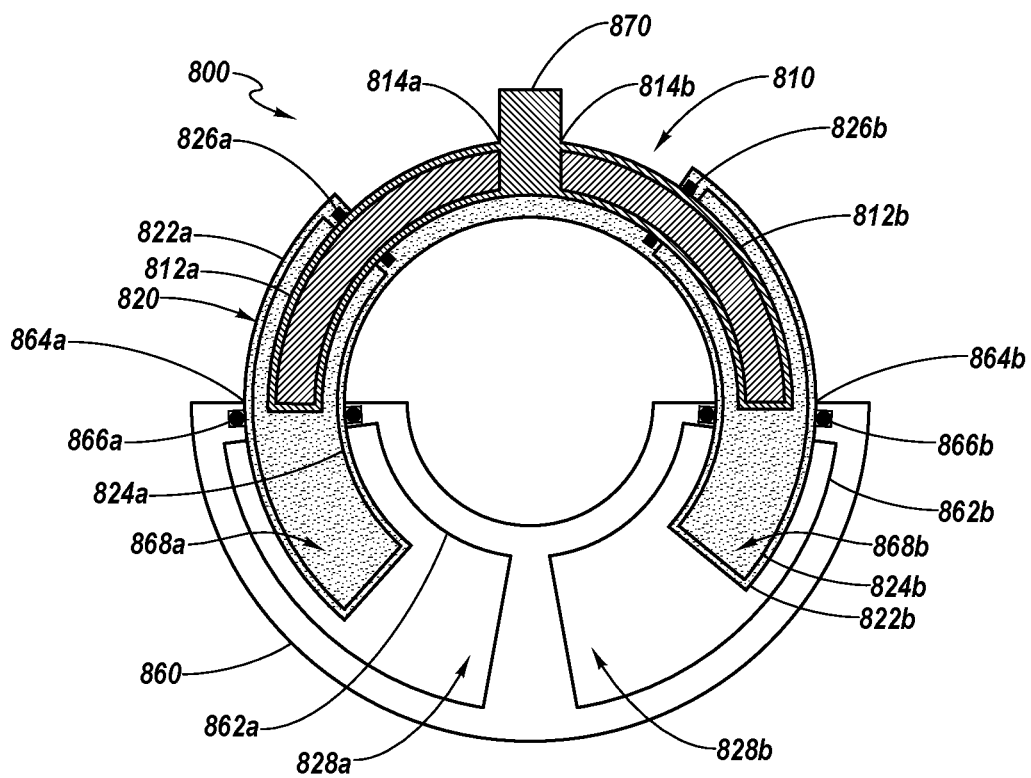

FIGS. 8A and 8B are sectional views of an example rotary piston actuator (RPA) 800 with multi-chamber pistons. In general, the rotary piston actuator 800 is configured as an RPA-within-an-RPA. In general, an RPA can be configured to have a piston that is hollow so as to act as a pressure chamber for a second piston within the hollow piston. In such an example, the hollow piston separates two independent pressure chambers that can be actuated individually, for example to provide two different torques, or to provide coarse and fine positioning control. In some embodiments, the rotary piston actuator 800 can be the example rotary piston actuator 300 of FIG. 3. In some embodiments, the rotary piston actuator 800 can be used with the multi-axis joint 200 of FIG. 2.

The actuator 800 includes a piston assembly 810, a piston assembly 820, and a pressure chamber assembly 860 (e.g., a housing). The pressure chamber assembly 860 defining a chamber including a cavity 862a, a first fluid port (not shown) in fluid communication with the cavity 862a, and an open end 864a. The pressure chamber assembly 860 also defines a chamber including a cavity 862b, a fluid port (not shown) in fluid communication with the cavity 862b, and an open end 864b.

The piston assembly 820 includes a tubular piston 822a. The tubular piston 822a defines a chamber including a cavity 824a and an open end 826a. A fluid port (not shown)

is in fluid communication with the cavity 824a. The tubular piston 822a is disposed in the pressure chamber assembly 860 for reciprocal movement in the chamber 862a through the open end 864a. A seal 866a, the cavity 824a, and the piston 822a define a pressure chamber 868a.

The piston assembly 820 includes a tubular piston 822b. The tubular piston 822b defines a chamber including a cavity 824b and an open end 826b. A fluid port (not shown) is in fluid communication with the cavity 824b. The tubular piston 822b is disposed in the pressure chamber assembly 860 for reciprocal movement in the chamber 862b through the open end 864b. A seal 866b, the cavity 824b, and the piston 822b define a pressure chamber 868b.

The piston assembly 810 includes a piston 812a disposed in the piston assembly 820 for reciprocal movement in the chamber 868a through the open end 864a. A seal 826a, the cavity 824a, and the piston 812a define a pressure chamber 828a. A portion 814a of the piston 812a contacts a rotor arm 870 (e.g., an end effector).

The piston assembly 810 includes a piston 812b disposed in the piston assembly 820 for reciprocal movement in the chamber 868b through the open end 864b. A seal 826b, the cavity 824b, and the piston 812b define a pressure chamber 828b. A portion 814b of the piston 812b contacts the rotor arm 870 (e.g., an end effector).

In the example of the actuator 800, the pressure chambers 828a, 828b, 868a, and 868b are substantially sealed from each other and can be pressurized individually. For example, a fluid pressure may be applied to the pressure chamber 828a and a different fluid pressure may be applied to the pressure chamber 828b.

In the example of the actuator 800, the pressure chamber 828a is configured to rotate the rotary piston assembly 810 in a first direction, e.g., clockwise, and the pressure chamber 828b is configured to rotate the rotary piston assembly 810 in a second direction substantially opposite the first direction, e.g., counter-clockwise.

In the example of the actuator 800, the pressure chamber 868a is configured to rotate the rotary piston assembly 820 in a first direction, e.g., clockwise, and the pressure chamber 868b is configured to rotate the rotary piston assembly 820 in a second direction substantially opposite the first direction, e.g., counter-clockwise.

In some embodiments, a configuration of nested, individually pressurizable chambers 828a, 828b, 868a, and 868b can provide an extended range of actuation. In the illustrated example, the chambers 828a, 828b, 868a, and 868b each provide approximately 90° of rotation. However, the cooperative combination of the chambers 828a and 868a can provide approximately 180° of rotation. Similarly, the cooperative combination of the chambers 828b and 868b can provide approximately 180° of rotation in the opposite direction. As such, the rotor arm 860 can be actuated relative to the housing 830, through an arc having a range of zero to approximately 180°, which can vary by application.

In some embodiments, rotary piston actuator 800 can be used to pivotally connect and actuate a joint. For example, the housing 830 can be connected to a first arm portion or mounting point of a machine, and the end effector 870 can be a connected to a second arm portion or mounting point on the machine, to actuate the first arm portion or mounting point relative to the second. In some embodiments, the rotary piston actuator 800 can be the rotary piston actuator 300 or 400 of FIGS. 3-5. For example, the housing 830 can be the pressure chamber assembly 320, removably connected to the joint arm 262, and the end effector 870 can be the outer housing 241 removably connected to or formed integral with the joint arm 260.

Figure 9:
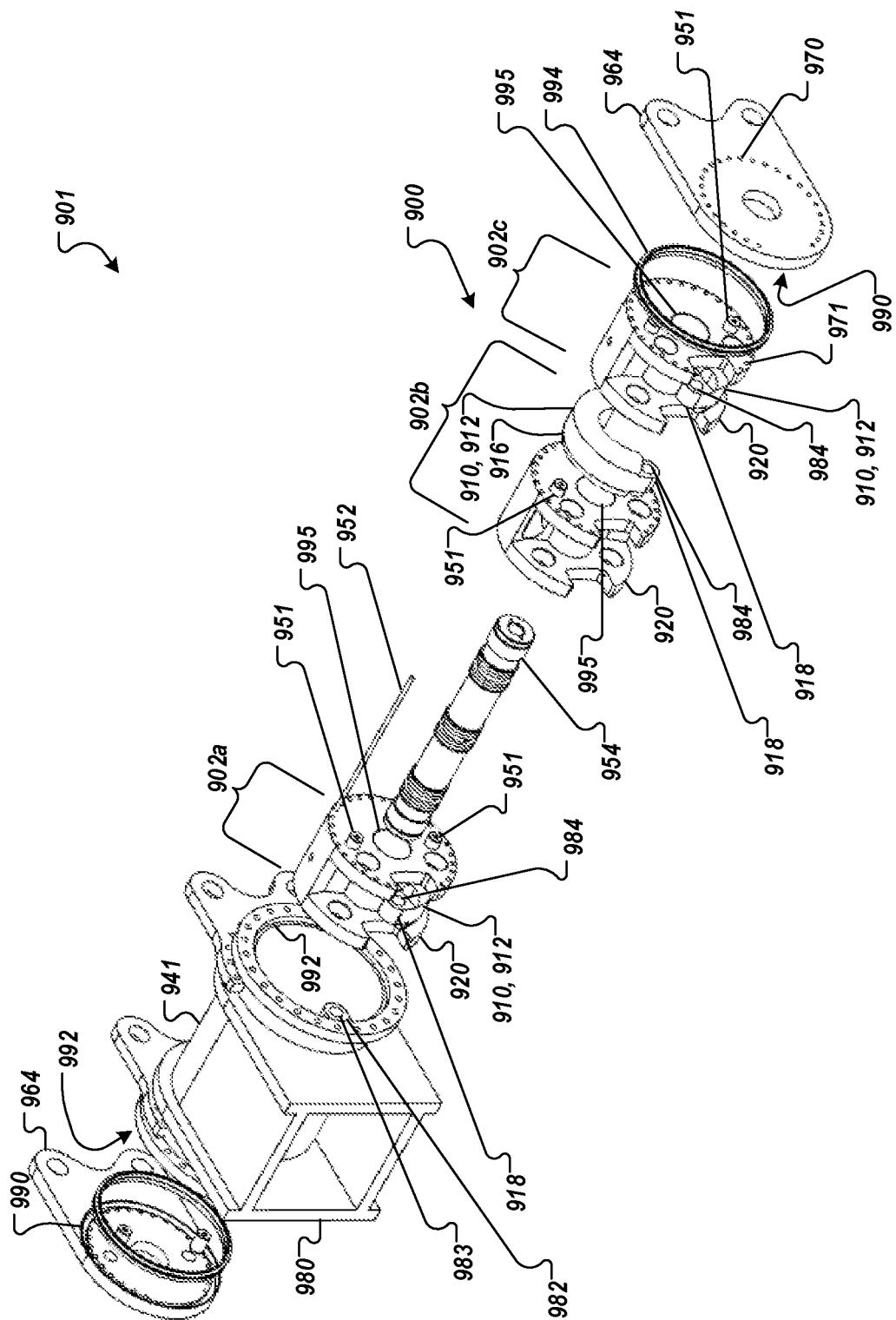
FIG. 9 is an exploded view of an example rotary piston actuator joint portion having modular rotary piston actuators.

FIG. 9 is an exploded view of an example rotary piston actuator joint portion 901. In some embodiments, the joint 901 can be used with the multi-axis joint 200 of FIG. 2, wherein the rotary piston actuator 400 has been replaced by a modular rotary piston actuator 900. In general, the modular rotary piston actuator 900 includes one or more rotary piston actuator modules, such as the examples of the actuators 600, 700, and 800 discussed in the descriptions of FIGS. 6A-8B.

The actuator 900 includes three rotary piston actuator modules 902a-902c. Generally speaking, the rotary piston actuator modules 902a-902c are individually replaceable and are generally interchangeable within the modular rotary piston actuator 900. In some embodiments, each of the modules 902a-902c can be an embodiment of any one of the rotary piston actuators 300, 400, 600, 700, or 800 of FIGS. 3-8B, or any other appropriate rotary piston actuator, rotary vane actuator, or combinations thereof.

The rotary piston actuator modules 902a-902c each include a rotary piston assembly 910 (e.g., the rotary piston assemblies 310, 810, 820, the rotary pistons 610, 620, 710, 720) and a housing 920 which also serves as a pressure chamber assembly (e.g., the pressure chamber 320, the pressure chamber assemblies 630, 730, 860).

The rotary piston assemblies 910 each includes a linkage 980 (e.g., connectable to the joint arm 260). A plurality of linkage arms 982 extend radially from the linkage 980, the distal end of each linkage arm 982 including a bore 983 substantially aligned with the axis of rotation of the rotary piston assembly 910 and sized to accommodate one of a collection of connector pins (not shown). While the example actuator 900 includes three of the modules 902a-902c, other embodiments can include greater and/or lesser numbers of cooperative and opposing rotary pistons actuator modules in various configurations.

Each of the example rotary piston assemblies 910 shown in FIG. 9, includes a rotary piston 912. Each of the rotary pistons 912 includes a piston end 916 and one or more connector arms 918. The piston ends 916 are formed to have bodies having a generally semi-circular arcs with substantially smooth surfaces. Each of the connector arms 918 includes a bore 984 substantially aligned with the axis of the semi-circular arc of its respective piston end 916 and sized to accommodate one of the connector pins (not shown).

The pressure chamber assemblies 920 have a generally cylindrical shape. The linkage 980 includes an outer housing 941 configured as a tubular wall surrounding an interior bore sized to accommodate the pressure chamber assemblies 920. The outer housing 941 is connected to, or is formed to be integral with, the linkage 980.

The rotary piston actuator modules 902a-902c are removably assembled by inserting them axially into the outer housing 941. The rotary piston actuator modules 902a-902c are interlinked rotationally by a collection of pegs 951 and corresponding recesses (not shown) formed upon the axial faces of the pressure chamber assemblies 920. The rotary piston actuator modules 902a-902c are also interlinked rotationally by a collection of rods 952 inserted through a collection of bores 970 formed in the axially through the pressure chamber assemblies 920.

Each of the pressure chamber assemblies 920 includes a central bore 995. A fluid delivery shaft 954 is arranged axially within the central bores 995. The fluid delivery shaft 954 is discussed further in the descriptions of FIGS. 10 and 11.

Each of the rotary piston actuator modules 902a-902c is configured to be removably assembled into the actuator 900 in two different operational orientations. In the illustrated example, the rotary piston actuator modules 902a and 902c are oriented to be rotationally cooperative with each other. The rotary piston actuator module 902b is oriented to be rotationally opposite to the rotary piston actuator modules 902a and 902c. In some embodiments, the rotary piston actuator modules 902a-902c can be assembled into the actuator 900 in a selected one of both clockwise and counter-clockwise orientations. In some embodiments, clockwise and counter-clockwise combinations of the rotary piston actuator modules 902a-902c can be assembled (e.g., axially arranged) into the actuator 900 in substantially any appropriate order.

While three of the rotary piston actuator modules 902a-902c are shown and described with respect to FIG. 9, in some embodiments the actuator 900 may implement greater or fewer numbers of rotary piston actuator modules. In some embodiments, greater numbers of the rotary piston actuator modules 902a-902c may be oriented in one rotational direction than the other. For example, the actuator 900 may be used in an excavator arm in which greater operational torques may be needed for lifting operations (e.g., "up" or "clockwise" rotation) than digging operations (e.g., "down" or "counter-clockwise" rotation). In such an example, the rotary piston actuator modules 902a-902c may be purposely arranged to provide an asymmetrical torque that reflects the desired operational torques.

In some embodiments, the capability to configure the actuator 900 with asymmetrical torque capabilities that reflect the application to which the actuator 900 is to be applied can improve the overall power-to-weight ratio, improve the torque-to-weight, and/or reduce the volume of space of the actuator 900. For example, a symmetrical application may require the use of two rotary piston actuator modules in a clockwise configuration and two rotary piston actuator modules in a counter-clockwise configuration (e.g., four total), whereas an asymmetrical application may only require the use of two rotary piston actuator modules in the clockwise configuration and one rotary piston actuator module in the counterclockwise (e.g., three total). In the example of the asymmetrical application, the space, power consumption, and expense associated with the fourth rotary piston actuator module may be avoided.

Furthermore, the assembly 900 may be reconfigured as needed to alter its asymmetric characteristics. For example, an excavator that originally configured to provide more lifting power than digging power for one set of tasks can be reconfigured to provide more digging power than lifting power for a different set of tasks by re-arranging or replacing the rotary piston actuator modules 902a-902c in the actuator 900.

The rotary pistons 912 may be assembled to the linkage 980 by aligning the linkage arms 982 with the connector arms 918 such that the bores 983 align with the bores 984. The connector pins (not shown) may then be inserted through the aligned bores 983, 984 to create hinged connections between the pistons 912 and the linkage 980. Each connector pin is slightly longer than the aligned bores. In the example assembly, about the circumferential periphery of each end of each connector pin that extends beyond the aligned bores is a circumferential recess (not shown) that can accommodate a retaining fastener (not shown), e.g., a snap ring or spiral ring.

The pressure chamber assemblies 920 are removably connected to the joint arm 964 by a collection of fasteners (not shown) (e.g., bolts, pins, screws) that are passed through the collection of bores 970 in the joint arm 964 and into a collection of corresponding bores 971 in the axial ends of the pressure chamber assemblies 920. In the illustrated example, fluid pressure can be introduced to controllably urge the rotary pistons 912 out of the pressure chamber assemblies 920. The movement of the rotary pistons 912 which are assembled to the linkage 980, can urge the linkage 980 to pivot relative to the joint arm 964, which is assembled to the pressure chamber assemblies 920.

The outer housing 941 substantially surrounds the pressure chamber assemblies 920. As the rotary pistons 912 are actuated, the pressure chamber assemblies 920, which have a generally cylindrical shape, rotate within the outer housing 941. The outer housing 941 provides a bearing surface that supports the pressure chamber assemblies 920 as they rotate. In some embodiments, contact between the pressure chamber assemblies 920 and the outer housing 941 can bear a load. For example, a load on the joint arm 964 can be transmitted to the pressure chamber assemblies 920, to the outer housing 941 (e.g., through the bearing surface), and on to the linkage 980.

The joint arm 964 includes a circular seal groove 990, and the outer housing 991 includes a corresponding seal groove 992. When the joint arm 964 is mounted to the pressure chamber assemblies 920, the seal groove 990 and the seal groove 992 align. The seal grooves 990 and 992 accommodate a collection of seals 994. The seals 394 substantially prevent external contaminants (e.g., dust, water, dirt, mud, sand) from entering the actuator 900, including the bearing surface between the outer housing 941 and the pressure chamber assembly 920 and including the rotary piston assemblies 910, as the joint arm 964 pivots relative to the outer housing 941. In some implementations, the sealed arrangement of the actuator 900 can thus be used or submerged in wet, dirty, or other contaminating environments substantially without exposing the internal components (e.g., the polished surfaces of the rotary pistons 912) to external contamination.

In some embodiments, the assembly 900 may include internal gearing between the pressure chamber assemblies 920 and the joint arm 964. For example, the assembly 900 may include a gear module that has a shape which is similar to those of the rotary piston actuator modules 902a-902c and can be assembled between the rotary piston actuator modules 902a-902c and the joint art 964 to modify the amount of torque or range of motion between the rotary piston actuator modules 902a-902c and the joint art 964. In some embodiments, the gear module can be a planetary gear module.

In some embodiments, the assembly 900 may include internal braking or clutching. For example, the assembly 900 may include a clutch module that has a shape which is similar to those of the rotary piston actuator modules 902a-902c and can be assembled into the assembly 900 to provide a load holding capability. In some embodiments, a gear module may include features that can controllably interfere with gear movement to provide clutching or braking control.

In some embodiments, the linkage arms 982 and the piston ends 912 may include anti-rotation features. For example, the linkage arms 982 may include extensions that intermesh rotationally about the bores 983, 984 with corresponding extensions of the piston ends 912. Such intermeshing extensions can prevent separation of the linkage arms 982 from the piston ends 912 (e.g., in the event of a break in the interconnecting rod). Such intermeshing can prevent rotation of the pistons 910 relative to the linkage arms 982 and reduce loading placed upon seals within the pressure chamber assemblies 920.

Figure 10:
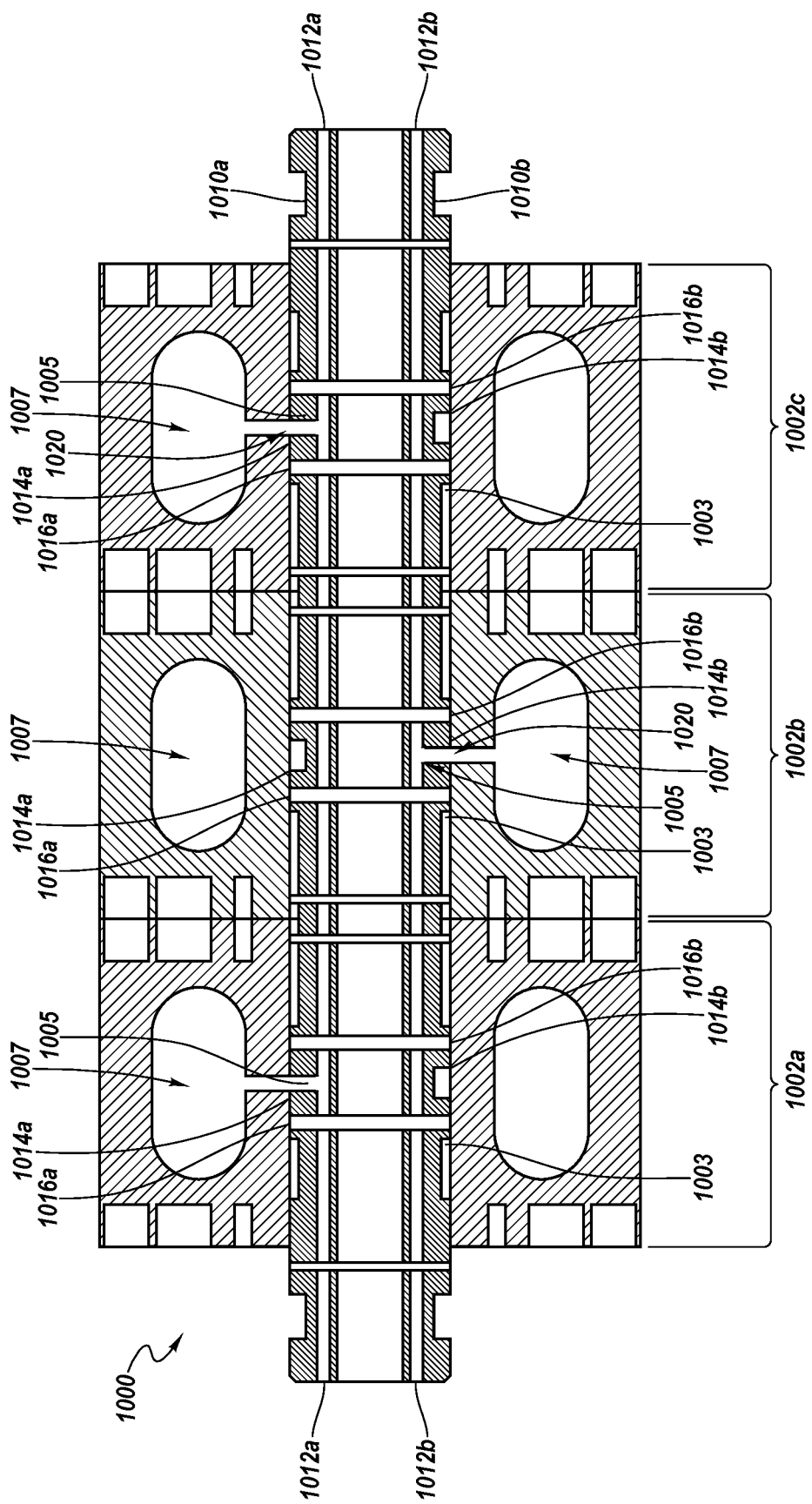
FIG. 10 is a sectional view of an example fluid delivery shaft.

FIG. 10 is a sectional view of an example fluid delivery shaft 1000. In some embodiments, the fluid delivery shaft 1000 can be the example fluid delivery shaft 954 of FIG. 9. The fluid delivery shaft 1000 is shown as being arranged axially through the central bores 1003 of a collection of modular rotary piston actuators 1002a-1002c (e.g., the modular rotary piston actuators 902a-902c). Each of the modular rotary piston actuators 1002a-1002c includes a fluid port 1005 in communication with a pressure chamber 1007.

A fluid path 1010a and a fluid path 1010b are formed within the fluid delivery shaft 1000. The fluid path 1010a extends between a pair of terminal fluid ports 1012a formed near the axial ends of the fluid delivery shaft 1000 and a collection of axial fluid ports 1014a formed along the periphery of the fluid delivery shaft 1000. Each axial fluid port 1014a substantially aligns with a corresponding one of the modular rotary piston actuators 1002a-1002c.

The fluid path 1010b extends between a pair of terminal fluid ports 1012b formed near the axial ends of the fluid delivery shaft 1000 and a collection of axial fluid ports 1014b formed along the periphery of the fluid delivery shaft 1000. Each axial fluid port 1014b substantially aligns with a corresponding one of the modular rotary piston actuators 1002a-1002c, radially opposite from a corresponding axial fluid port 1014a.

A collection of seals 1016 are arranged about the periphery of the fluid delivery shaft 1000. Each of the fluid ports 1005 and corresponding opposing pairs of axial fluid ports 1014a and 1014b have a seal 1016a arranged on a first side axial side of the fluid ports 1005 and the axial fluid ports 1014a and 1014b along the length of the fluid delivery shaft 1000, and have a seal 1016b on a second, opposite axial side of the fluid ports 1005 and the axial fluid ports 1014a and 1014b along the length of the fluid delivery shaft 1000.

For each of the modular rotary piston actuators 1002a-1002c, the bore 1003, the seal 1016a, the seal 101b, and the fluid delivery shaft 1000 define a fluid delivery chamber 1020. This arrangement creates a fluid circuit that can connect the axial fluid ports 1014a and 1014b to the pressure chambers 1007 through the fluid ports 1005. As such, the terminal fluid ports 1012a, 1012b are in fluid communication with the pressure chambers 1007.

Each of the modular rotary piston actuators 1002a-1002c can be assembled about the fluid delivery shaft 1000 in two arrangements (e.g., clockwise and counter-clockwise). In the illustrated example, the modular rotary piston actuators 1002a and 1002c are assembled in a first orientation and the modular rotary piston actuator 1002b is assembled in an opposite orientation. A collection of plugs 1030 can be inserted into selected ones of the axial fluid ports 1014a and 1014b to select which of the fluid paths 1011a, 1011b provides fluid to the chambers 1007. In the illustrated example, the ports 1014b of the modular rotary piston actuators 1002a and 1002c are blocked by the plugs 1030, and the port 1014a of the modular rotary piston actuator 1002b. In the illustrated configuration, the fluid path 1011a can be pressurized to provide fluid to the modular rotary piston actuators 1002a and 1002c to urge rotation in a first direction, and the fluid path 1011b can be pressurized to provide fluid to the modular rotary piston actuator 1002b to urge rotation in an opposite direction.

Figure 11:
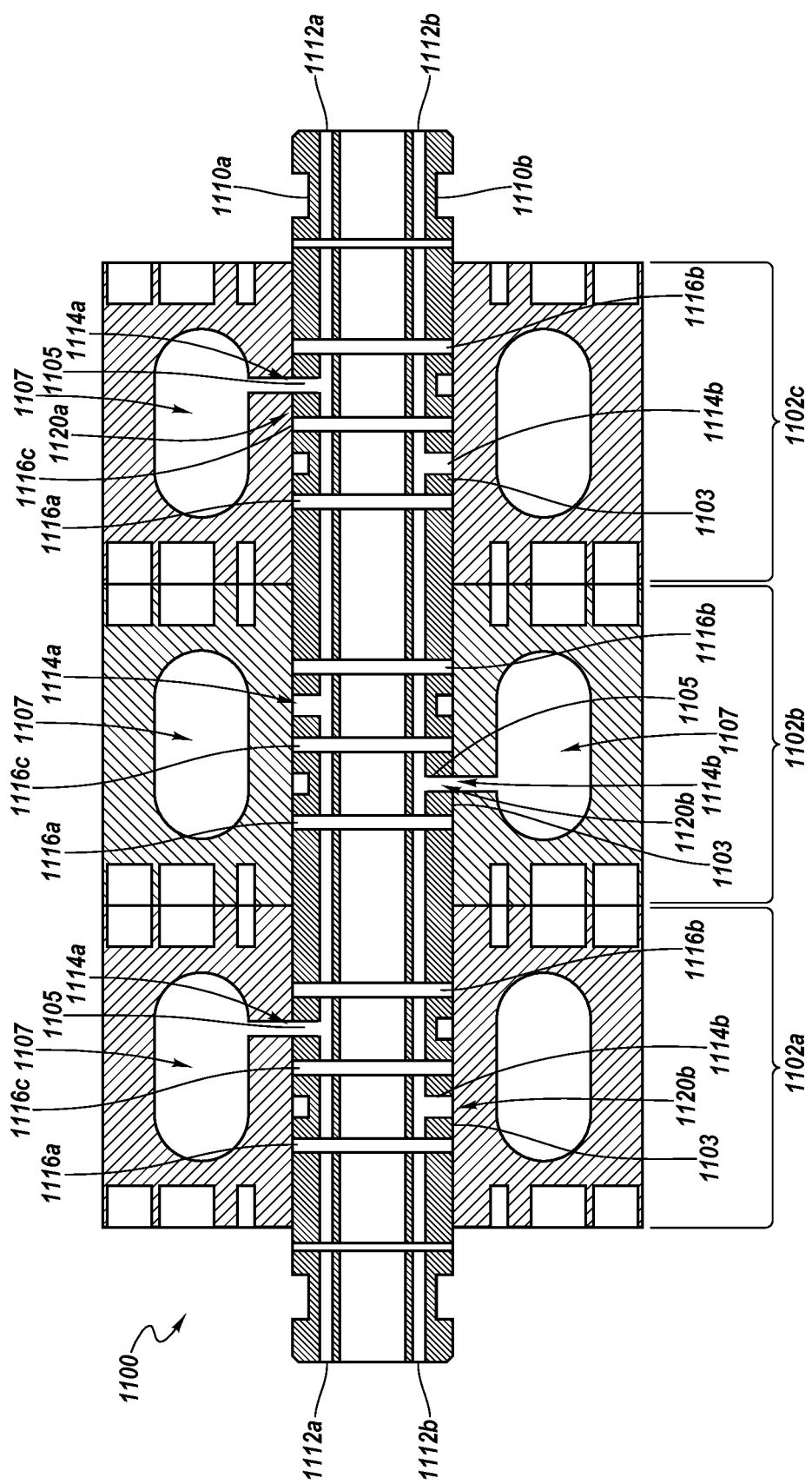
FIG. 11 is a sectional view of another example fluid delivery shaft.

FIG. 11 is a sectional view of an example fluid delivery shaft 1100. In some embodiments, the fluid delivery shaft 1100 can be the example fluid delivery shaft 954 of FIG. 9. The fluid delivery shaft 1100 is shown as being arranged axially through the central bores 1103 of a collection of modular rotary piston actuators 1102a-1102c (e.g., the modular rotary piston actuators 902a-902c). Each of the modular rotary piston actuators 1102a-1102c includes a fluid port 1105 in communication with a pressure chamber 1107.

A fluid path 1110a and a fluid path 1110b are formed within the fluid delivery shaft 1100. The fluid path 1110a extends between a pair of terminal fluid ports 1112a formed near the axial ends of the fluid delivery shaft 1100 and a collection of axial fluid ports 1114a formed along the periphery of the fluid delivery shaft 1100. Each axial fluid port 1114a substantially aligns with a corresponding one of the modular rotary piston actuators 1102a-1102c.

The fluid path 1110b extends between a pair of terminal fluid ports 1112b formed near the axial ends of the fluid delivery shaft 1100 and a collection of axial fluid ports 1114b formed along the periphery of the fluid delivery shaft 1100. Each axial fluid port 1114b substantially aligns with a corresponding one of the modular rotary piston actuators 1102a-1102c, radially opposite from a corresponding axial fluid port 1114a.

A collection of seals 1116 are arranged about the periphery of the fluid delivery shaft 1100. Each of the fluid ports 1105 and corresponding pairs of axial fluid ports 1114a and 1114b have a seal 1116a arranged on a first side axial side of the fluid ports 1105 and the axial fluid ports 1114a and 1114b along the length of the fluid delivery shaft 1100, and have a seal 1116b on a second, opposite axial side of the fluid ports 1105 and the axial fluid ports 1114a and 1014b along the length of the fluid delivery shaft 1100. A third seal 1116c is arranged substantially centered between each pair of seals 1116a and 1116b.

For each of the modular rotary piston actuators 1002a-1002c, the bore 1003, the seal 1116a, the seal 111b, and the fluid delivery shaft 1100 define a fluid delivery chamber 1120a, and the seal 1116c, the seal 111b, and the fluid delivery shaft 1100 define a fluid delivery chamber 1120b. This arrangement creates a fluid circuit that can connect the axial fluid ports 1114a and 1114b to the pressure chambers 1107 through the fluid ports 1105. As such, the terminal fluid ports 1112a, 1112b are in fluid communication with the pressure chambers 1107.

Each of the modular rotary piston actuators 1102a-1102c can be assembled about the fluid delivery shaft 1100 in two arrangements (e.g., clockwise and counter-clockwise). In the illustrated example, the modular rotary piston actuators 1102a and 1102c are assembled in a first orientation and the modular rotary piston actuator 1102b is assembled in an opposite orientation.

The fluid port 1105 in each of the modular rotary piston actuators 1102a-1102c is offset axially away from the center of the pressure chamber along the bore 1103. As such, the fluid port 1105 will be closer to a proximal end of the fluid delivery shaft 1100 and further away from the distal end when assembled to the fluid delivery shaft 1100 in a first orientation, and the fluid port 1105 will be relatively further away from the proximal end and relatively closer to the distal end in the opposite orientation.

When assembled about the fluid delivery shaft 1100, and depending on the orientation of the modular rotary piston actuators 1102a-1102c, the fluid ports 1105 will be aligned between either the seal 1116a and the seal 1116c, or between the seal 1116b and the seal 1116c. As such, depending on the orientation of the modular rotary piston actuators 1102a-1102c, either the fluid delivery chambers 1120a will fluidly connect the fluid path 1111*a* with the chambers 1107, or the fluid delivery chambers 1120*b* will fluidly connect the fluid path 1111*b* with the chambers 1107. In the illustrated example, the fluid ports 1105 of the modular rotary piston actuators 1102*a* and 1102*c* are aligned with the fluid delivery chambers 1120*a*, and the port 1105 of the modular rotary piston actuator 1102*b* is aligned with the fluid delivery chamber 1120*b*. In the illustrated configuration, the fluid path 1111*a* can be pressurized to provide fluid to the modular rotary piston actuators 1102*a* and 1102*c* to urge rotation in a first direction, and the fluid path 1111*b* can be pressurized to provide fluid to the modular rotary piston actuator 1102*b* to urge rotation in an opposite direction.

Figure 12:
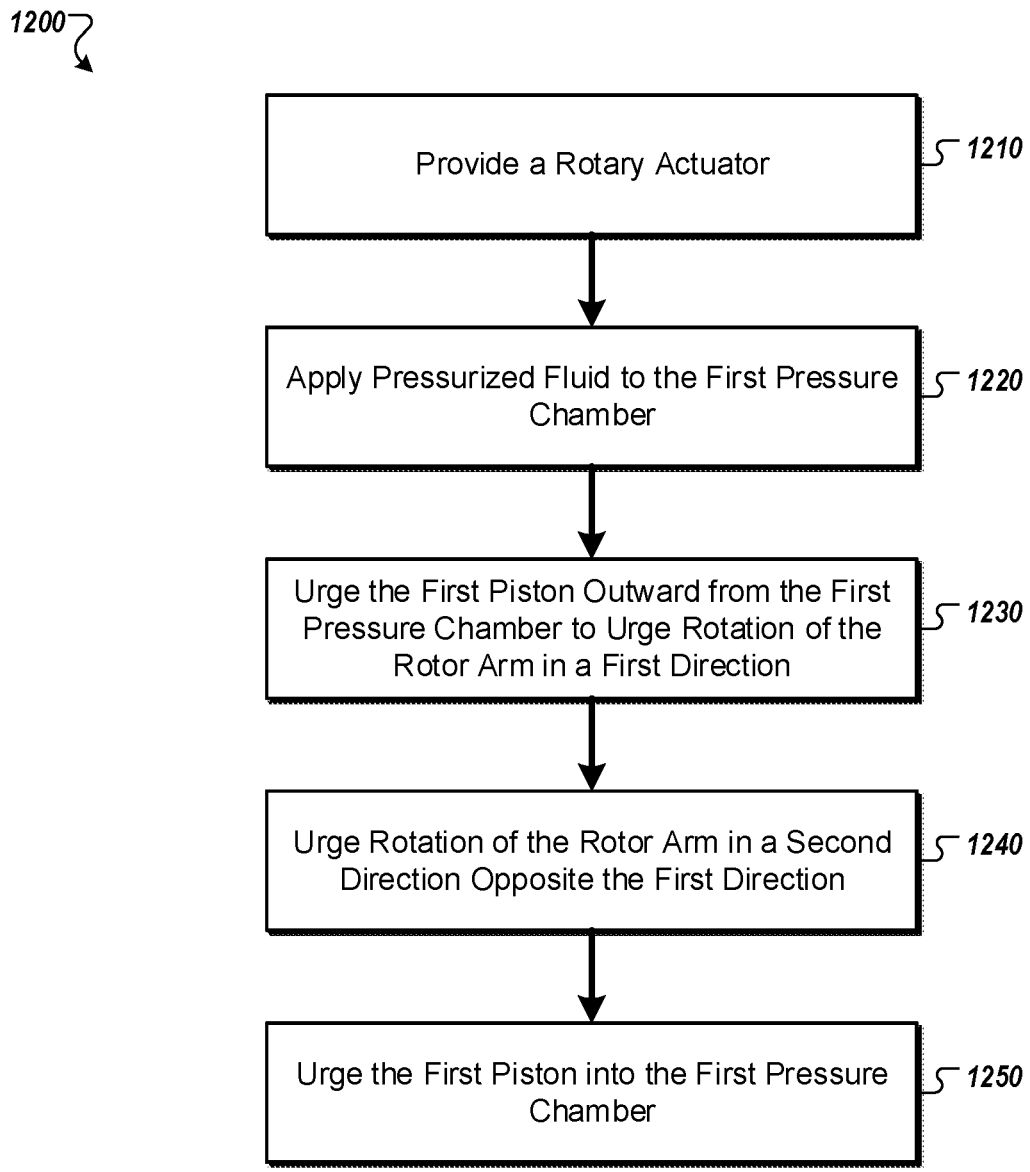
FIG. 12 is a flow diagram of an example process for performing rotary actuation.

FIG. 12 is a flow diagram of an example process 1200 for performing rotary actuation. In some implementations, the process 1200 can be performed by the rotary piston-type actuators 300, 400, 600, 700, 800, 900, 1002*a*-1002*c*, and/or 1102*a*-1102*c* of FIGS. 3-11.

At 1210, a rotary actuator is provided. The rotary actuator of example actuator 1200 includes a first housing defining a first arcuate chamber including a first cavity, a first fluid port in fluid communication with the first cavity, an open end, and a first seal disposed about an interior surface of the open end, a rotor arm extending radially outward, and an arcuate-shaped first piston disposed in the first housing for reciprocal movement in the first arcuate chamber through the open end. The first seal, the first cavity, and the first piston define a first pressure chamber. For example, the actuator 600 includes the components of the pressure chamber assembly 630 and the rotary piston 610.

At 1220, a pressurized fluid is applied to the first pressure chamber. For example, pressurized fluid can be flowed through the fluid port (not shown) into the pressure chamber 650.

At 1230, the first piston is urged partially outward from the first pressure chamber to urge rotation of the rotor arm in a first direction. For example, a volume of pressurized fluid flowed into the pressure chamber 650 will displace a similar volume of the rotary piston 610, causing the rotary piston 610 to be partly urged out of the pressure chamber 650, which in turn will cause the rotor arm 640 to rotate clockwise.

At 1240, the rotary output shaft is rotated in a second direction opposite that of the first direction. For example, the rotor arm 640 can be rotated counter-clockwise by an external force, such as another mechanism, a torque-providing load, a return spring, or any other appropriate source of rotational torque.

At 1250, the first piston is urged partially into the first pressure chamber to urge pressurized fluid out the first fluid port. For example, the rotary piston 610 can be pushed into the pressure chamber 650, and the volume of the piston end 612 extending into the pressure chamber 650 will displace a similar volume of fluid, causing it to flow out the fluid port (not shown).

In some embodiments, the example process 100 can be used to provide substantially constant power over stroke to a connected mechanism. For example, as the actuator 600 rotates, there may be substantially little position-dependent variation in the torque delivered to a connected load.

In some embodiments, the first housing further defines a second arcuate chamber including a second cavity, a second fluid port in fluid communication with the second cavity, and a second seal disposed about an interior surface of the open end, the rotor assembly also includes a second rotor arm, the rotary actuator also includes an arcuate-shaped second piston disposed in said housing for reciprocal movement in the second arcuate chamber, wherein the second seal, the second cavity, and the second piston define a second pressure chamber, and a second connector coupling a first end of the second piston to the second rotor arm. For example, the actuator 600 includes the pressure chamber 631 and the rotary piston 620.

In some embodiments, the second piston can be oriented in the same rotational direction as the first piston. For example, the two pistons 812*a* and 822*a* are oriented to operate cooperatively in the same rotational direction. In some embodiments, the second piston can be oriented in the opposite rotational direction as the first piston. For example, the rotary piston 610 is oriented to operate in the opposite rotational direction relative to the rotary piston 620.

In some implementations, rotating the rotary output shaft in a second direction opposite that of the first direction can include applying pressurized fluid to the second pressure chamber, and urging the second piston partially outward from the second pressure chamber to urge rotation of the rotary output shaft in a second direction opposite from the first direction. For example, pressurized fluid can be applied to the pressure chamber 631 to urge the rotary pistons 620 outward, causing the rotor arm 640 to rotate counter-clockwise.

Figure 13:
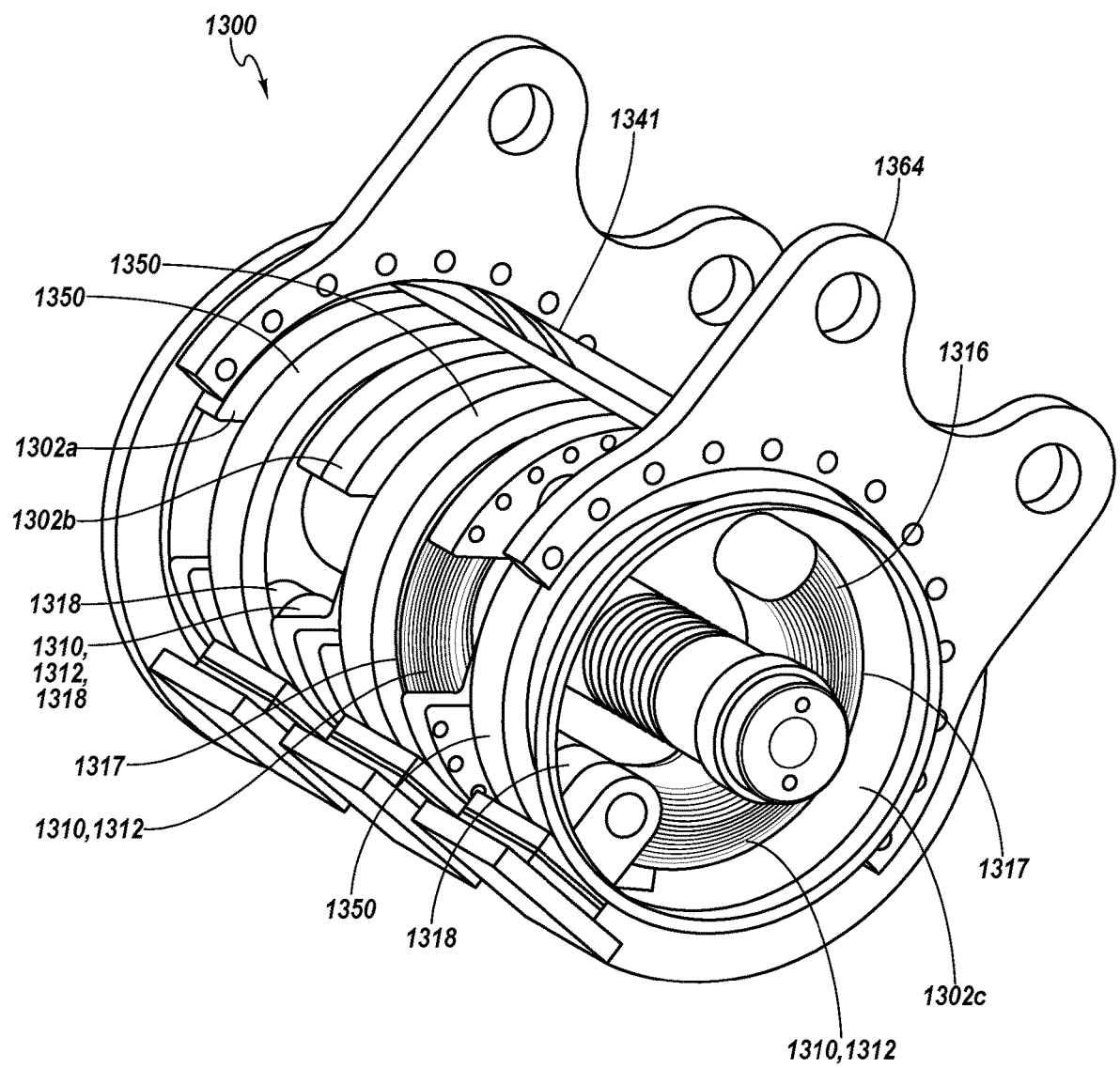
FIG. 13 is a perspective view of an example rotary piston actuator joint portion having arcuate bearing sleeve assemblies.

FIG. 13 is a perspective view of an example rotary piston actuator joint portion 1300 having modular support bands. In some embodiments, the rotary piston actuator joint portion 1300 can be a modification of the example rotary piston actuator joint portion 901 of FIG. 9 to include a collection of arcuate bearing sleeve assemblies 1350*a*-1350*c* (e.g., modular support bands).

In some embodiments, the joint 1300 can be used with the multi-axis joint 200 of FIG. 2, wherein the rotary piston actuator 400 has been replaced by a modular rotary piston actuator 900. In general, the joint 1300 includes one or more rotary piston actuator modules, such as the examples of the actuators 600, 700, and 800 discussed in the descriptions of FIGS. 6A-8B.

The joint 1300 includes three rotary piston actuator modules 1302*a*-1302*c*. Generally speaking, the rotary piston actuator modules 1302*a*-1302*c* are individually replaceable and are generally interchangeable within the joint 1300. In some embodiments, each of the modules 1302*a*-1302*c* can be an embodiment of any one of the rotary piston actuators 300, 400, 600, 700, or 800 of FIGS. 3-8B, any one of the rotary piston actuator modules 902*a*-902*c* of FIG. 9, or any other appropriate rotary piston actuator, rotary vane actuator, or combinations thereof.

The rotary piston actuator modules 1302*a*-1302*c* each include a rotary piston assembly 1310 (e.g., the rotary piston assemblies 310, 810, 820, the rotary pistons 610, 620, 710, 720, 910) and a housing (not shown) which also serves as a pressure chamber assembly (e.g., the pressure chamber 320, the pressure chamber assemblies 630, 730, 860, 920). While the example joint 1300 includes three of the modules 1302*a*-1302*c*, other embodiments can include greater and/or lesser numbers of cooperative and opposing rotary pistons actuator modules in various configurations.

Each of the example rotary piston assemblies 1310 shown in FIG. 13, includes a rotary piston 1312 (e.g., the rotary piston 912). Each of the rotary pistons 1312 includes a piston end 1316 and one or more connector arms 1318. The piston ends 1316 are formed to have bodies having a generally semi-circular arcs with substantially smooth surfaces.

The pressure chamber assemblies (e.g., the pressure chamber 320, the pressure chamber assemblies 630, 730,

860, 920) have a generally cylindrical shape. An outer housing 1341 (e.g., the outer housing 941) is configured as a tubular wall surrounding an interior bore sized to accommodate the pressure chamber assemblies. In some embodiments, the outer housing 1341 can be connected to, or can be formed to be integral with, a linkage such as the example linkage 980.

The outer housing 1341 substantially surrounds the pressure chamber assemblies. As the rotary pistons 1312 are actuated, the pressure chamber assemblies, which have a generally cylindrical shape, rotate within the outer housing 1341. The outer housing 1341 provides a bearing surface that supports the pressure chamber assemblies as they rotate. In some embodiments, contact between the pressure chamber assemblies and the outer housing 1341 can bear a load. For example, a load on the joint arm 1364 can be transmitted to the pressure chamber assemblies, to the outer housing 1341 (e.g., through the bearing surface), and on to the linkage.

The rotary piston actuator modules 1302*a*-1302*c* each include one of the arcuate bearing sleeve assemblies 1350, each formed as a modular wear band. Each of the arcuate bearing sleeve assemblies 1350 has a ring section that is generally semicircular (e.g., crescent or "C" shaped). Each of the arcuate bearing sleeve assemblies 1350 is arranged radially between the corresponding rotary piston 1312 and the inner wall of the outer housing 1341. The arcuate bearing sleeve assemblies 1350 are each in contact with a radially outer side 1317 of a corresponding one of the rotary pistons 1312 and the inner wall of the outer housing 1341. As the rotary pistons 1312 are actuated, the arcuate bearing sleeve assemblies 1350 each provide a bearing surface that contacts the radially outer sides 1317 of the rotary pistons 1312 and supports the rotary pistons 1312 as they extend and retract from the pressure chamber assemblies. In some embodiments, contact between the rotary pistons 1312, the arcuate bearing sleeve assemblies 1350, and the outer housing 1341 can redirect radial loads on the rotary pistons 1312.

For example, as the rotary pistons 1312 extend, radial (e.g., outward) forces may develop. Such radial loads can place increased stress upon piston seals (e.g., the seals 670, 672 of FIGS. 6A, 6B), causing increased friction and wear, and increased friction and wear can reduce performance (e.g., torque output) and lifespan (e.g., time to seal or other component failure). To reduce the effects of such radial forces, the arcuate bearing sleeve assemblies 1350 are contacted by the rotary pistons 1312 as the rotary pistons 1312 extend. Radial forces exerted by the rotary pistons 1312 is transmitted through arcuate bearing sleeve assemblies 1350 to the to the housing 1341, thus providing a force that resists and/or redirects the radial forces and at least partly relieves radial stresses placed upon the seals. As the stresses are relieved, actuator performance (e.g., torque) is maintained or restored.

Figure 14:
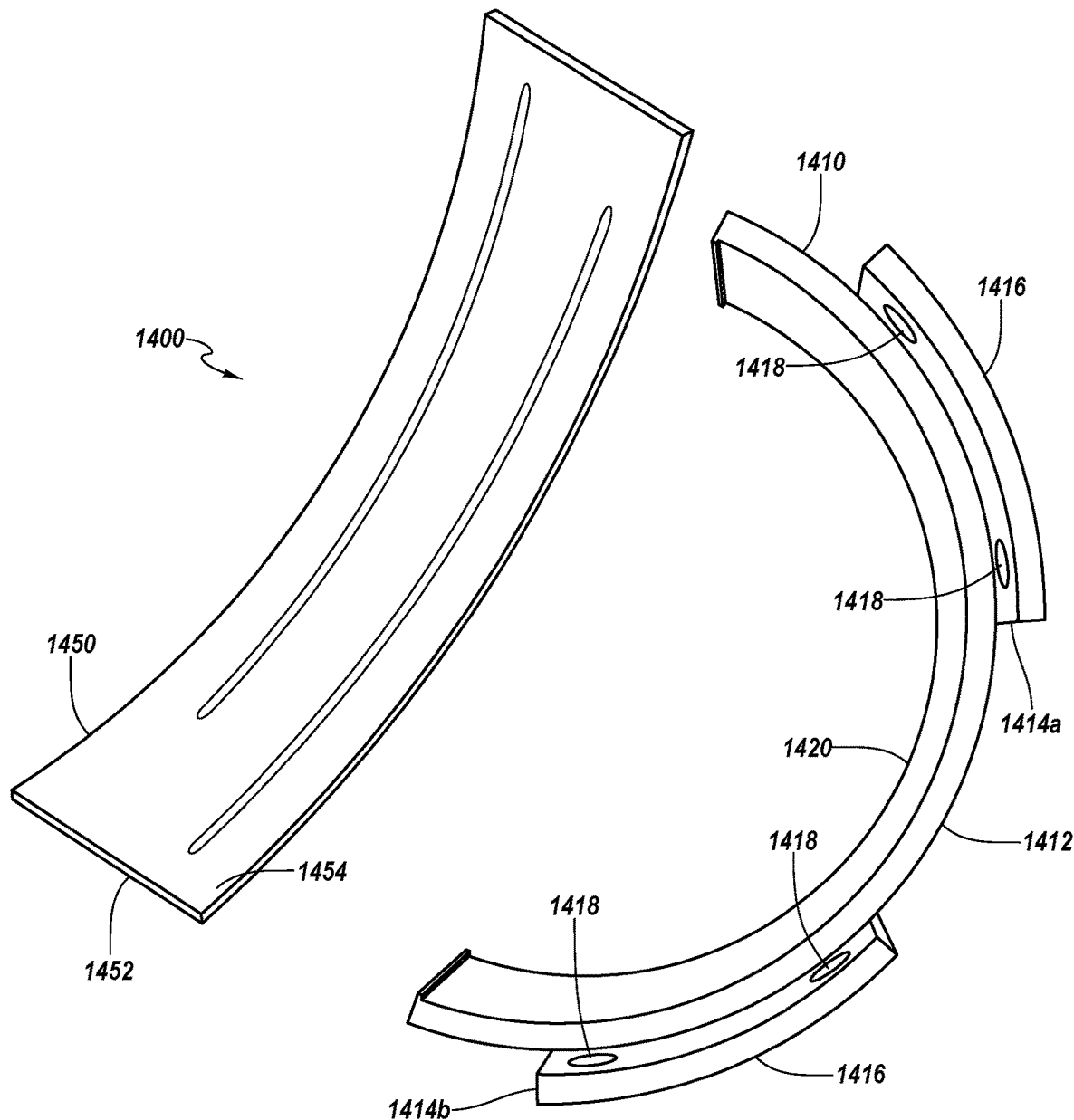
FIG. 14 is an exploded view of an example arcuate bearing sleeve assembly for rotary piston actuators.

FIG. 14 is an exploded view of an example arcuate bearing sleeve assembly 1400 for rotary piston actuators. In some embodiments, the arcuate bearing sleeve assembly 1400 can be one of the example arcuate bearing sleeve assemblies 1350 of FIG. 13 (e.g., a modular support band).

The example arcuate bearing sleeve assembly 1400 includes an arcuate support portion 1410. The arcuate support portion 1410 includes a ring section 1412 that is generally semicircular (e.g., crescent or "C" shaped). A mounting portion 1414*a* extends radially outward from a first end of the ring section 1412 at a first end, and mounting portion 1414*b* extends radially outward from a second end of the ring section 1412. The mounting portions 1414*a*-1414*b* each have an arcuate outer surface 1416 that is configured to substantially conform to the curvature of the inner wall of the outer housing 1341. The arcuate support portions 1410 include a collection of apertures 1418 configured to accept a collection of fasteners, for example, to removably affix the arcuate support portions 1410 to the inner wall of the outer housing 1341.

The example arcuate bearing sleeve assembly 1400 also includes a liner portion 1450. The liner portion 1450 is generally semicircular (e.g., crescent or "C" shaped), with a radially outer surface 1452 that is configured to conform to an inner surface 1420 of the arcuate support portion 1410, and a radially inner surface 1454 that is configured to conform to the radially outer surface of the rotary pistons 1312. The liner portion 1450 is semi-concentrically assembled to the arcuate support section 1410 such that the radially outer surface 1452 contacts the inner surface 1420.

In some embodiments, the liner portion 1450 is a wearable member that can be replaced. For example, contact between the rotary piston 1312 and the arcuate bearing sleeve portion 1400 over time can cause wear of the liner portion 1450. The liner portion 1450 can be removed and replaced to maintain the radial load bearing capability of the arcuate bearing sleeve assembly 1400.

In some embodiments, the liner portion 1450 can include friction-reducing features. For example, the liner portion 1450 can be at least partly constructed or coated with friction-reducing materials (e.g., PTFE). In other examples, the inner surface 1454 can be textured (e.g., crosshatched) to retain and/or distribute lubricants to points of contact between the inner surface 1454 and the rotary pistons 1312.

Figure 15A:
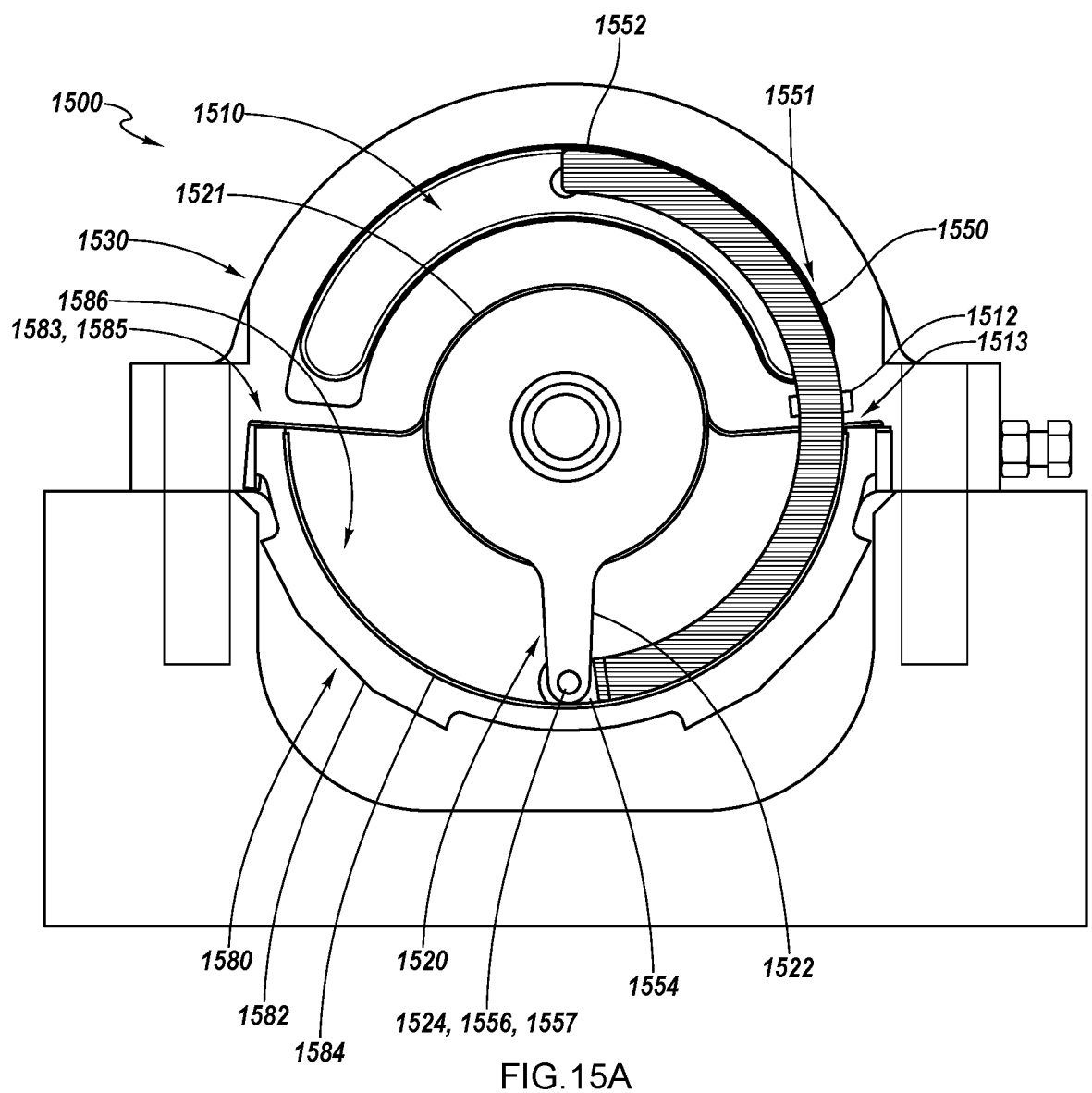
FIGS. 15A and 15B are a sectional side view and exploded view, respectively, of another example rotary piston actuator having an arcuate bearing sleeve assembly.
Figure 15B:
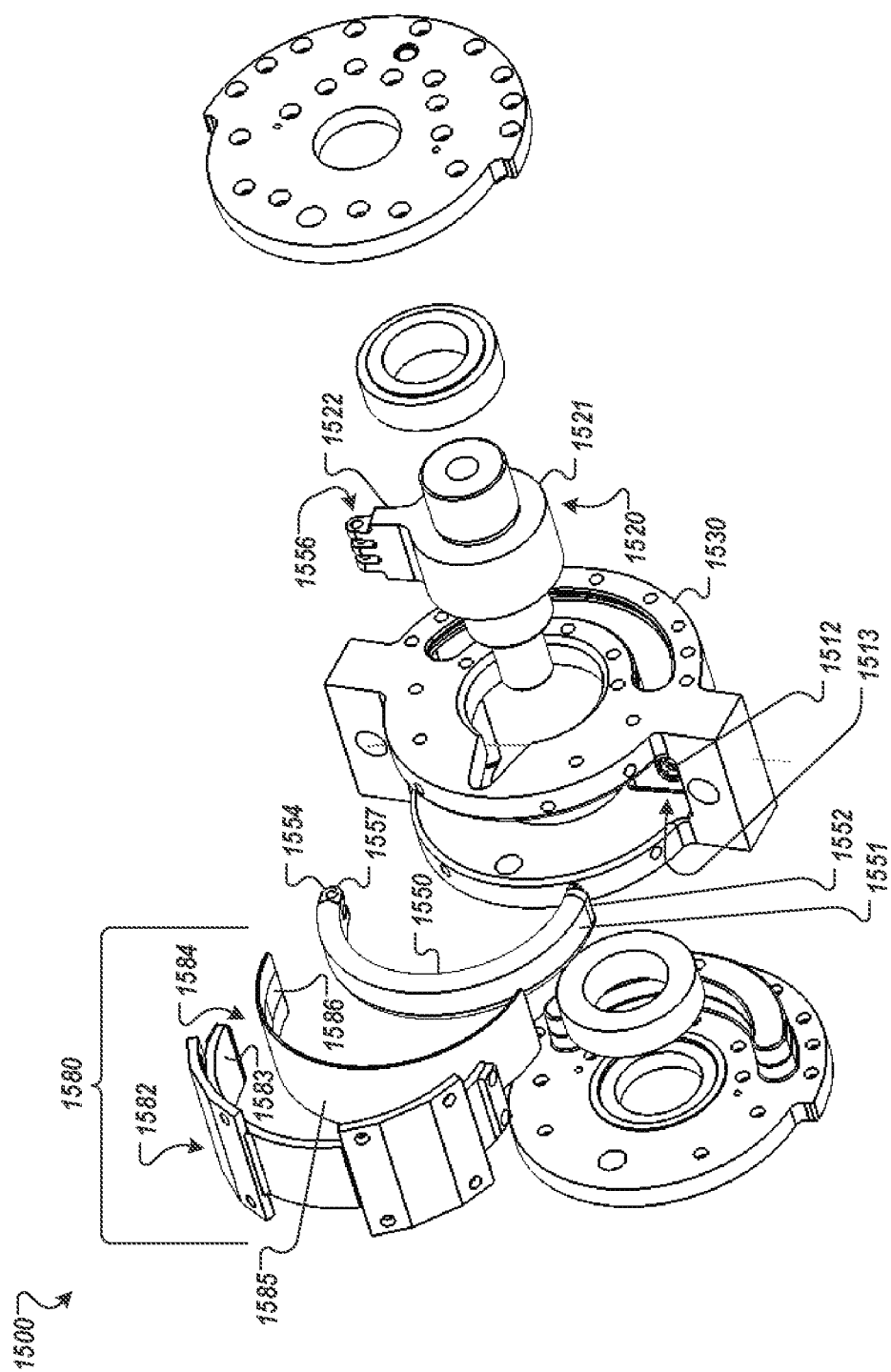

FIGS. 15A and 15B are a sectional side view and exploded view, respectively, of another example rotary piston actuator 1500 having an arcuate bearing sleeve assembly. The actuator 1500 includes a rotary piston assembly 1520 and a pressure chamber assembly 1530.

The rotary piston assembly 1520 includes a rotor shaft 1521. A rotor arm 1522 extends radially from the rotor shaft 1521, the distal end of the rotor arm 1522 including a bore 1556 substantially aligned with the axis of the rotor shaft 1521 and sized to accommodate a connector pin 1524.

The actuator includes a rotary piston 1550 that includes a piston end 1552 and one or more connector arms 1554. The piston end 1552 is formed to have a generally semi-circular body having a substantially smooth surface. Each of the connector arms 1554 includes a bore 1557 substantially aligned with the axis of the semi-circular body of the piston end 1552 and sized to accommodate the connector pin 1524.

The rotary piston 1550 may be assembled to the rotor shaft 1521 by aligning the connector arm 1554 with the rotor arms 1522 such that the bore 1556 of the rotor arm 1522 aligns with the bore 1557 of the connector arm 1554. The connector pin 1524 may then be inserted through the aligned bores to create a hinged connection between the piston 1550 and the rotor shaft 1521. The connector pin 1524 is slightly longer than the aligned bores. In the example assembly, about the circumferential periphery of each end of each connector pin 1524 that extends beyond the aligned bores is a circumferential recess (not shown) that can accommodate a retaining fastener (not shown), e.g., a snap ring or spiral ring.

The rotary piston 1550 is inserted into a corresponding pressure chamber 1510 formed as an arcuate cavity in the pressure chamber assembly 1530. The pressure chamber 1510 includes a seal assembly 1512 about the interior surface of the pressure chamber 1510 at an open end 1513. In some implementations, the seal assembly 1512 can be a circular or semi-circular sealing geometry retained on all sides in a standard seal groove. In some implementations, a commercially available reciprocating piston or cylinder type seal can be used. For example, commercially available seal types that may already be in use for linear hydraulic actuators flying on current aircraft may demonstrate sufficient capability for linear load and position holding applications. In some implementations, the sealing complexity of the actuator 1500 may be reduced by using a standard, e.g., commercially available, semi-circular, unidirectional seal design generally used in linear hydraulic actuators. In some embodiments, the seal assembly 1512 can be a one-piece seal.

In some embodiments of the example actuator 1500, the seal assembly 1512 may be included as part of the rotary piston 1550. For example, the seal assembly 1512 may be located near the piston end 1552, opposite the connector arm 1554, and slide along the interior surface of the pressure chamber 1510 to form a fluidic seal as the rotary piston 1550 moves in and out of the pressure chamber 1510. In some embodiments, the seal assembly 1512 can act as a bearing. For example, the seal assembly 1512 may provide support for the piston 1550 as it moves in and out of the pressure chamber 1510.

In some embodiments, the actuator 1500 may include a wear member between the piston 1550 and the pressure chamber 1510. For example, a wear ring may be included in proximity to the seal assembly 1512. In another example, the actuator 1500 may include one or more roller (e.g., needle) bearings in proximity to the seal assembly 1512. The wear ring and/or roller bearings may act as pilots for the piston 1512 and/or act as bearings providing support for the piston 1512.

In the example actuator 1500, when the rotary piston 1550 is inserted through the open end 1513, the seal assembly 1512 contacts the interior surface of the pressure chamber 1510 and the substantially smooth surface of the piston end 1552 to form a substantially pressure-sealed region within the pressure chamber 1510. The pressure chamber 1510 may include a fluid port (not shown) formed through the pressure chamber assembly 1530, through which pressurized fluid may flow. Upon introduction of pressurized fluid, e.g., hydraulic oil, water, air, gas, into the pressure chamber 1510, the pressure differential between the interior of the pressure chamber 1510 and the ambient conditions outside the pressure chamber 1510 causes the piston end 1552 to be urged outward from the pressure chamber 1510. As the piston end 1552 is urged outward, the piston 1550 urges the rotary piston assembly 1520 to rotate.

The example actuator 1500 includes an arcuate bearing sleeve assembly 1580 that is removably affixed to the pressure chamber 1510. In some embodiments, the arcuate bearing sleeve assembly 1580 can be the example arcuate bearing sleeve assembly 1400 of FIG. 14. As the piston 1550 extends rotationally, the piston 1550 can also exhibit a radially outward force. Without additional radial mechanical support, this radially outward force could increase the amount of load that is exerted against the seal assembly 1512, which can increase friction and wear and reduce the performance (e.g., torque capacity) of the actuator 1500. To reduce this effect, the arcuate bearing sleeve assembly 1580 provides radial mechanical support for the piston 1550.

The arcuate bearing sleeve assembly 1580 has an arcuate support portion 1582 and a liner portion 1584. The liner portion 1584 is generally semicircular (e.g., crescent or "C" shaped), with a radially outer surface 1585 that is configured to conform to an inner surface 1583 of the arcuate support portion 1582. The arcuate support portion 1582 is formed as a ring section that is generally semicircular (e.g., crescent or "C" shaped). A radially inner surface 1586 of the liner portion 1584 is configured to conform to the radially outer surface 1551 of the rotary piston 1550. The liner portion 1584 is semi-concentrically assembled to the arcuate support section 1582 such that the radially outer surface 1551 contacts the inner surface 1586.

With the arcuate bearing sleeve assembly 1580 in place, as the piston 1550 extends rotationally, a radially outer side 1551 of the piston contacts the liner portion 1584. Radially outward forces exhibited by the rotary piston 1550 bring the rotary piston into contact with the liner portion 1584, which transmits the forces through the arcuate support portion 1582 to the pressure chamber assembly 1530. The connection between the pressure chamber assembly 1530 and the arcuate support portion 1582 causes the arcuate bearing sleeve assembly 1580 to resist (e.g., redirect, constrain) outward radial forces presented by the rotary piston 1550. In some examples, the arcuate bearing sleeve assembly 1580 bears loads that would otherwise be borne by the seal assembly 1512, thereby maintaining the performance (e.g., torque capability, seal life) of the rotary piston actuator 1500.

In some embodiments of the example actuator 1500, the pressure chamber assembly 1530 can be formed from a single, unitary piece of material having no seams other than those created by the open end 1513 or the fluid port. For example, the pressure chamber 1510, the opening 1513, and the fluid port may be formed by molding, machining, or otherwise forming a unitary piece of material.

Figure 16:
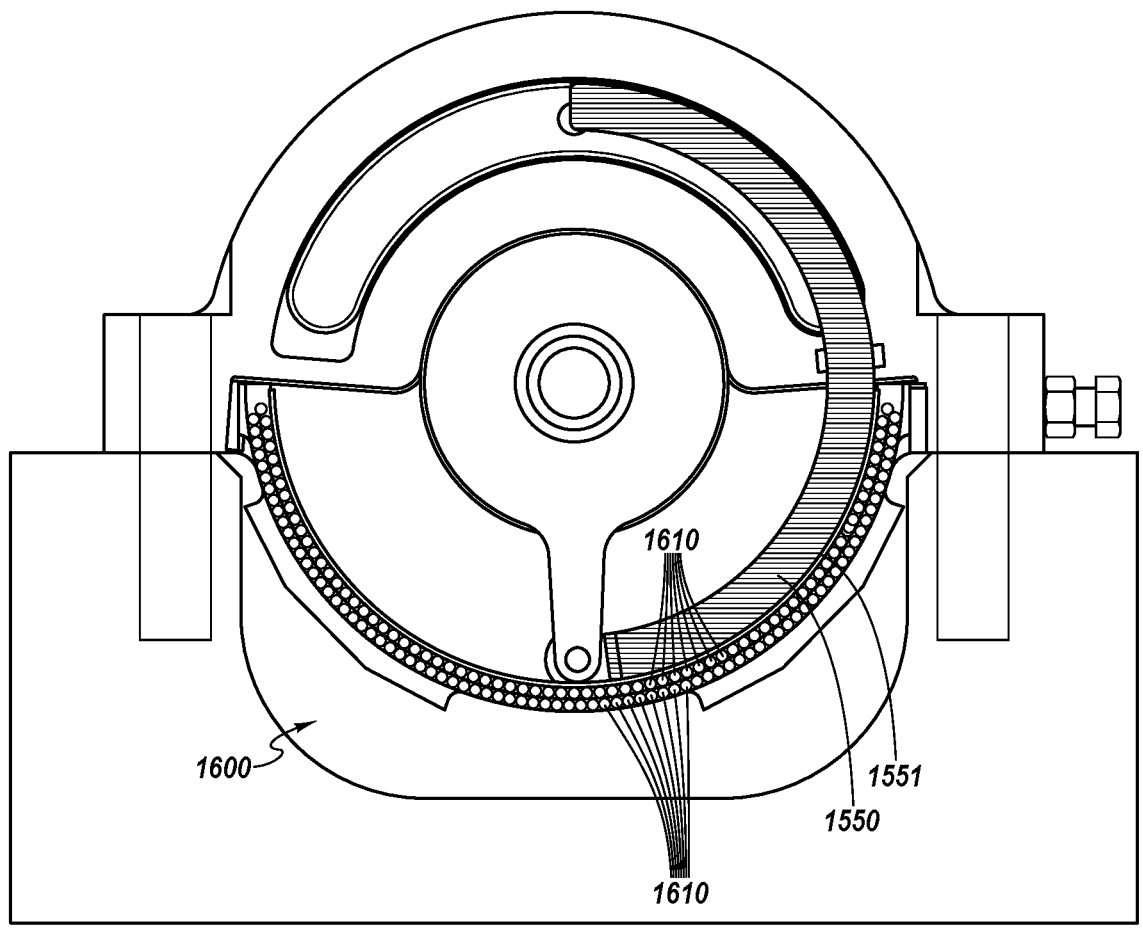
FIG. 16 is a sectional side view of another example arcuate bearing sleeve assembly.

FIG. 16 is a sectional side view of another example arcuate bearing sleeve assembly 1600. In some embodiments the arcuate bearing sleeve assembly 1600 can be all or part of the arcuate bearing sleeve assemblies 1350, 1400, and/or 1580 of FIGS. 13-15B. As discussed previously, arcuate bearing sleeve assemblies can include friction-reducing features. For example, arcuate bearing sleeve assemblies can be constructed or coated with friction-reducing materials (e.g., PTFE) and/or can be textured (e.g., cross-hatched) to retain and/or distribute lubricants to points of contact between the assembly and the rotary pistons.

In the example of the arcuate bearing sleeve assembly 1600, a collection of recirculating ball (or roller) bearings 1610 provide a friction-reducing feature that can constrain or redirect outward radial forces of the rotary piston 1550. The radially outer surface 1551 of the rotary piston 1550 contacts a subset of the bearings 1610, and the bearings 1610 roll or spin as the rotary piston 1550 moves relative to the arcuate bearing sleeve assembly 1600.

Figure 17:
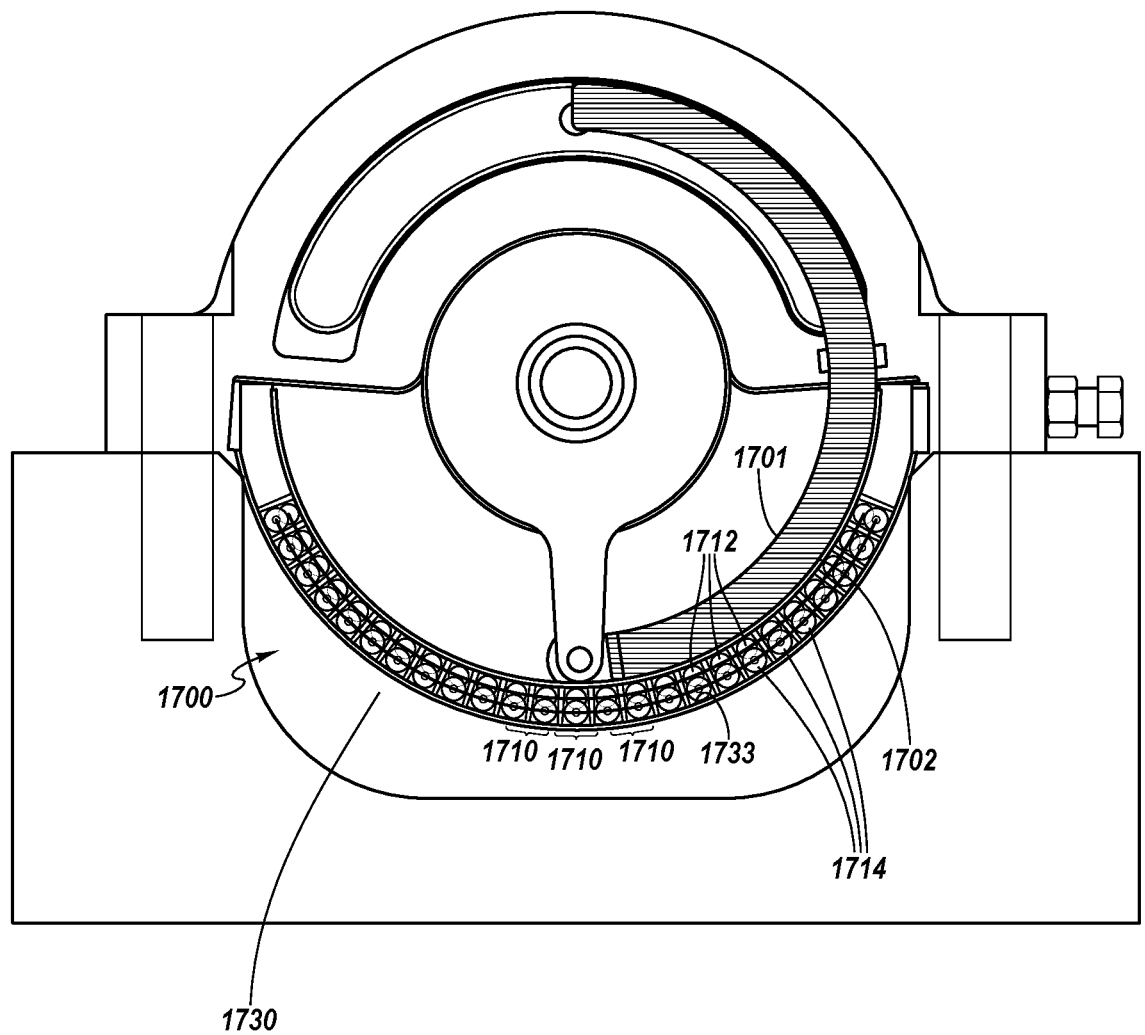
FIG. 17 is a sectional side view of another example arcuate bearing sleeve assembly.

FIG. 17 is a sectional side view of another example arcuate bearing sleeve assembly 1700. In some embodiments, the arcuate bearing sleeve assembly 1700 can be all or part of the arcuate bearing sleeve assemblies 1350, 1400, and/or 1580 of FIGS. 13-15B. As discussed previously, arcuate bearing sleeve assemblies can include friction-reducing features.

In the example of the arcuate bearing sleeve assembly 1700, a collection of bearing assemblies 1710 provide a friction-reducing feature that can constrain or redirect outward radial forces of a rotary piston 1701. Each bearing assembly 1710 includes a piston bearing 1712 and a housing bearing 1714. The piston bearing 1712 is arranged such that it will be contacted by the radially outer surface 1702 of the rotary piston 1701 as the rotary piston 1701 extends and retracts (e.g., in and out of the pressure chamber assembly 1530). The housing bearing 1714 is arranged such that it will contact both the piston bearing 1712 and a radially inner surface 1733 of an arcuate housing 1730.

In use, the rotary piston 1701 contacts the piston bearing 1712. Radially outward forces given by the rotary piston 1701 are transmitted to the piston bearing 1712, to the housing bearing 1714, and to the radially inner surface 1733 of the housing 1730. As such, the housing 1730 can at least partly resist, constrain, and/or redirect the radially outward forces of the rotary piston 1701.

In some embodiments, the rotary piston 1701 can be the example rotary piston 1550 and the housing 1730 can be the example arcuate support portion 1582. For example, the rotary piston 1550 can contact the piston bearing 1612, and radially outward forces given by the rotary piston 1550 are transmitted to the piston bearing 1712, to the housing bearing 1714, and to the radially inner surface of the outer housing 1550. As such, the arcuate support portion 1582 can at least partly resist, constrain, and/or redirect the radially outward forces of the rotary piston 1550.

In some embodiments, the rotary piston 1701 can be the example rotary piston 1312 and the housing 1730 can be the example outer housing 1341. For example, the rotary piston 1312 can contact the piston bearing 1712, and radially outward forces given by the rotary piston 1312 are transmitted to the piston bearing 1712, to the housing bearing 1714, and to the radially inner surface of the outer housing 1341. As such, the outer housing 1341 can at least partly resist, constrain, and/or redirect the radially outward forces of the rotary piston 1312.

In some embodiments, the piston bearing 1712 can have a larger or smaller diameter than the housing bearing 1714. For example, in some embodiments the housing 1730 and the rotary piston 1701 may both move in the same rotation direction, but not at the same speed. A difference in diameters between the piston bearing 1712 and the housing bearing 1714 can provide a speed adaptation function (e.g., provide a gear reduction or amplification) between the rotary piston 1701 and the housing 1730. In the example of the rotary piston actuator joint portion 1300, both the outer housing 1341 and the rotary piston 1312 move in the same direction with similar angular velocities but with different linear velocities. By having multiple bearings (e.g., the piston bearing 1712 and the housing bearing 1714) in each of the bearing assemblies 1710, the rolling action of the bearings is made compatible with both the motion of the rotary piston 1701 and the housing 1730. Furthermore, by having the multiple bearings formed with the appropriate different diameters, the gearing action of the bearing assembly 1710 can make the rolling action of the bearings compatible with both the motion of the rotary piston 1701 and the housing 1730.

Figure 18:
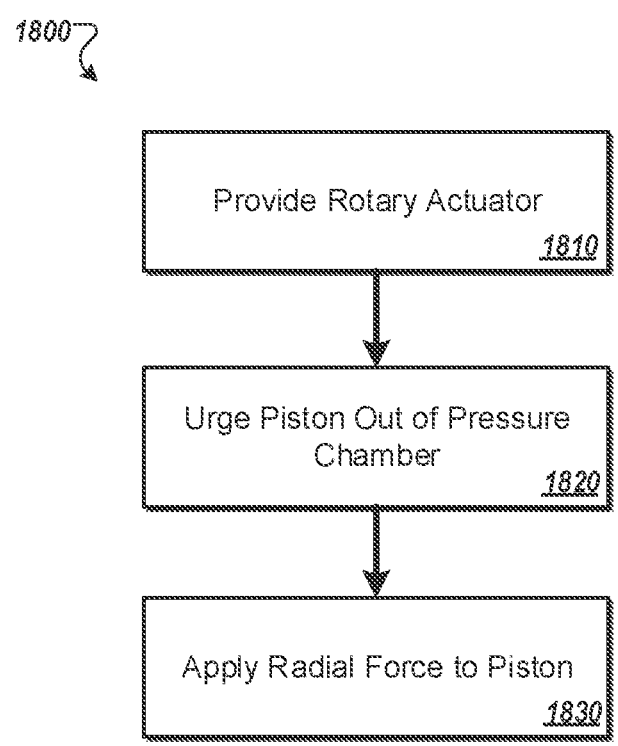
FIG. 18 is a flow diagram of an example process for performing rotary actuation of an example rotary piston actuator joint portion having arcuate bearing sleeve assemblies.

FIG. 18 is a flow diagram of an example process 1800 for performing rotary actuation of an example rotary piston actuator joint portion having arcuate bearing sleeve assemblies. In some implementations, the process 1800 may be used with systems having the example arcuate bearing sleeve assemblies 1350 of FIG. 13, the example arcuate bearing sleeve assembly 1400 of FIG. 14, the example arcuate bearing sleeve assembly 1580 of FIGS. 15A-15B, the example arcuate bearing sleeve assembly 1600 of FIG. 16, or the example arcuate bearing sleeve assembly 1700 of FIG. 17.

At 1810 a first rotary actuator is provided. The rotary actuator includes a first housing defining first arcuate chamber including a first cavity having a first open end, and an arcuate-shaped first piston disposed in said first housing for reciprocal movement in the first arcuate chamber through the first open end, wherein a first seal, the first cavity, and the first piston define a first pressure chamber including part or all of the first arcuate chamber, and a first arcuate bearing sleeve assembly having an inner surface configured to be contacted by a radially outer side of the first piston. For example, the example joint 1300 includes the three rotary piston actuator modules 1302a-1302c. The rotary piston actuator modules 1302a-1302c each include one of the arcuate bearing sleeve portions 1350, placed radially between the piston 1312 and the inner wall of the housing 1341.

At 1820, the first piston is urged partially rotationally outward from the first pressure chamber. For example, the piston 1312 of the rotary piston actuator module 1302a can be urged out of the pressure chamber (e.g., the pressure chamber 650 of FIGS. 6A-6B).

At 1830 a first radial force is applied by the first arcuate bearing sleeve assembly to the radially outer side of the piston. For example, as the rotary pistons 1312 extend, the radially outer sides 1317 contact the arcuate bearing sleeve assemblies 1350. This contact can provide a radial force that constrains radially outward movement of the rotary pistons 1312.

In some implementations, the process 1800 can include urging the first piston partially radially outward, contacting the first piston to the first arcuate bearing sleeve assembly with a second radial force, transmitting the second radial force to the rotor assembly, and constraining, by first arcuate bearing sleeve assembly, the second radial force. For example, radially outward forces exhibited by the rotary pistons 1312 can be transmitted to the housing 1341 through the arcuate bearing sleeve assemblies 1350. The housing 1341 constrains these forces, including the radial forces of the rotary pistons 1312.

In some implementations, the process 1800 can also include providing a second rotary actuator, wherein the rotor assembly rotatably surrounds the first rotary actuator and the second rotary actuator. For example, the rotary piston actuator module 1302a can be assembled within the housing 1341. The rotary piston actuator module 1302b can also be assembled within the housing 1341, which rotatably surrounds both of the rotary piston actuator modules 1302a and 1302b.

In some implementations, the process 1800 can also include redirecting the first radial force through the first arcuate bearing sleeve assembly to a rotor assembly rotatably surrounding said first housing and defining a central bore within an inner wall of the rotor assembly, wherein the first arcuate bearing sleeve assembly is removably affixed to the first housing. For example, the radially outward forces exhibited by the rotary pistons 1312 can be transmitted to the housing 1341 through the arcuate bearing sleeve portions assemblies 1350. The housing 1341 constrains these forces, including the radial forces of the rotary pistons 1312.

In some implementations, the first radial force can be redirected through the first arcuate bearing sleeve assembly to the first housing, wherein the first arcuate bearing sleeve assembly is removably affixed to the first housing. For example, the arcuate bearing sleeve assembly 1580 is removably affixed to the pressure chamber 1510.

In some implementations, applying by the first arcuate bearing sleeve portion a first radial force to the radially outer side of the piston can also include applying the first radial force to a collection of bearings in contact with the radially outer side of the piston. For example, the radial forces of the rotary piston 1550 can be transmitted though the collection of bearings 1610. In another example, the radial forces of the rotary piston 1701 can be transmitted through the collection of bearing assemblies 1710.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. In another example, various ones of the pistons can have square, rectangular, ovoid, elliptical, figure-eight, or circular shapes in cross-section. Accordingly, other implementations are within the scope of the following claims.

What is claimed is:

1. A rotary piston actuator assembly comprising:
   a first rotary actuator comprising:
      a first pressure chamber assembly defining:
         a first central bore; and
         a first arcuate chamber comprising a first cavity having a first actuator fluid port in fluid communication with the first cavity and the first central bore;
      a connector arm;
   an arcuate-shaped first piston disposed in said first pressure chamber assembly for reciprocal movement in the first pressure chamber assembly, wherein a first seal, the first cavity, and the arcuate-shaped first piston define a first pressure chamber comprising part or all of the first arcuate chamber, and a first portion of the arcuate-shaped first piston contact is affixed to the rotor connector arm;
   an outer housing rotatably surrounding said first pressure chamber assembly and comprising a tubular wall, wherein the connector arm extends to the tubular wall and the connector arm is coupled to the tubular wall; and
   a fluid delivery shaft having an elongated body disposed in said first central bore and defining a first shaft fluid delivery path.

2. The rotary piston actuator assembly of claim 1, wherein the fluid delivery shaft defines an axis and comprises:
   a first shaft fluid port along the elongated body, a second shaft fluid port near a terminal end of the elongated body, and the first shaft fluid delivery path defined by the fluid delivery shaft and fluidly connecting the first shaft fluid port to the second shaft fluid port;
   a first shaft seal disposed about the fluid delivery shaft on a first axial side of the first shaft fluid port along the axis; and
   a second shaft seal disposed about the fluid delivery shaft on a second axial side of the first shaft fluid port along the axis and opposite the first shaft seal;
   wherein the first central bore, the elongated body, the first shaft seal, and the second shaft seal define a first fluid transmission chamber, and the first actuator fluid port is in fluidic communication with the first fluid transmission chamber.

3. The rotary piston actuator assembly of claim 2, wherein the first central bore further defines a first bore portion and a second bore portion, wherein the first bore portion extends along substantially a first half of an axial length of the first central bore, and the second bore portion extends along substantially a second half of the axial length of the first central bore, and the first actuator fluid port is defined within the first bore portion; and
wherein the first fluid transmission chamber extends along substantially one half of the axial length of the first central bore such that the first fluid transmission chamber extends along the first bore portion in a first assemblage of the first rotary actuator and the fluid delivery shaft, and the first fluid transmission chamber extends along the second bore portion in a second assemblage of the first rotary actuator and the fluid delivery shaft.

4. The rotary piston actuator assembly of claim 1, wherein the first arcuate chamber further defines a first open end, and the arcuate-shaped first piston further comprises a first piston assembly comprising a tubular first piston defining a second chamber comprising a second cavity, a second fluid port in fluid communication with the second cavity, and a second open end, disposed in said first housing pressure chamber assembly for reciprocal movement in the first arcuate chamber through the first open end, wherein the first seal, the first cavity, and the arcuate-shaped first piston define a first pressure chamber, and the rotary piston actuator assembly further comprises a second piston assembly comprising an arcuate-shaped second piston disposed in said first piston assembly for reciprocal movement in the second chamber through the second open end, wherein a second seal, the second cavity, and the arcuate-shaped second piston define a second pressure chamber, and a first portion of the arcuate-shaped second piston contacts a first end effector.

5. The rotary piston actuator assembly of claim 1, wherein the first cavity defines a first arc in a plane between a first cavity open end and a first cavity enclosed end, the first arc having a first radius in the plane, the first radius defining an axis perpendicular to the plane, and the first pressure chamber assembly further defines an arcuate actuation space defining an actuation arc about the axis between the first cavity open end and a terminal end, wherein the connector arm is configured for rotary movement within the arcuate actuation space along a second arc, and the arcuate-shaped first piston is disposed in said first pressure chamber assembly for reciprocal movement in the first arcuate chamber and in the plane through the first cavity open end, wherein the first seal, the first cavity, and the arcuate-shaped first piston define the first pressure chamber comprising part or all of the first arcuate chamber.

6. The rotary piston actuator assembly of claim 1, further comprising:
   a second rotary actuator comprising:
      a second housing defining:
         a second central bore;
         a second arcuate chamber comprising a second cavity having a second actuator fluid port in fluid communication with the second cavity and the second central bore; and
      an arcuate-shaped second piston disposed in said second housing for reciprocal movement in the second housing, wherein a second seal, the second cavity, and the arcuate-shaped second piston define a second pressure chamber comprising part or all of the second arcuate chamber, and a first portion of the arcuate-shaped second piston is affixed to the connector arm;
   wherein the outer housing rotatably surrounds said second housing, and the fluid delivery shaft is disposed in said second central bore.

7. The rotary piston actuator assembly of claim 1, wherein the first pressure chamber assembly comprises a first arcuate chamber housing defining the first arcuate chamber, wherein the first cavity defines a first ring segment in a plane between a first open end and a first enclosed end, the first ring segment having a first outer radius in the plane and defining an axis perpendicular to the plane, a first inner radius in the plane about the axis, and a first central radius in the plane, wherein the first pressure chamber assembly further defines a second arcuate chamber comprising an inner chamber wall defining a second cavity defining a second ring segment in the plane between a second open end and a second enclosed end and having a second fluid port in fluid communication with the second cavity, the second ring segment having a second outer radius from the axis, larger than the first outer radius and concentric with the first outer radius about the axis in the plane, a second inner radius smaller than the first inner radius in the plane, and a second central radius substantially the same as the first central radius, wherein the second arcuate chamber is oriented rotationally opposite to the first arcuate chamber about the axis and wherein at least a portion of the first arcuate chamber housing is enclosed within at least a portion of the second arcuate chamber in the plane and defining an arcuate tubular space between the first arcuate chamber housing and the inner chamber wall, and an arcuate actuation space defining a third arc in the plane about the axis between the first open end and the second open end, and the connector arm is configured for rotary movement within the arcuate actuation space along the third arc, wherein the arcuate-shaped first piston is disposed in said first pressure chamber assembly for reciprocal movement in the first arcuate chamber and in the plane through the first open end, wherein the first seal, the first cavity, and the arcuate-shaped first piston define the first pressure chamber, and wherein the rotary piston actuator assembly further comprises a tubular, arcuate-shaped second piston disposed in said second housing arcuate chamber for reciprocal movement in the second arcuate chamber, in the arcuate tubular space and in the plane through the second open end, wherein a second seal, a third seal, the second cavity, and the arcuate-shaped second piston define a second pressure chamber, and a second portion of the arcuate-shaped second piston is affixed to the connector arm.

8. A method of rotary actuation comprising:
providing a first rotary actuator comprising:
a first pressure chamber assembly defining:
a first central bore; and
a first arcuate chamber comprising a first cavity having a first actuator fluid port in fluid communication with the first cavity and the first central bore;
a connector arm;
an arcuate-shaped first piston disposed in said first pressure chamber assembly for reciprocal movement in the first pressure chamber assembly, wherein a first seal, the first cavity, and the arcuate-shaped first piston define a first pressure chamber comprising part or all of the first arcuate chamber, and a first portion of the arcuate-shaped first piston contacts is affixed to the connector arm;
an outer housing rotatably surrounding said first pressure chamber assembly and comprising a tubular wall, wherein the connector arm extends to the tubular wall and the connector arm is coupled to the tubular wall; and
a fluid delivery shaft having an elongated body disposed in said first central bore and defining a first shaft fluid delivery path in fluid communication with a first shaft fluid port;
providing pressurized fluid to the first shaft fluid port;

urging pressurized fluid to the first pressure chamber through the first shaft fluid delivery path, the first shaft fluid port, and the first actuator fluid port; and
urging the arcuate-shaped first piston partially outward from the first pressure chamber to urge rotation of the outer housing in a first direction.

9. The method of claim 8, further comprising:
rotating the outer housing in a second direction opposite that of the first direction; and,
urging the arcuate-shaped first piston partially into the first pressure chamber to urge pressurized fluid out of the first pressure chamber through the first actuator fluid port, the first shaft fluid delivery path, and the first shaft fluid port.

10. The method of claim 8, further comprising:
disassembling the first rotary actuator from a first assembly configuration with the fluid delivery shaft;
reassembling the first rotary actuator to the fluid delivery shaft in a second configuration;
providing pressurized fluid to the first shaft fluid port;
urging pressurized fluid to the first pressure chamber through the first shaft fluid delivery path, the first shaft fluid port, and the first actuator fluid port; and
urging the arcuate-shaped first piston partially outward from the first pressure chamber to urge rotation of the outer housing in a second direction opposite the first direction.

11. The method of claim 10, further comprising:
disassembling the first rotary actuator from a first assembly configuration with the fluid delivery shaft, wherein the first central bore portion, the elongated body, a first shaft seal, and a second shaft seal define the first shaft fluid delivery path in the first assembly configuration;
reassembling the first rotary actuator to the fluid delivery shaft in a second configuration, wherein a second central bore portion, the elongated body, the first shaft seal, and the second shaft seal define the first shaft fluid delivery path in the second configuration;
providing pressurized fluid to the first shaft fluid port; and
blocking flow of pressurized fluid by the first pressure chamber.

12. The method of claim 8, wherein the first central bore defines a first bore portion and a second bore portion, wherein the first bore portion extends along substantially a first half of an axial length of the first central bore, and the second bore portion extends along substantially a second half of the axial length of the first central bore, and the first actuator fluid port is defined within the first bore portion; and wherein the first shaft fluid delivery path extends along substantially one half of the axial length of the first central bore such that the first shaft fluid delivery path extends along the first bore portion in a first assemblage of the first rotary actuator and the fluid delivery shaft, and the first shaft fluid delivery path extends along the second bore portion in a second assemblage of the first rotary actuator and the fluid delivery shaft.

13. An arm of a machine apparatus comprising:
a first arm portion;
a second arm portion; and
a joint portion pivotally connecting the first arm portion to the second arm portion, the joint portion comprising a first rotary actuator comprising:
a first pressure chamber assembly defining:
a first central bore; and a first arcuate chamber comprising a first cavity having a first actuator fluid port in fluid communication with the first cavity and the first central bore; and a connector arm;

an arcuate-shaped first piston disposed in said first pressure chamber assembly for reciprocal movement in the first pressure chamber assembly, wherein a first seal, the first cavity, and the arcuate-shaped first piston define a first pressure chamber comprising part or all of the first arcuate chamber, and a first portion of the arcuate-shaped first piston is affixed to the connector arm;

an outer housing rotatably surrounding said first pressure chamber assembly and comprising a tubular wall, wherein the connector arm extends to the tubular wall and the connector arm is coupled to the tubular wall; and a fluid delivery shaft having an elongated body disposed in said first central bore and defining a first shaft fluid delivery path.

14. The arm of claim 13, wherein the outer housing is affixed to or is integral to the first arm portion.

15. The arm of claim 13, wherein the first pressure chamber assembly is affixed to or is integral to the second arm portion.

16. The arm of claim 13, further comprising:
a second rotary actuator comprising:
a second housing defining:
a second central bore;
a second arcuate chamber comprising a second cavity having a second actuator fluid port in fluid communication with the second cavity and the second central bore; and
an arcuate-shaped second piston disposed in said second housing for reciprocal movement in the second housing, wherein a second seal, the second cavity, and the arcuate-shaped second piston define a second pressure chamber comprising part or all of the second arcuate chamber, and a first portion of the arcuate-shaped second piston is affixed to the connector arm;
wherein the outer housing rotatably surrounds said second housing, and the fluid delivery shaft is disposed in said second central bore.

17. The arm of claim 13, wherein the fluid delivery shaft defines an axis and comprises:
a first shaft fluid port along the elongated body, a second shaft fluid port near a terminal end of the elongated body, and the first shaft fluid delivery path defined by the fluid delivery shaft and fluidly connecting the first shaft fluid port to the second shaft fluid port;
a first shaft seal disposed about the fluid delivery shaft on a first axial side of the first shaft fluid port along the axis; and
a second shaft seal disposed about the fluid delivery shaft on a second axial side of the first shaft fluid port along the axis and opposite the first shaft seal;
wherein the first central bore, the elongated body, the first shaft seal, and the second shaft seal define a first fluid transmission chamber, and the first actuator fluid port is in fluidic communication with the first fluid transmission chamber.

18. The arm of claim 17, wherein the first central bore further defines a first bore portion and a second bore portion, wherein the first bore portion extends along substantially a first half of an axial length of the first central bore, and the second bore portion extends along substantially a second half of the axial length of the first central bore, and the first actuator fluid port is defined within the first bore portion; and
wherein the first fluid transmission chamber extends along substantially one half of the axial length of the first central bore such that the first fluid transmission chamber extends along the first bore portion in a first assemblage of the first rotary actuator and the fluid delivery shaft, and the first fluid transmission chamber extends along the second bore portion in a second assemblage of the first rotary actuator and the fluid delivery shaft.

* * * * *

UNITED STATES PATENT AND TRADEMARK OFFICE
CERTIFICATE OF CORRECTION

PATENT NO. : 12,012,976 B2
APPLICATION NO. : 17/655145
DATED : June 18, 2024
INVENTOR(S) : Kamran Eftekhari Shahroudi, Larry Snyder and Robert Alan Gerhart It is certified that error appears in the above-identified patent and that said Letters Patent is hereby corrected as shown below:

In the Claims

Column 59, Line 32, Claim 1, after "piston" please delete "contact";

Column 59, Line 32, Claim 1, after "to the" please delete "rotor";

Column 60, Line 16, Claim 4, after "first" please delete "housing";

Column 61, Line 34, Claim 7, after "second" please delete "housing";

Column 61, Line 56, Claim 8, after "piston" please delete "contacts".

Signed and Sealed this
Eighth Day of April, 2025

Coke Morgan Stewart
*Acting Director of the United States Patent and Trademark Office*